US012416885B2

(12) United States Patent
Uchiyama et al.

(10) Patent No.: US 12,416,885 B2
(45) Date of Patent: Sep. 16, 2025

(54) FIXING APPARATUS FOR CONTROLLING TARGET TEMPERATURE OF SECOND CONVEYED RECORDING MEDIUM AND IMAGE FORMING APPARATUS

(71) Applicant: CANON KABUSHIKI KAISHA, Tokyo (JP)

(72) Inventors: Takahiro Uchiyama, Shizuoka (JP); Keisuke Mochizuki, Shizuoka (JP); Hirohiko Aiba, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/624,241

(22) Filed: Apr. 2, 2024

(65) Prior Publication Data

US 2024/0337971 A1 Oct. 10, 2024

(30) Foreign Application Priority Data

Apr. 5, 2023 (JP) ................................ 2023-061325

(51) Int. Cl.
*G03G 15/20* (2006.01)

(52) U.S. Cl.
CPC . *G03G 15/2039* (2013.01); *G03G 2215/2045* (2013.01)

(58) Field of Classification Search
CPC ....... G03G 15/2039; G03G 2215/2045; G03G 15/5062; G03G 2215/00037; G03G 2215/00042; G03G 2215/00067
USPC .......................................................... 399/69
See application file for complete search history.

(56) References Cited

U.S. PATENT DOCUMENTS

| | | | | |
|---|---|---|---|---|
| 10,054,882 | B2 | 8/2018 | Nomura et al. | |
| 10,254,689 | B2 | 4/2019 | Nomura et al. | |
| 10,545,435 | B2 | 1/2020 | Uchiyama et al. | |
| 10,838,328 | B2 | 11/2020 | Uchiyama | |
| 2015/0160593 | A1* | 6/2015 | Masumoto | G03G 15/2039 399/69 |
| 2016/0282777 | A1* | 9/2016 | Shibuya | G03G 15/2039 |
| 2018/0024476 | A1 | 1/2018 | Sato | |
| 2018/0067427 | A1* | 3/2018 | Obayashi | G03G 15/2039 |

(Continued)

FOREIGN PATENT DOCUMENTS

| | | | |
|---|---|---|---|
| JP | 2008170585 | A | 7/2008 |
| JP | 2011002511 | A | 1/2011 |

(Continued)

*Primary Examiner* — Robert B Beatty
(74) *Attorney, Agent, or Firm* — Venable LLP

(57) ABSTRACT

A fixing apparatus for fixing a toner image on a recording material includes a heating member; an opposing member which nips the recording material; and a control unit that sets a target temperature of the heating member. The control unit acquires toner amount information for each of a plurality of regions which are separated in a direction perpendicular to the conveying direction, and sets, based on (i) a first value which is based on toner amount information in each region of a first toner image formed on a first recording material, (ii) a conveying interval between the first and a second recording material, and (iii) a second value which is based on toner amount information in each region of a second toner image formed on the second recording material, the control unit sets the target temperature to heat the second recording material.

9 Claims, 29 Drawing Sheets

(56) References Cited

U.S. PATENT DOCUMENTS

| | | | | |
|---|---|---|---|---|
| 2019/0101854 | A1* | 4/2019 | Taguchi | G03G 15/2028 |
| 2021/0034000 | A1* | 2/2021 | Sako | G03G 15/2053 |

FOREIGN PATENT DOCUMENTS

| | | | | | |
|---|---|---|---|---|---|
| JP | 2014211551 | A | | 11/2014 | |
| JP | 2021021886 | A | * | 2/2021 | G03G 15/2039 |

* cited by examiner

FIXING APPARATUS FOR CONTROLLING TARGET TEMPERATURE OF SECOND CONVEYED RECORDING MEDIUM AND IMAGE FORMING APPARATUS

BACKGROUND OF THE INVENTION

Field of the Invention

The present invention relates to a fixing apparatus and an image forming apparatus.

Description of the Related Art

An electrophotographic type image forming apparatus, such as a copier and a printer, forms a toner image by developing toner on an electronic latent image formed on a photosensitive member with a scanning light of a laser scanner, and transferring the toner image from the photosensitive member to a recording material directly or via an image bearing member (e.g. intermediate transfer member). Then the recording material on which the toner image is transferred is heated and pressed by a fixing apparatus, whereby the image is formed. The fixing apparatus is constituted of a fixing roller or a fixing sleeve which is heated by a heat source, and a pressure roller which contacts thereto and forms a fixing nip.

Fixing setting conditions of the fixing apparatus include setting temperature of a heating member, which is a heat source of the fixing apparatus, and conveying speed of a recording material. These fixing setting conditions are set to conditions under which a toner image is sufficiently fixed onto the recording material, and an image defect (e.g. fixing failure) is not generated even if the amount of toner on the recording material on which an image is formed is at the maximum. However under such fixing setting conditions, heat to fix toner to the recording material becomes excessive for an image of which an amount of toner on the recording material is low (e.g. an image formed by text only), and in some cases, more power is consumed than required, and an image defect such as hot offset and a conveying failure may be generated.

To solve these problems, a method for detecting image density information and the like from the image data, which is transmitted from a host computer and an image scanner connected to the image forming apparatus, estimating the toner amount, and changing the fixing setting conditions according to the estimated toner amount, was proposed. Further, it was proposed to suppress power consumption using an image forming apparatus that can supply a predetermined power for fixing regardless the toner amount corresponding to a toner image forming region formed on a recording material (e.g. US 2018/0024476 A1).

SUMMARY OF THE INVENTION

In US 2018/0024476 A1, however, power supply to the heating member is controlled based on the toner amount information on the paper to be printed next (the current paper), in the case of continuous printing on recording materials, hence the history before the current paper is not reflected in the toner amount information. Therefore depending on the toner images printed before the current paper, required power to ensure fixing may not be supplied, or an image defect and conveying failure may be generated, or power may be wastefully consumed, due to supplying power that is more than necessary.

In the prior art, the interval of the recording materials (hereafter print interval) is not considered, hence if the recording materials are continuously printed, it is difficult to control the heating member at an optimum temperature in accordance with the print interval, and an image defect and conveying failure may be generated, or power may be wastefully consumed.

It is an object of the present invention to provide a technique to reduce power consumption and suppress generation of an image defect and conveying failure in the fixing apparatus used for the image forming apparatus.

The present invention provides a fixing apparatus that heats a toner image formed on a recording material in accordance with image information, so as to fix the toner image to the recording material, comprising:

a heating member configured to heat the recording material;

an opposing member configured to face the heating member and to form, with the heating member, a nip portion to nip and convey the recording material; and a control unit configured to set a target temperature of the heating member using the image information, wherein the control unit acquires toner amount information, which is used for forming the toner image, for each of a plurality of regions which are separated in a direction perpendicular to the conveying direction of the recording material, and based on (i) a first value which is based on toner amount information in each of the regions of a first toner image formed on a first recording material, (ii) a conveying interval between the first recording material and a second recording material which is conveyed immediately after the first recording material, and (iii) a second value which is based on toner amount information in each of the regions of a second toner image formed on the second recording material, the control unit sets the target temperature to heat the second recording material.

According to the present invention, a technique to reduce power consumption and suppress generation of an image defect and conveying failure in the fixing apparatus used for the image forming apparatus can be provided.

Further features of the present invention will become apparent from the following description of exemplary embodiments with reference to the attached drawings.

DESCRIPTION OF THE EMBODIMENTS

Embodiments of the present invention will now be described with reference to the drawings. Dimensions, materials and shapes of the components described in the embodiments and relative positions thereof may be appropriately changed depending on the configuration and various conditions of the apparatus to which the present invention is applied. In other words, the scope of the invention is not limited to the content of the embodiments described hereinbelow.

Embodiment 1

(1) Image Forming Apparatus

Figure 1:
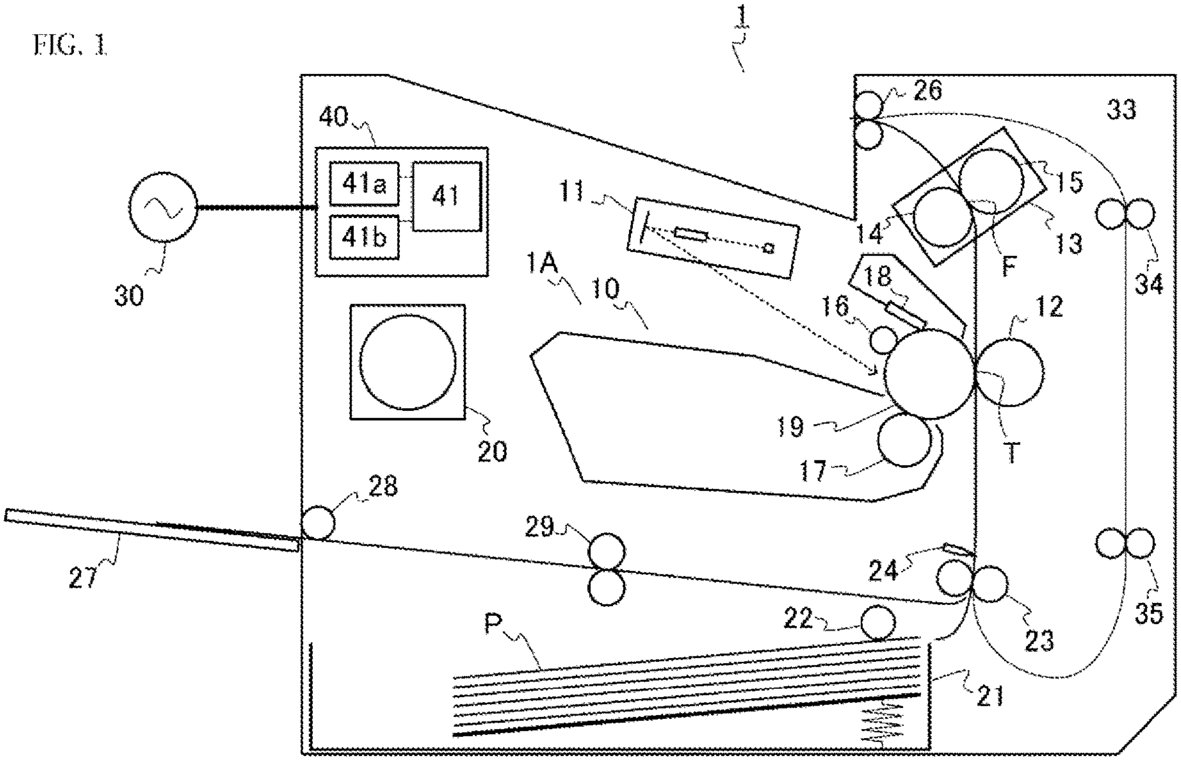
FIG. 1 is a schematic cross-sectional view of an image forming apparatus according to the present embodiment.

A configuration of an image forming apparatus 1 according to embodiment 1 will be described first with reference to FIG. 1. FIG. 1 is a schematic cross-sectional view of the image forming apparatus according to Embodiment 1. The image forming apparatus 1 is an electrophotographic type laser printer which forms an image on a recording material P.

The image forming apparatus 1 includes a process cartridge 10 constituted of: a photosensitive drum 19 which is an image bearing member (electrophotographic photosensitive member); a charging roller 16 which is charging means; a developing roller 17 which is developing means; and a cleaning blade 18 which is cleaning means. In Embodiment 1, a developing unit that includes the photosensitive drum 19, the charging roller 16 and the developing roller 17, and a cleaning unit that includes the cleaning blade 18, constitute the process cartridge 10 which is detachably attached to the main body of the image forming apparatus 1.

The image forming apparatus 1 also includes a laser scanner 11, a feeding tray 21, a feeding roller 22, a conveying roller pair 23, a top sensor 24, a transfer roller 12, a fixing apparatus 13 (image heating apparatus), a discharging roller pair 26, a motor 20, and a control unit 40. An image forming unit 1A which includes the process cartridge 10, the laser scanner 11 which is exposing means, and the transfer roller 12 which is a transfer member, functions as toner image forming means for forming a toner image on a recording material P.

The motor 20 is driving means for applying rotary driving force to the image bearing member and members used for conveying the recording material P. In Embodiment 1, the motor 20 applies the rotary driving force to a plurality of members including the feeding roller 22, the conveying roller pair 23, the photosensitive drum 19, the fixing apparatus 13, and the discharging roller pair 26.

The photosensitive drum 19 is a photosensitive member formed in a drum (cylindrical) shape, and is rotary-driven counterclockwise in FIG. 1 at a predetermined peripheral velocity (process speed) when an image is formed. The charging roller 16 uniformly charges the peripheral surface of the photosensitive drum 19 at a predetermined polarity and potential (primary charging). The primary-charged surface of the photosensitive drum 19 is scanned and exposed (irradiated) with a laser beam emitted from the laser scanner 11.

The laser scanner 11, which is exposing means, outputs a laser beam, which is ON/OFF-modulated in accordance with a video signal transmitted from the control unit 40. The video signal is a signal that is generated based on data acquired by developing the image information on an image to be formed on the image bearing member, developed in a main scanning direction and a sub-scanning direction of the laser scanner 11, and is transmitted to the laser scanner 11 as a signal to specify the toner amount for each pixel (time series digital pixel signal). The image information that indicates an image to be formed on the recording material P is inputted via an external device (information processing terminal), such as an image scanner, a computer, or the like, connected to the image forming apparatus 1.

By the scanning exposure with the laser scanner 11, charges in the exposure region (bright region) of the peripheral surface of the photosensitive drum 19 are removed, and an electrostatic latent image corresponding to the image information is formed on the peripheral surface of the photosensitive drum 19. The developing roller 17 bears developer containing toner on the surface and supplies the toner to the photosensitive drum 19, so that the electrostatic latent image formed on the peripheral surface of the photosensitive drum 19 is developed as the toner image. In Embodiment 1, a reversal developing method, which causes toner to adhere to the bright region during exposure and develops the toner image, is used.

The feeding tray 21 is detachable from the image forming apparatus 1, and stores recording materials P in a stacked state. The recording materials P stored in the feeding tray 21 are individually separated and fed by the feeding roller 22 that is driven based on a feeding start signal of the control unit 40, and are conveyed to the conveying roller pair 23. By the conveying roller pair 23, each recording material P is inserted into the transfer nip T, which is a transfer portion formed between the photosensitive drum 19 and the transfer roller 12.

The top sensor 24 is installed on the conveying path between the conveying roller pair 23 and the transfer nip T, and detects the passing timing of the tip of the recording material P fed from the conveying roller pair 23. In accordance with the passing timing of the tip of the recording material P, detected by the top sensor 24, the control unit 40 adjusts the timing for the laser scanner 11 to start writing the electrostatic latent image. In other words, the writing start timing is controlled, so that the tip of the toner image on the photosensitive drum 19 reaches the transfer nip T at the timing when the tip of the recording material P reaches the transfer nip T.

The recording material P inserted into the transfer nip T is nipped by the transfer nip T, and is conveyed to the photosensitive drum 19 and the transfer roller 12. During this time, transfer voltage, which is controlled to a predetermined voltage value, is applied from a transfer voltage apply power supply (not illustrated) to the transfer roller 12. When transfer voltage having opposite polarity of the normal charging polarity of the toner is applied to the transfer roller 12, the toner image carried on the peripheral surface of the photosensitive drum 19 is electrostatically transferred to the surface of the recording material P. The recording material P on which the toner image is transferred is conveyed from the transfer nip T to the fixing apparatus 13. After the recording material P passes through the transfer nip T, untransferred toner, paper dust, and the like are removed from the peripheral surface of the photosensitive drum 19 by the cleaning blade 18, and the primary charging is performed again, so as to be ready for the next image formation.

As described in detail later, the fixing apparatus 13 includes a fixing film 14 which is a fixing member, and a pressure roller 15 which is an opposing member (pressing member), and the fixing apparatus 13 nips and conveys the recording material P using a fixing nip F. During this time, the toner image of the recording material P is heated by the fixing film 14, which is controlled at a predetermined temperature (fixing temperature), whereby the toner image is fixed. The recording material P which passed through the fixing apparatus 13 is discharged and loaded into a discharging tray, which is disposed on the upper part of the image forming apparatus 1, by the discharging roller pair 26 for discharging the recording material P. By the series of operations described above, image formation on one sheet of recording material P completes.

In the case of double-sided printing, the recording material P, where an image is formed on the first surface by passing through the transfer nip T and the fixing nip F, is fed to the discharging roller pair 26, and is then fed back into the image forming apparatus 1 again by the discharging roller pair 26 rotating in reverse. The recording material P which was fed back is reversed (from the first surface up to the second surface) by a double-sided conveying roller pair 34 and 35 disposed on a double-sided conveying path 33, and it is conveyed to the image forming unit 1A again in this reversed state. Then the recording material P, where an image is formed on the second surface, is conveyed again from the conveying roller pair 23 via the transfer nip T and the fixing nip F, and it is discharged to the discharging tray by the discharging roller pair 26. In other words, the double-sided conveying path 33 functions as a re-conveying unit that conveys a recording material, which passed through the toner image forming means and the fixing means, back to the toner image forming means again. Further, in Embodiment 1, the discharging roller pair 26 functions as a reversing unit, which conveys the recording material in a reversed state to the re-conveying unit again.

By repeating the above operation, images can be successively formed on a plurality of recording materials P. The image forming apparatus 1 of Embodiment 1 can print about 43 sheets of monochrome images per minute on an A4 sized [210 mm×297 mm] standard paper, at a 230 mm/sec. conveying speed. The image forming apparatus is not limited thereto, and it may be able to perform color printing or multi-color printing. In the case of performing multi-color printing, the image forming unit is provided for each color, that is, a plurality of image forming units are included. In this case, it is preferable that an image of each color is transferred superimposed on a belt type intermediate transfer member, and then the image is formed on the recording material.

The image forming apparatus 1 of Embodiment 1 includes a standard paper mode, a thin paper mode, and a thick paper mode, as print modes in which operation and control of the image formation are optimized in accordance with the type of the recording material. The standard paper mode is a mode optimized for image formation on standard paper of which basis weight is at least 75 g/$m^2$ and less than 90 g/$m^2$. The thin paper mode is a mode optimized for image formation on thin paper of which basis weight is at least 60 g/$m^2$ and less than 75 g/$m^2$. The thick paper mode is a mode optimized for image formation on thick paper of which basis weight is at least 90 g/$m^2$ and not more than 200 g/$m^2$. In each mode, a value of transfer voltage to be applied to the transfer roller 12, fixing temperature, a conveying interval when a plurality of sheets are printed, and the like, are changed.

The control unit 40 includes a CPU 41, a ROM **41*a* and a RAM 41*b*. The CPU 41 controls various operations related to image formation by executing various programs stored in the ROM 41*a*, using the RAM 41*b* as a work area. The ROM 41*a* is an example of a non-transitory storage medium storing control programs of the image forming apparatus 1**.

(2) Fixing Apparatus

Figure 2:
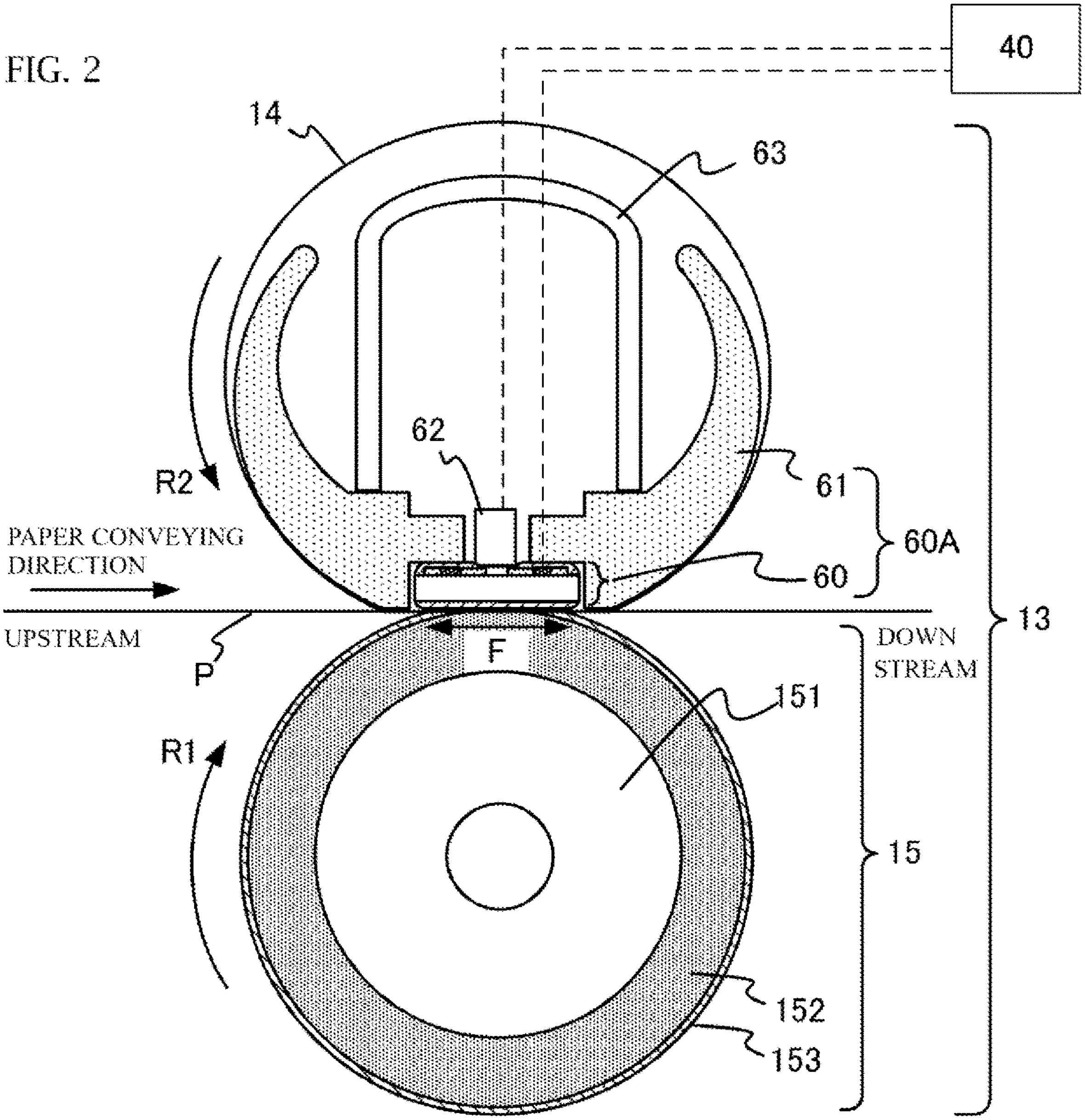
FIG. 2 is a schematic diagram depicting a cross-sectional configuration of a fixing apparatus according to the present embodiment.

A configuration of the fixing apparatus 13 will be described next with reference to FIG. 2. FIG. 2 is a schematic diagram depicting a cross-sectional configuration of the fixing apparatus 13 according to Embodiment 1. The fixing apparatus 13 includes the fixing film 14, the pressure roller 15, a nip forming member 60A constituted of a heater 60 (heating element) and a heater holder 61, and a pressure stay 63.

The fixing film 14 is a flexible tubular (endless) film member. In order to decrease a thermal capacity and shorten wait time (first printout time), the film thickness of the fixing film 14 is preferably at least 20 μm and not more than 450 μm. For the fixing film 14, a single layer film of PTFE, PFA, FEP or the like having heat resistance, or a multi-layer film generated by coating a surface layer of PTFE, PFA, FEP or the like on a film base layer of polyimide, polyamide-imide, PEEK, PES, PPS or the like, can be used. In Embodiment 1, a fixing film generated by coating PFA on an outer peripheral surface of a polyimide film of which film thickness is about 60 μm, is used. The thickness of the surface layer is about 14 μm. The outer diameter of the fixing film 14 is 24 mm. The base layer of the fixing film 14 may be formed of a metal material (e.g. SUS), instead of the above mentioned resin materials. Furthermore, an elastic layer of heat resistant rubber (e.g. silicon rubber) may be formed between the base layer and the coat layer to improve image quality.

The pressure roller 15 is constituted of a core metal 151, an elastic layer 152, and a surface layer 153 (the outermost layer). In Embodiment 1, an aluminum core metal is used for the core metal 151, a silicon rubber is used for the elastic layer 152, and a PFA tube, of which thickness is about 50 μm, is used for the surface layer 153. The outer diameter of the pressure roller 15 is 25 mm, and the thickness of the elastic layer 152 is about 3 mm.

The heater 60 is a plate type heating member that rapidly heats the fixing film 14 while contacting the inner peripheral surface of the fixing film 14. Specifically, the heater 60 has a low thermal capacity plate shape, and includes a heat resistant layer heated by energization, formed of Ag/Pd (silver palladium), $RuO_2$, $Ta_2N$ or the like, and the heat resistant layer is formed on the insulating ceramic substrate (alumina, aluminum nitride or the like) by screen printing or the like. Further, as a protective insulating layer, a glass layer is formed on the heat resistant layer. The temperature of the heater 60 is detected by a thermistor 62, which is temperature detecting means, and is in contact with the rear surface of the substrate.

The heater holder 61 holds the heater 60. In other words, the heater 60 and the heater holder 61 function as a nip forming member 60A, which includes a heating element to heat the film and is disposed on the inner side of the film. The pressure stay 63 is a rigid member (e.g. metal), and applies the pressing force received from the pressing means (not illustrated), such as a spring, to the pressure roller 15 via the heater holder 61. By this pressing force, the fixing nip F (nip unit) having a predetermined width is formed between the nip forming member 60A and the pressure roller 15 which are press-contacted sandwiching the fixing film 14.

In the fixing apparatus 13 of Embodiment 1, the heater 60 directly contacts the inner peripheral surface of the fixing film 14, but a plate or sheet type member having high thermal conductivity (e.g. sheet type member of which material is ferro-alloy or aluminum) may be disposed between the heater 60 and the fixing film 14. In other words, the nip forming member 60A used by the heater 60 may have a configuration to heat the fixing film 14 via a sliding member which slides on the inner peripheral surface of the fixing film 14.

In the fixing apparatus 13, if a print signal is inputted from an external input device (e.g. image scanner, host computer), the pressure roller 15 is rotary-driven in the arrow R1 direction (clockwise) by the motor 20 in FIG. 1 controlled by the control unit 40. Then the rotating force is transferred from the pressure roller 15 to the fixing film 14 by the friction force between the pressure roller 15 and the outer peripheral surface of the fixing film 14 at the fixing nip F. Thereby at the fixing nip F, the inner peripheral surface of the fixing film 14 is rotated in a state of sliding on the heater 60. Thus, the fixing film 14 moves and rotates around the nip forming member 60A in the arrow R2 direction (counterclockwise) at approximately the same speed as the moving speed of the peripheral surface of the pressure roller 15.

Further, in the fixing apparatus 13, the heat resistant layer of the heater 60 heats up by the power supplied from the control unit 40, which is connected to an AC power supply 30 (outlet) in FIG. 1, to a feeding electrode of the heater 60. Based on the information on the temperature of the heater 60 outputted from the thermistor 62, the control unit 40 controls the power supplied to the heater 60 using a triac (not illustrated) disposed on the control unit 40, whereby temperature of the heater 60 is controlled. In other words, if the temperature information from the thermistor 62 is lower than the target temperature (setting temperature) of the control, the control unit 40 increases power to be supplied to the heater 60, and if the temperature information from the thermistor 62 is higher than the control target temperature, the control unit 40 decreases the power to be supplied to the heater 60. In this way, control is performed based on the output of the thermistor 62, so that the temperature of the heater 60 becomes close to the control target temperature.

When the fixing film 14 enters the state of being rotated by the rotation of the pressure roller 15, and the heater 60 is heated up to a predetermined temperature, the recording material P on which the toner image has been transferred is conveyed from the transfer unit to the fixing nip F. By the recording material P, together with the fixing film 14, being nipped and conveyed through the fixing nip F, the heat of the heater 60 is transferred to the recording material P via the fixing film 14, and the unfixed toner image on the recording material P is heated and pressed, and is fixed to the recording material P. The recording material P which passed through the fixing nip F is separated from the fixing film 14 and is further conveyed.

(3) Setting Flow of Control Target Temperature

An operation related to setting of the control target temperature according to Embodiment 1 will be described next with reference to the flow chart in FIG. 3. In this flow, a temperature reduction amount of the fixing film, due to the toner on the recording material, is set as the toner amount history, and the control target temperature is set in accordance with the toner amount history.

A specific control flow will be described below. When a print signal is inputted to the image forming apparatus 1, the image forming apparatus 1 starts a control target temperature setting sequence (S100).

In the control target temperature setting sequence S100, a top end toner amount history counter Hcn (top), which indicates a film temperature reduction amount immediately before heat-processing the current paper in the fixing apparatus, is set (S101). Hcn (top) is a first value based on the toner amount information on each region of the first toner image formed on a preceding paper.

"current paper" (second recording material) refers to a recording material that is heat-processed next in the fixing apparatus, and "preceding paper" (first recording material) refers to a recording material that was heat-processed before the current paper. The toner amount history counter Hcth (top) is a top end toner amount history counter in an n-region, where n indicates a later mentioned toner amount history calculation region, and Hc1 (top) to Hc8 (top) corresponding to the eight regions are set. (top) indicates a timing state when the top end of the current paper, which is a recording material to be heat-processed next, enters the fixing apparatus.

The toner amount history counter sets the fixing film temperature when a recording material, on which there is no image (no toner), is heat-processed as a reference value (which is 0), and indicates an amount of the fixing film surface temperature reduced from the reference value due to the toner on the recording material.

In S101 for the first sheet after printing started, a toner amount history counter Hcth (top) and a maximum toner amount history counter Hcmax (top) are set to initial values (which are 0). For the second or later sheets to be printed continuously, the toner amount history counter and the maximum toner amount history counter are set in accordance with the toner amount history counter of the preceding paper, which will be described later. "preceding paper" here refers to a recording material which was heat-processed before the current paper. The toner amount history counter of the preceding paper will be described in detail later.

Then, based on the image information which the video controller received from the host computer, integrated toner amount information Stn is calculated in each toner amount history calculation region of the current paper, separated in the longitudinal direction of the recording material (S102). Stn is toner amount information fin each region of the second toner image formed on the current paper.

Figure 4:
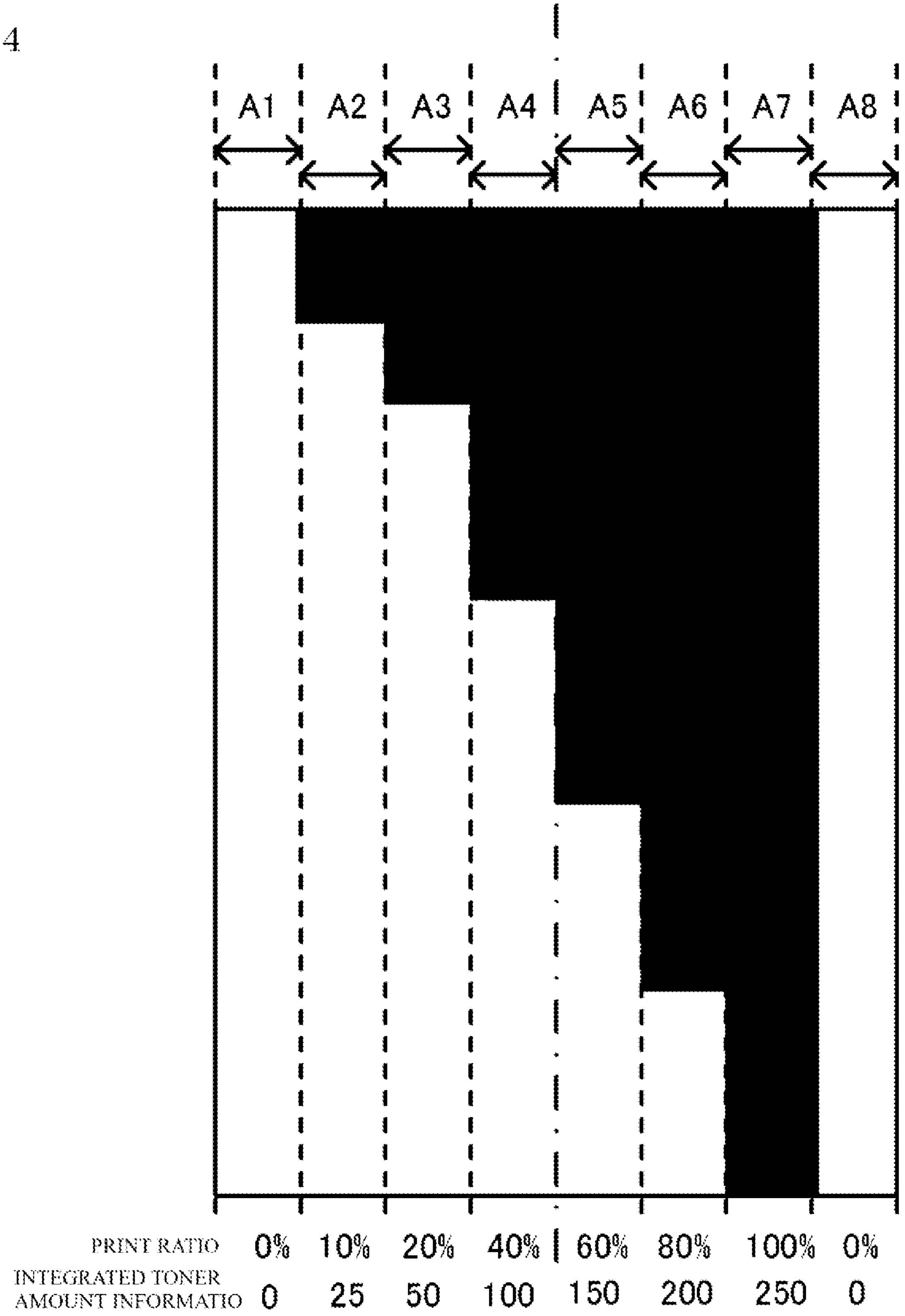
FIG. 4 is a schematic diagram of a toner amount history regions according to the present embodiment.

FIG. 4 is a schematic diagram of regions in which the toner amount history is calculated. The toner amount history calculation regions according to Embodiment 1 are defined as eight regions A1 to A8, which are separated with a 27 mm width respectively, so that the maximum paper feeding longitudinal width 216 mm is covered. These plurality of regions are regions which are separated in the direction perpendicular to the conveying direction of the current paper.

When the image information from an external device (e.g. host computer) is received by the video controller 120 of the image forming apparatus, the toner amount that is formed on each of the toner amount history calculation regions, A1 to A8, is integrated based on the image information, and is calculated as the integrated toner amount information St1 to St8.

The integrated toner amount information Stn is information indicating the total toner amount formed in this toner amount history calculation region (width: 27 mm), and the toner amount is expressed as a ratio to the toner amount of an image under the following reference value conditions (the toner amount of this image is set as 250). The image formed under the reference value conditions is an image when a toner image at the maximum density is formed throughout the entire toner amount history calculation region (width: 27 mm) in the longitudinal direction, with the length in the conveying direction at 297 mm (A4 sized length in the conveying direction).

FIG. 4 indicates a specific example of the image and the integrated toner amount information. FIG. 4 is an image example when a region, where the solid black image at the maximum density is printed, is changed, and indicates the solid black print ratio and the integrated toner amount information in each of the toner amount history calculation regions. As this example indicates, the total amount of toner formed in the region can be indicated by the integrated toner amount information Stn.

Then using the integrated toner amount information Stn of the current paper calculated in S102 and the top end toner amount history counter Hcn (top) immediately before the current paper, which was set in S101, a bottom end toner amount history counter Hcn (bottom) at the bottom end of the current paper is calculated (S103). Hcn (bottom) is a second value based on the toner amount information Stn in each region of the second toner image formed on the current paper.

First a counter saturation amount Csn is calculated from the integrated toner amount information Stn on the current paper. In the case of continuously forming images of the integrated toner amount information Stn, the heat of the fixing film is transferred to the toner on the recording materials, whereby temperature of the fixing film gradually decreases, and is finally saturated. This temperature reduction amount is the counter saturation amount Csn. The counter saturation amount Csn can be calculated by the approximate expression (Expression 1). In (Expression 1), n indicates the toner amount history calculation region, and Cs1 to Cs8 are calculated in the regions respectively. The unit is [° C.], and A and B are the following coefficients.

[Math. 1]

$$Csn = A \times Stn^2 + B \times Stn \quad \text{(Exprssion 1)}$$

$$A = -0.000103$$

$$B = 0.0785$$

For example, Table 1 indicates the counter saturation amount Csn in the image in FIG. 4. The image in FIG. 4 indicates the solid black images at maximum density formed on A4 sized paper, and it indicates the solid black print ratio in each toner amount history calculation region and corresponding toner amount information.

As indicated in Table 1, the counter saturation amount increases as the integrated toner amount information Stn increases, and it can indicate an amount when the heat on the fixing film is transferred to the toner on the recording material, and the surface temperature is reduced and saturated thereby.

TABLE 1

| Toner amount history calculation region | A1 | A2 | A3 | A4 | A5 | A6 | A7 | A8 |
|---|---|---|---|---|---|---|---|---|
| Solid black print ratio | 0% | 10% | 20% | 40% | 60% | 80% | 100% | 0% |
| Toner amount information | 0 | 25 | 50 | 100 | 150 | 200 | 250 | 0 |
| Counter saturation amount Csn | 0.0 | 1.8 | 3.5 | 6.6 | 9.1 | 11.0 | 12.5 | 0.0 |

Figure 29:
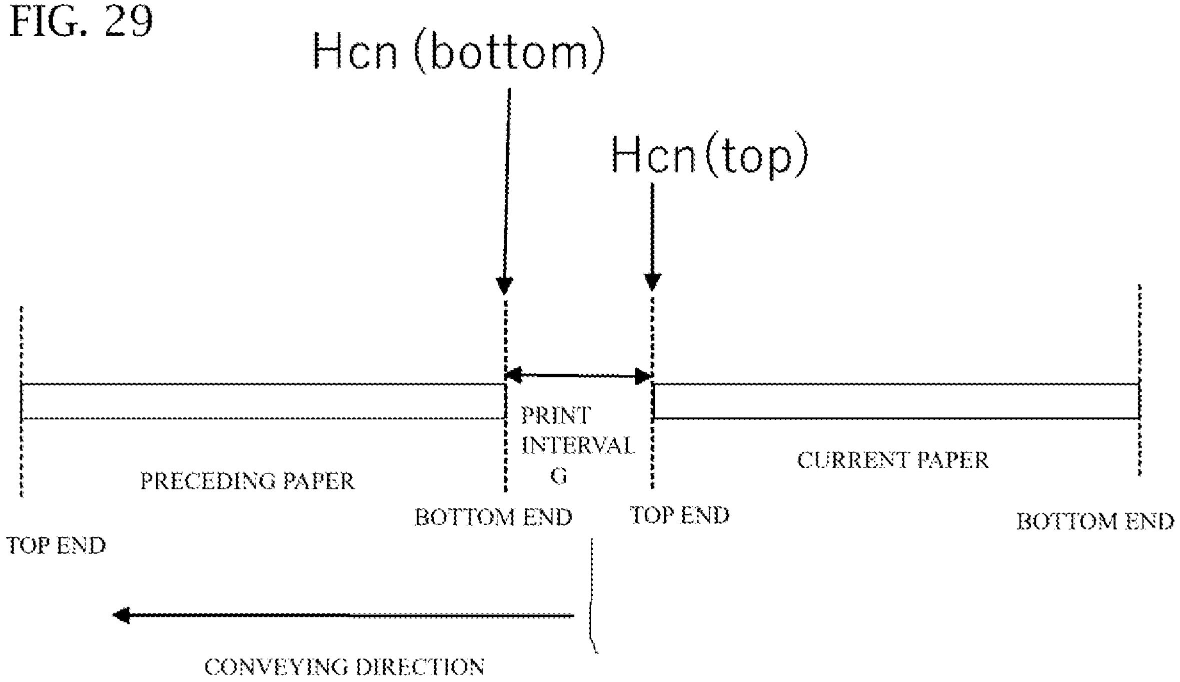
FIG. 29 is a diagram for describing a relationship of timings of toner amount history counters.

Then the bottom end toner amount history counter Hcn (bottom), which indicates the fixing film temperature reduction amount at the bottom end of the recording material of the current paper, is calculated. The bottom end toner amount history counter Hcn (bottom) is expressed by (Expression 2), where Hcn (top) is the top end toner amount history counter immediately before heat-processing of the current paper. The relationship of the timings of each toner amount history counter is indicated in FIG. 29.

[Math. 2]

$$Hcn\,(\text{bottom}) = Hcn\,(\text{top}) + \{Csn - Hcn(\text{top})\} \times C \quad \text{(Expression 2)}$$

$$C = 0.466$$

In (Expression 2), the fixing film temperature reduction amount at the bottom end of the current paper is calculated by adding {Csn-Hcn (top)}×C (fixing film temperature reduction amount due to the toner on the current paper) to Hcn (top) (top end toner amount history counter immediately before heat-processing of the current paper). The fixing film temperature reduction amount is approximated by multiplying the difference between Hcn (top) and Csn by a coefficient C.

Using this calculation expression, the bottom end toner amount history counter Hcn (bottom), which indicates the fixing film temperature reduction amount at the bottom end of the recording material in each region, is calculated.

Then the maximum value of the bottom end toner amount history counter Hcn (bottom) of each region, calculated in S103, is set as a maximum toner amount history counter Hcmax (bottom) of the current paper (S104). This indicates the maximum value of the fixing film temperature reduction amount due to toner on the current paper.

Next, a method for correcting the control target temperature when paper is fed, in accordance with the maximum toner amount history counter Hcmax (bottom) of the current paper calculated in S104, will be described (S105). In S105, the control unit 40 reads a reference control temperature Tfbase, which is preset for each print mode and stored in the ROM 41*a* as the reference of the control target temperature. Using this reference control temperature Tfbase, the control target temperature Tftgt to be the target temperature for control is determined in accordance with the maximum toner amount history counter Hcmax (bottom) of the current paper, which was calculated in S104.

The maximum toner amount history counter Hcmax (bottom) is the maximum value of the reduction amount of the fixing film surface temperature at the bottom end of the recording material of the current paper. Therefore in order to compensate for this reduction amount, a film history correction amount deltaHcmax [° C.] expressed by (Expression 3) is set. The control target temperature of the current paper is calculated by adding this film history correction amount deltaHcmax to the reference control temperature Tfbase (Expression 4).

[Math. 3]

$$deltaHcmax = Hcmax(\text{bottom}) \quad \text{(Expression 3)}$$

$$Tftgt = Tfbase + deltaHcmax \quad \text{(Expression 4)}$$

In S106, control is performed using the control target temperature Tftgt, whereby the toner on the recording material is thermally fixed. By a series of processing enclosed by the broken line in the flow chart, the temperature control for the current paper is performed.

Then in S107, it is determined whether or not there is subsequent paper to be printed after the current paper, and the print operation ends in S109 if there is no subsequent paper. If there is subsequent paper, processing advances to S108, and the control target temperature correction is continuously performed based on the toner amount history calculation.

Then in S108, the current paper is changed, and the top end toner amount history counter Hcn (top) of the current paper to be printed next is calculated and set in accordance with the bottom end toner amount history counter Hcn (bottom) and the recording material interval G (print interval) calculated in S105. The interval G is a conveying interval between the preceding paper and the current paper.

[Math. 4]

$$Hcn(\text{top}) = Hcn(\text{bottom}) \times D \quad \text{(Expression 5)}$$

In (Expression 5), using the bottom end toner amount history counter Hcn (bottom) at the bottom end of the preceding paper and print interval correction coefficient D, the top end toner amount history counter Hcn (top), immediately before the heat-processing of the current paper, is calculated.

Table 2 indicates the print interval correction coefficient D, which is a coefficient for the print interval G. The print interval correction coefficient D is a print interval correction coefficient determined by the interval G between the recording materials of the preceding paper and the current paper (hereafter print interval). The above mentioned bottom end toner amount history counter Hcn (bottom) indicates the fixing film temperature reduction amount due to toner, but at the recording material interval G (print interval), there is no toner, so the fixing film temperature gradually decreases toward 0, which is the reference value of the fixing film temperature when a recording material without toner is heat-processed.

In Table 2, the decrease of the film temperature reduction amount with respect to the print interval G is indicated by a print interval correction coefficient, where as the print interval is longer, the correction coefficient is smaller, and as the print interval is longer, the toner amount history counter of the preceding paper decreases in the print interval. The toner amount history counter Hcn (top) at the top end of the current paper in accordance with the length of the print interval can be calculated using (Expression 5).

TABLE 2

| Print interval G | Print interval correction coefficient D |
|---|---|
| G ≤ 50 mm | 1.00 |
| 50 mm < G ≤ 100 mm | 0.88 |
| 100 mm < G ≤ 150 mm | 0.77 |
| 150 mm < G ≤ 250 mm | 0.68 |
| 250 mm < G ≤ 350 mm | 0.53 |
| 350 mm < G ≤ 450 mm | 0.41 |
| 450 mm < G ≤ 600 mm | 0.32 |
| 600 mm < G ≤ 800 mm | 0.22 |
| 800 mm < G ≤ 1100 mm | 0.13 |
| 1100 mm < G ≤ 1400 mm | 0.07 |
| 1400 mm < G | 0.00 |

In the case where there is subsequent paper, the toner amount history counter setting immediately before the current paper is sequentially performed in S108 to S101, whereby the toner amount history calculation is continuously performed. In Embodiment 1, the control target temperature can be set in accordance with the toner amount history by the above mentioned control flow.

Figure 5:
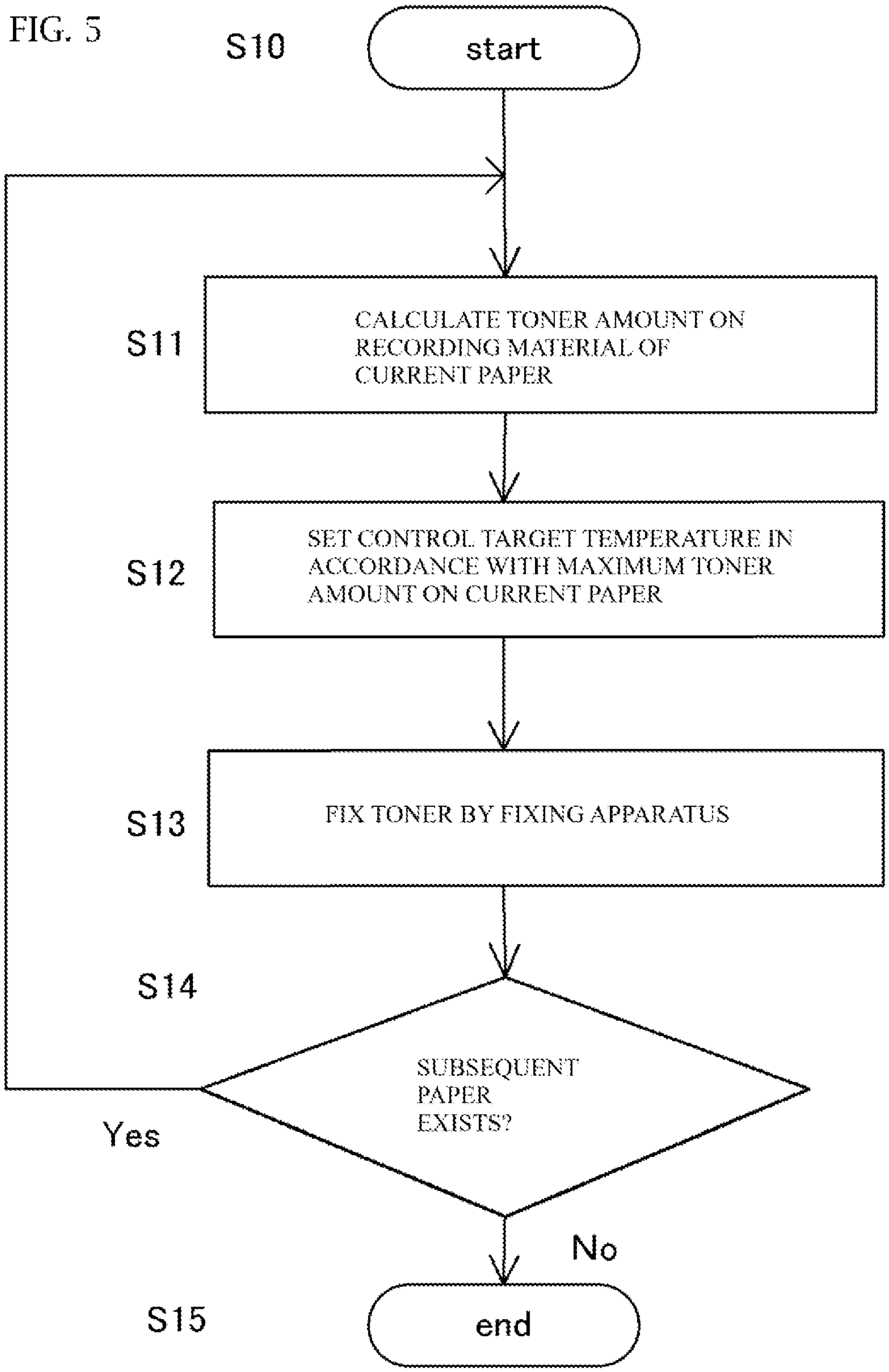
FIG. 5 is a flow chart of control according to a comparative example.

The effect of Embodiment 1 will be described next, using a comparative example. FIG. 5 is a flow of setting the control target temperature according to the comparative example. In the comparative example, the control target temperature is set using the toner amount information of the current paper alone.

When a print signal is inputted to the image forming apparatus 1, the image forming apparatus 1 starts a control target temperature setting sequence (S10).

Then a toner amount Stn on the current paper is calculated (S11). The calculation method for calculating the toner amount Stn here is the same as the calculation method used in S102 in Embodiment 1.

Then the control target temperature is set in accordance with the maximum toner amount Stmax of the current paper. The maximum toner amount Stmax is the maximum value of Stn in the calculation regions (S12). Table 3 indicates the relationship of the target temperature correction amount deltaStmax with respect to the maximum toner amount Stmax.

TABLE 3

| Toner amount information Stmax | Toner amount correction temperature detlaStmax |
|---|---|
| 0~15 | 0 |
| 16~45 | 1 |
| 46~80 | 2 |
| 81~115 | 3 |
| 116~160 | 4 |
| 161~220 | 5 |
| 221~225 | 6 |

Then the control unit 40 reads the reference value information on the control target temperature, which is preset for each print mode and is stored in the ROM 41*a*. For this reference value, the control target temperature Tftgt is determined in accordance with the target temperature correction amount deltaStmax with respect to the maximum toner amount Stmax of the current paper calculated in S11.

The control target temperature Tftgt is set using (Expression 6) based on the reference control temperature Tfbase.

[Math. 5]

$$Tftgt = Tfbase + deltaStmax \qquad \text{(Expression 6)}$$

In S13, the toner on the recording material is thermally fixed based on the control with the control target temperature Tftgt. Then in S14, it is determined whether or not there is subsequent paper to be printed after the current paper, and the present operation ends in S15 is there is no subsequent paper. If there is subsequent paper, processing advances to S11, and the control target temperature correction is continued by performing the toner amount calculation.

Next using an example of images indicated in FIGS. 6A and 6B, the fixing control target temperature setting and transition of the temperature of the fixing film, according to Embodiment 1 and the comparative example, will be described in detail.

Figure 6B:
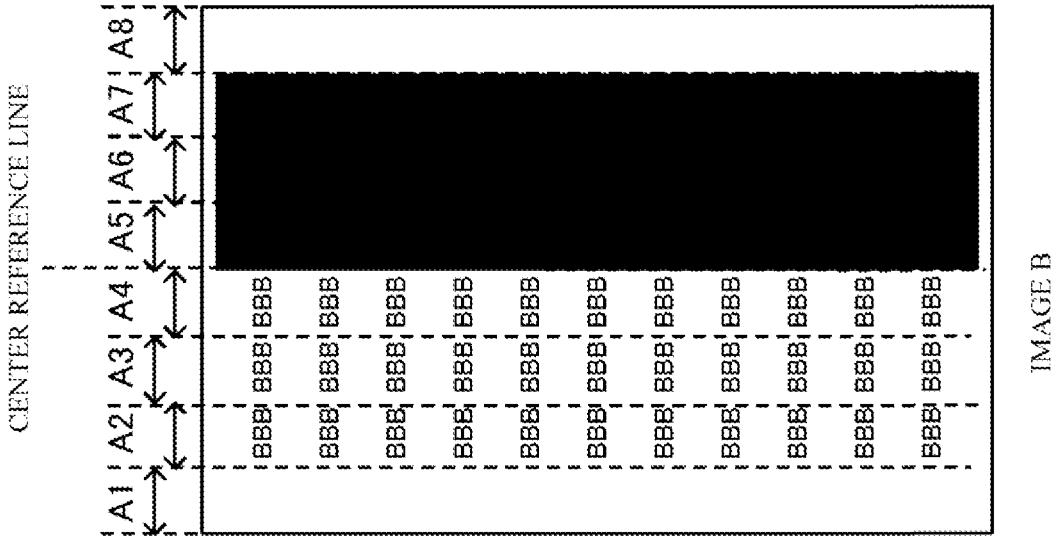
FIGS. 6A and 6B are schematic diagrams of an image used for Embodiment 1.
Figure 6A:
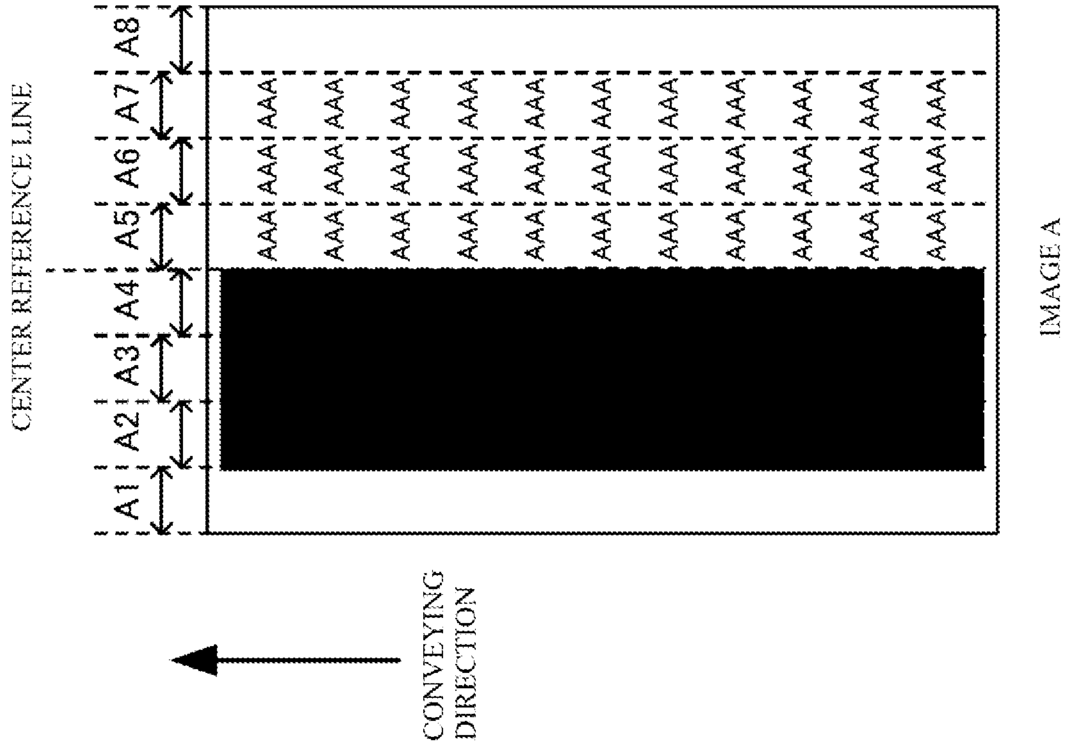
Figure 7:
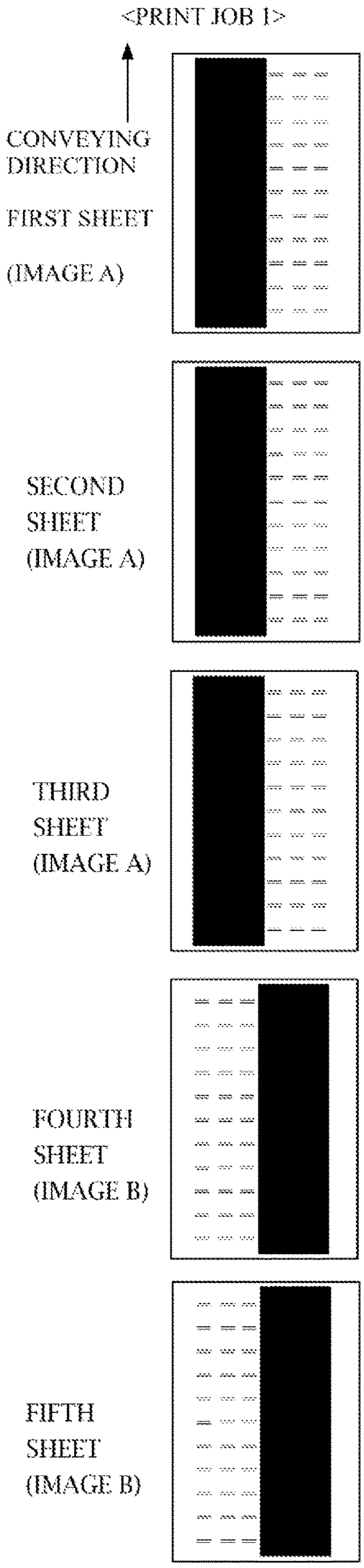
FIG. 7 is a schematic diagram depicting a transition of an image used for Embodiment 1.

FIGS. 6A and 6B are schematic diagrams of the images used for Embodiment 1 and the comparative example. On the A4 sized recording materials, the illustrated image A and image B are formed. FIG. 7 is a schematic diagram depicting a transition of images of the print job, where three sheets of the image A and two sheets of the image B were formed continuously. The interval G of the recording materials is 30 mm.

In the image A, a black image (solid black) at maximum density is formed in the toner amount history calculation regions A2 to A4. The print ratio is 97%, since the top end 5 mm and the bottom end 5 mm are blank where no toner exists. Further, a text image (print ratio: 5%) is formed in the toner amount history calculation regions A5 to A7. In the image B, a text image (print ratio: 5%) is formed in the toner amount history calculation regions A2 to A4, and a black image (solid black) at the maximum density is formed in the toner amount history calculation regions A5 to A7. The print ratio is 97%, since the top end 5 mm and the bottom end 5 mm are blank, where no toner exists.

Figure 3:
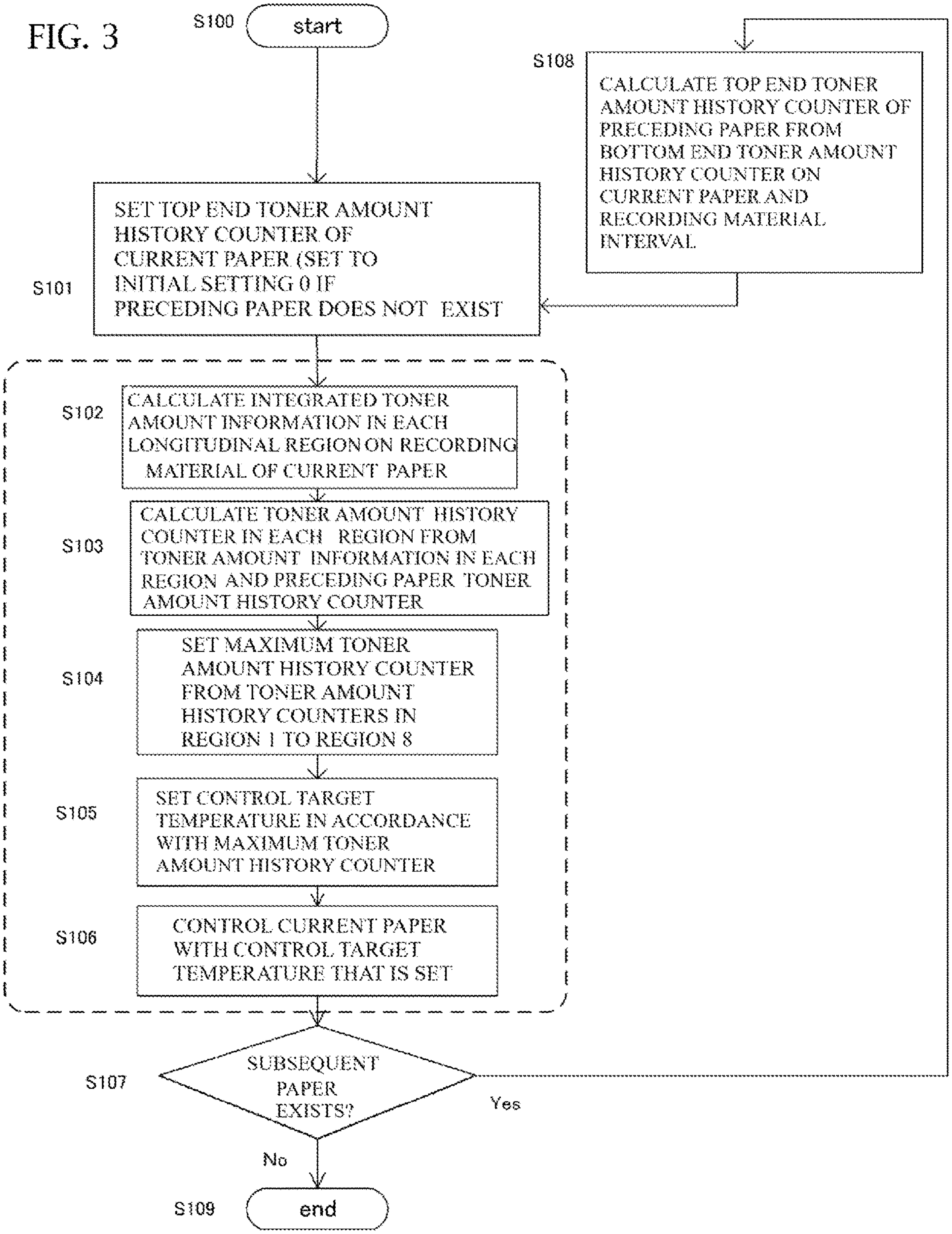
FIG. 3 is a flow chart of control according to Embodiment 1.

Table 4 indicates the calculation of the toner amount history counter and the control target temperature according to Embodiment 1, which are calculated by the target temperature setting flow in Embodiment 1 indicated in FIG. 3. In Table 4, "Calculation region" means "Toner amount history calculation region", "Film correction" means "Film history correction amount", "Target temp." means "Control target temperature", "PR" means "Print ratio", "Stn" means "Toner amount information Stn", "Csn" means "Counter saturation amount Csn", and "Hcn (bottom)" means "Toner amount history counter Hcn (bottom)".

TABLE 4

| | Calculation region | Calculation region A1 | A2 | A3 | A4 | A5 | A6 | A7 | A8 | Film correction deltaHc [° C.] | Target temp. Tftgt [° C.] |
|---|---|---|---|---|---|---|---|---|---|---|---|
| 1st Sheet | PR | 0% | 97% | 97% | 97% | 5% | 5% | 5% | 0% | 6 | 176 |
| | Stn | 0 | 242 | 242 | 242 | 13 | 13 | 13 | 0 | | |
| | Csn | 0.0 | 12.3 | 12.3 | 12.3 | 1.0 | 1.0 | 1.0 | 0.0 | | |
| | Hcn (bottom) | 0.0 | 5.7 | 5.7 | 5.7 | 0.5 | 0.5 | 0.5 | 0.0 | | |
| 2nd Sheet | PR | 0% | 97% | 97% | 97% | 5% | 5% | 5% | 0% | 9 | 179 |
| | Stn | 0 | 242 | 242 | 242 | 13 | 13 | 13 | 0 | | |
| | Csn | 0.0 | 12.3 | 12.3 | 12.3 | 1.0 | 1.0 | 1.0 | 0.0 | | |
| | Hcn (bottom) | 0.0 | 8.8 | 8.8 | 8.8 | 0.7 | 0.7 | 0.7 | 0.0 | | |
| 3rd Sheet | PR | 0% | 97% | 97% | 97% | 5% | 5% | 5% | 0% | 11 | 181 |
| | Stn | 0 | 242 | 242 | 242 | 13 | 13 | 13 | 0 | | |
| | Csn | 0.0 | 12.3 | 12.3 | 12.3 | 1.0 | 1.0 | 1.0 | 0.0 | | |
| | Hcn (bottom) | 0.0 | 10.4 | 10.4 | 10.4 | 0.8 | 0.8 | 0.8 | 0.0 | | |
| 4th Sheet | PR | 0% | 5% | 5% | 5% | 97% | 97% | 97% | 0% | 7 | 177 |
| | Stn | 0 | 13 | 13 | 13 | 242 | 242 | 242 | 0 | | |
| | Csn | 0.0 | 1.0 | 1.0 | 1.0 | 12.3 | 12.3 | 12.3 | 0.0 | | |
| | Hcn (bottom) | 0.0 | 6.0 | 6.0 | 6.0 | 6.2 | 6.2 | 6.2 | 0.0 | | |
| 5th Sheet | PR | 0% | 5% | 5% | 5% | 97% | 97% | 97% | 0% | 9 | 179 |
| | Stn | 0 | 13 | 13 | 13 | 242 | 242 | 242 | 0 | | |
| | Csn | 0.0 | 1.0 | 1.0 | 1.0 | 12.3 | 12.3 | 12.3 | 0.0 | | |
| | Hcn (bottom) | 0.0 | 3.7 | 3.7 | 3.7 | 9.0 | 9.0 | 9.0 | 0.0 | | |

First, for the first sheet of image A (current paper), the toner amount history counter Hen (bottom) is calculated based on the integrated toner amount information in the toner amount history calculation regions A1 to A8. The maximum value of the calculated toner amount history counter is 5.7 in the regions A2, A3 and A4. Hence, the film temperature correction amount deltaHc of the first sheet becomes 6° C., and based on (Expression 4), the control target temperature Tftgt determined by adding deltaHc 6° C. to the reference control temperature Tfbase 170° C. is set to 176° C. The film temperature correction amount deltaHc and the control target temperature Tftgt are set in 1° C. units.

Then the preceding paper toner amount history counter Hcn (top) is calculated and set based on the bottom end toner amount history counter Hcn (bottom) calculated for the first sheet. In this configuration, the recording material interval G is 30 mm, and the print interval correction amount D is 1.0, which is calculated using (Expression 5).

Then the toner amount history counter Hcn (bottom) for the second sheet is calculated. The maximum value of the calculated toner amount history counter is 8.8° C. in the regions A2, A3 and A4. Hence, the film temperature correction amount deltaHc for the second sheet becomes 9° C., and the control target temperature is set to 179° C. The toner amount history counter is sequentially calculated like this, whereby the control target temperature Tftgt is set.

For the fourth sheet, the image is changed, and the maximum value of the calculated toner amount history counter becomes the value in the regions A5, A6, and A7. Although the position of the maximum value of the toner amount history on the recording material is changed, the control target temperature Tftgt is set as Table 4 using the maximum toner amount history counter.

Next, Table 5 indicates the toner amount history counter and the control target temperature according to the comparative example, calculated by the target temperature setting flow of the comparative example indicated in FIG. 5. In Table 5, “Calculation region” means “Toner amount history calculation region”, “Film correction” means “Film history correction amount”, “Target temp.” means “Control target temperature”, “PR” means “Print ratio”, “Stn” means “Toner amount information Stn”.

TABLE 5

| | Calculation region | Calculation region | | | | | | | | Film correction deltaSt | Target temp. Tftgt |
|---|---|---|---|---|---|---|---|---|---|---|---|
| | region | A1 | A2 | A3 | A4 | A5 | A6 | A7 | A8 | [° C.] | [° C.] |
| 1st | PR | 0% | 97% | 97% | 97% | 5% | 5% | 5% | 0% | 6 | 176 |
| Sheet | Stn | 0 | 242 | 242 | 242 | 13 | 13 | 13 | 0 | | |
| 2nd | PR | 0% | 97% | 97% | 97% | 5% | 5% | 5% | 0% | 6 | 176 |
| Sheet | Stn | 0 | 242 | 242 | 242 | 13 | 13 | 13 | 0 | | |
| 3rd | PR | 0% | 97% | 97% | 97% | 5% | 5% | 5% | 0% | 6 | 176 |
| Sheet | Stn | 0 | 242 | 242 | 242 | 13 | 13 | 13 | 0 | | |
| 4th | PR | 0% | 5% | 5% | 5% | 97% | 97% | 97% | 0% | 6 | 176 |
| Sheet | Stn | 0 | 13 | 13 | 13 | 242 | 242 | 242 | 0 | | |
| 5th | PR | 0% | 5% | 5% | 5% | 97% | 97% | 97% | 0% | 6 | 176 |
| Sheet | Stn | 0 | 13 | 13 | 13 | 242 | 242 | 242 | 0 | | |

In the comparative example, the control target temperature is set in accordance with the maximum toner amount Stmax on the current paper. For the first to third sheets, the maximum toner amount Stmax is in the regions A2, A3 and A4, where the target temperature correction amount deltaStmax becomes 6° C. This value is added to the reference control temperature 170° C., and the control temperature is set to 176° C. using (Expression 4). For the second to fifth sheets as well, the target temperature correction amount deltaStmax becomes 6° C., and the control target temperature is set to 176° C.

Figure 8A:
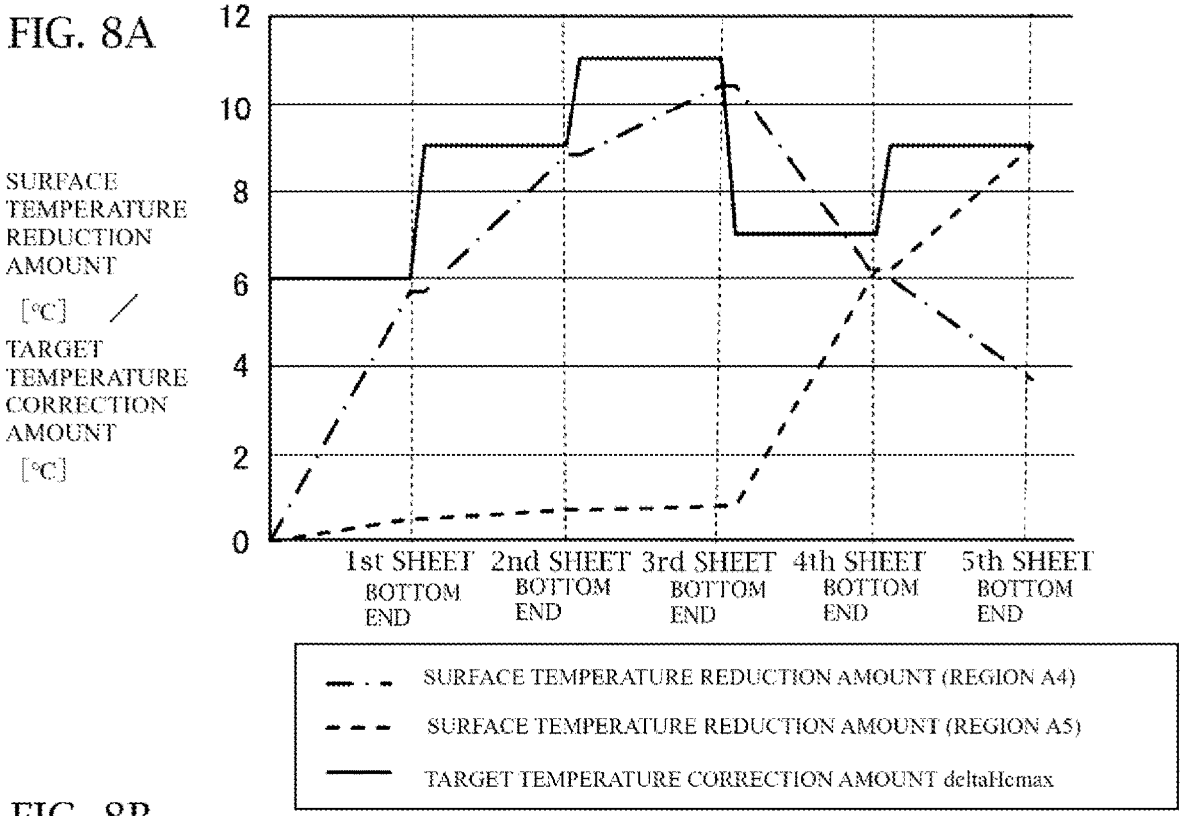
FIGS. 8A and 8B are graphs for describing a control target temperature according to Embodiment 1.
Figure 8B:
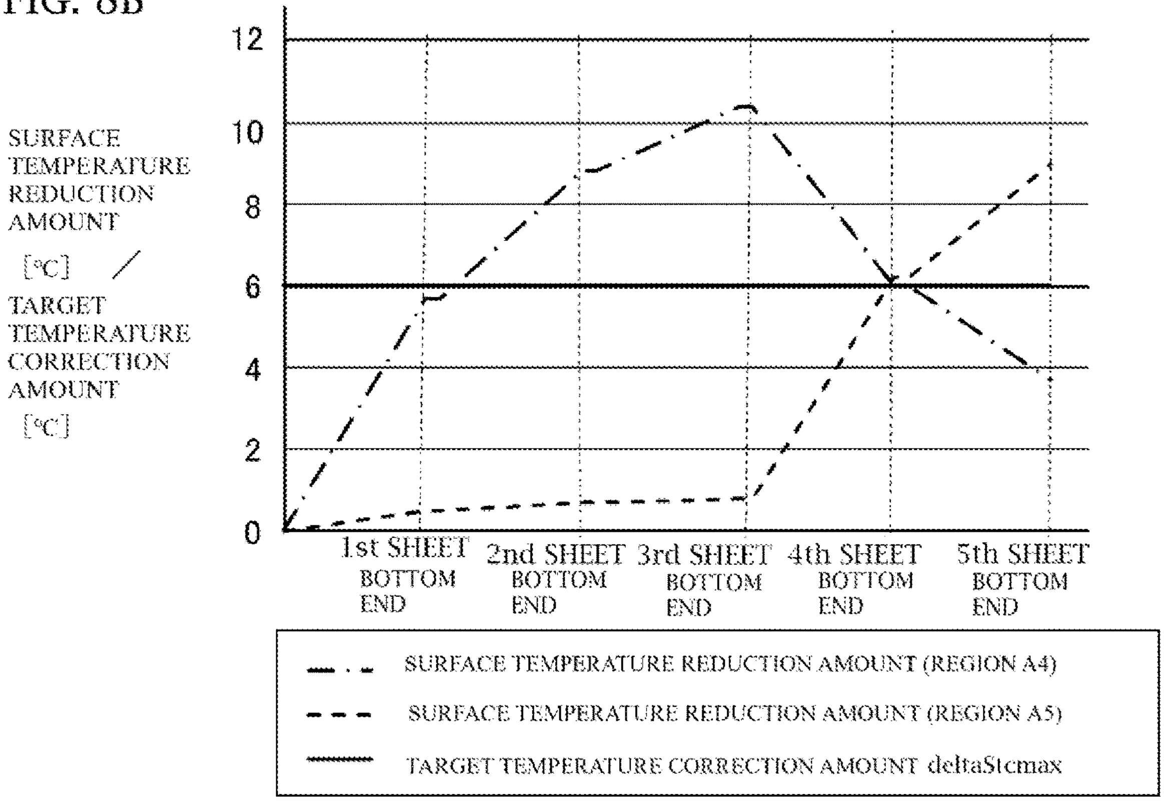

FIGS. 8A and 8B indicate the respective transition of the control target temperature and the surface temperature reduction amount of the fixing film when images are formed based on the control in Embodiment 1 and comparative example described above.

FIG. 8A is a graph indicating the target temperature correction amount and the surface temperature reduction amount due to toner in representative regions A4 and A5 according to Embodiment 1. The abscissa indicates timings when the bottom ends of the first to fifth sheets of the recording materials pass. In region A4, where the solid black images having high toner amount on the first to third sheets pass, the film surface temperature reduction amount increases up to 10.4° C. Further, in region A5, where the solid black images having high toner amounts on the fourth and fifth sheets pass, the film surface temperature reduction amount increases up to 9.0° C.

In Embodiment 1, however, for all the print states of the first to fifth sheets, the target temperature correction amount is set to an amount to compensate for the film surface temperature reduction amount, based on the toner amount history counter, including the preceding recording material. Therefore, the film surface temperature required for ensuring the fixing performance can be maintained.

Table 6 is the result of checking for the generation of an image defect, to confirm the effect of the invention. The experiment was performed under a 23° C. temperature environment. O indicates that no image defect was generated, and X indicates that heat was insufficient and a fixing failure was generated.

As indicated in Table 6, the fixing performance to fix the toner to the recording material was ensured, and no image defects, such as a fixing failure, was generated. In Table 6, “Calculation region” means “Toner amount history calculation region”, “Target temp.” means “Control target temperature”.

TABLE 6

| | Calculation region | | | | | | | | Target Temp. Tftgt |
|---|---|---|---|---|---|---|---|---|---|
| Embodiment 1 | A1 | A2 | A3 | A4 | A5 | A6 | A7 | A8 | [° C.] |
| 1st Sheet | ○ | ○ | ○ | ○ | ○ | ○ | ○ | ○ | 176 |

TABLE 6-continued

| Embodiment 1 | Calculation region A1 | A2 | A3 | A4 | A5 | A6 | A7 | A8 | Target Temp. Tftgt [° C.] |
|---|---|---|---|---|---|---|---|---|---|
| 2nd Sheet | ○ | ○ | ○ | ○ | ○ | ○ | ○ | ○ | 179 |
| 3rd Sheet | ○ | ○ | ○ | ○ | ○ | ○ | ○ | ○ | 181 |
| 4th Sheet | ○ | ○ | ○ | ○ | ○ | ○ | ○ | ○ | 177 |
| 5th Sheet | ○ | ○ | ○ | ○ | ○ | ○ | ○ | ○ | 179 |

○: no image defects generated
x: fixing failure generated

FIG. 8B, on the other hand, is a graph indicating the target temperature correction amount and the film surface reduction amount in representative regions A4 and A5, according to the comparative example. In the case of the comparative example, the target temperature correction amount is determined based on the toner amount information on the current paper alone, hence the target temperature correction amount for the first to fifth sheets is 6° C. However, the film temperature reduction amount increases up to 10.4° C. in region A4 on the third sheet, and the film temperature reduction amount also increases up to 10.4° C. in region A5 on the fifth sheet, since images having high toner amount passed continuously. Therefore, on the second, third and fifth sheets, the film surface temperature reduction amount exceeds the target temperature correction amount, and the film surface temperature required to ensure the fixing performance cannot be maintained. As a result, a fixing failure is generated. In Table 7, “Calculation region” means “Toner amount history calculation region”, “Target temp.” means “Control target temperature”.

TABLE 7

| Comparative example | Calculation region A1 | A2 | A3 | A4 | A5 | A6 | A7 | A8 | Target Temp. Tftgt [° C.] |
|---|---|---|---|---|---|---|---|---|---|
| 1st Sheet | ○ | ○ | ○ | ○ | ○ | ○ | ○ | ○ | 176 |
| 2nd Sheet | ○ | x | x | x | ○ | ○ | ○ | ○ | 176 |
| 3rd Sheet | ○ | x | x | x | ○ | ○ | ○ | ○ | 176 |
| 4th Sheet | ○ | ○ | ○ | ○ | ○ | ○ | ○ | ○ | 176 |
| 5th Sheet | ○ | ○ | ○ | ○ | x | x | x | ○ | 176 |

○: no image defects generated
x: fixing failure generated

Next, using the images and paper feeding states indicated in FIGS. 9A to 9C, the control target temperature setting according to Embodiment 1, in printing states with different recording material intervals, will be described in detail.

Figure 9A:
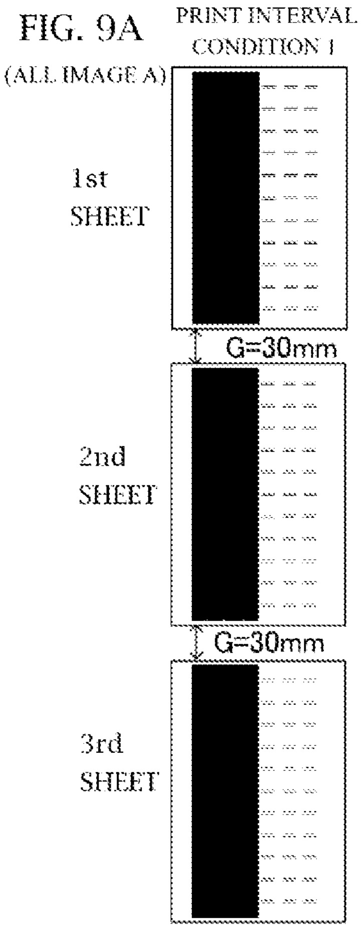
FIGS. 9A to 9C are schematic diagrams of an image used for Embodiment 1 and paper feeding conditions.
Figure 9B:
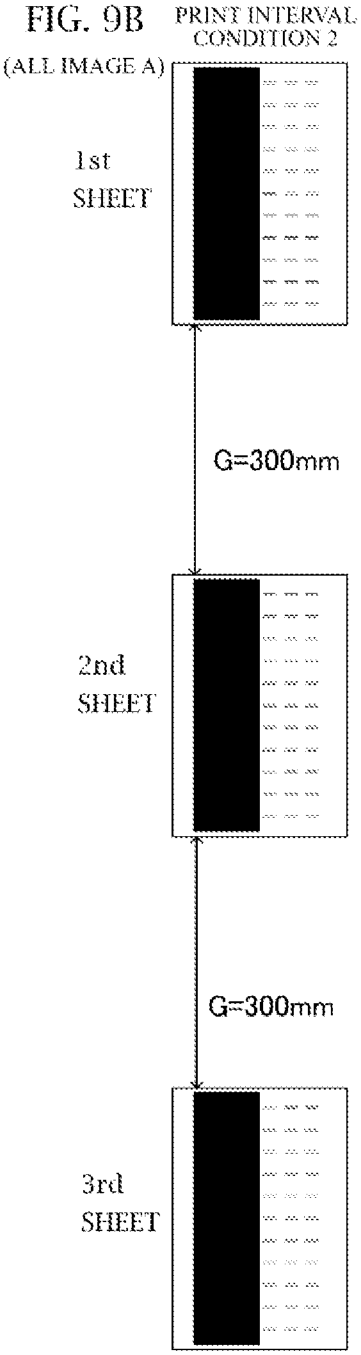
Figure 9C:
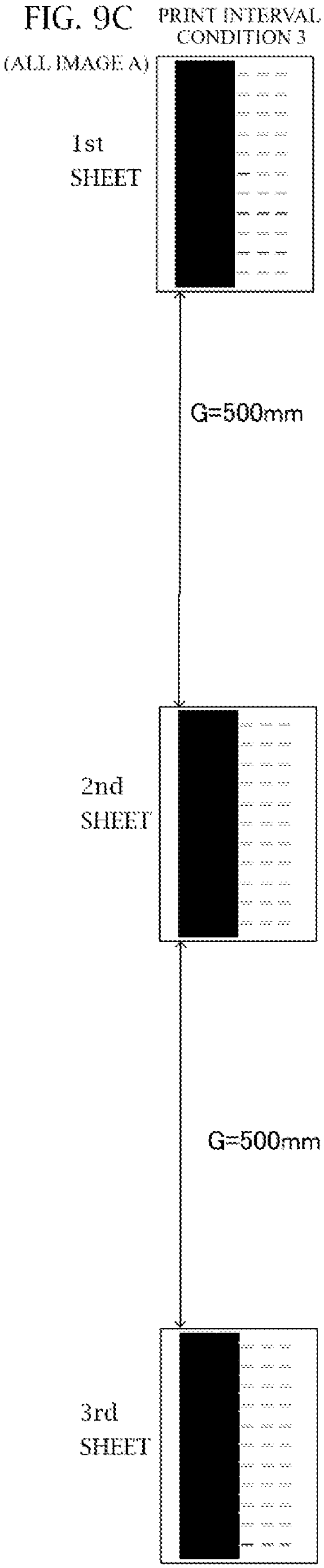

FIGS. 9A to 9C are schematic diagrams depicting printing states in accordance with the recording material interval G (print interval) between a recording material and a recording material according to Embodiment 1. The print interval condition 1 indicates the print state with print interval 30 mm (normal print), the print interval condition 2 indicates the print state with print interval 300 mm, which is longer than the normal print interval, and the print interval condition 3 indicates the print state with the print interval 500 mm. In each case, an image A formed on each recording material is performed on three sheets continuously.

Table 8 (8-1 to 8-3) indicates the transition of the toner amount history counter in each region, and the control target temperature set value when paper was fed continuously with the above print interval setting. Table 8 indicates data corresponding to the print interval conditions 1 to 3 (8-1 to 8-3) sequentially from the top. In Table 8, “Target temp.” means “Control target temperature”, “Hcn (bottom)” means “Toner amount history counter Hcn (bottom)”.

TABLE 8

| (8-1) | Interval 30 mm | A1 | A2 | A3 | A4 | A5 | A6 | A7 | A8 | Target Temp. |
|---|---|---|---|---|---|---|---|---|---|---|
| 1st Sheet | Hcn(bottom) | 0.0 | 5.7 | 5.7 | 5.7 | 0.5 | 0.5 | 0.5 | 0.0 | 176 |
| 2nd Sheet | Hcn(bottom) | 0.0 | 8.8 | 8.8 | 8.8 | 0.7 | 0.7 | 0.7 | 0.0 | 179 |
| 3rd Sheet | Hcn(bottom) | 0.0 | 10.4 | 10.4 | 10.4 | 0.8 | 0.8 | 0.8 | 0.0 | 181 |
| (8-2) | Interval 300 mm | A1 | A2 | A3 | A4 | A5 | A6 | A7 | A8 | Target Temp. |
| 1st Sheet | Hcn(bottom) | 0.0 | 5.7 | 5.7 | 5.7 | 0.5 | 0.5 | 0.5 | 0.0 | 176 |
| 2nd Sheet | Hcn(bottom) | 0.0 | 7.4 | 7.4 | 7.4 | 0.6 | 0.6 | 0.6 | 0.0 | 178 |
| 3rd Sheet | Hcn(bottom) | 0.0 | 7.8 | 7.8 | 7.8 | 0.6 | 0.6 | 0.6 | 0.0 | 178 |
| (8-3) | Interval 500 mm | A1 | A2 | A3 | A4 | A5 | A6 | A7 | A8 | Target Temp. |
| 1st Sheet | Hcn(bottom) | 0.0 | 5.7 | 5.7 | 5.7 | 0.5 | 0.5 | 0.5 | 0.0 | 176 |
| 2nd Sheet | Hcn(bottom) | 0.0 | 6.7 | 6.7 | 6.7 | 0.5 | 0.5 | 0.5 | 0.0 | 177 |
| 3rd Sheet | Hcn(bottom) | 0.0 | 6.9 | 6.9 | 6.9 | 0.5 | 0.5 | 0.5 | 0.0 | 177 |

Figure 10:
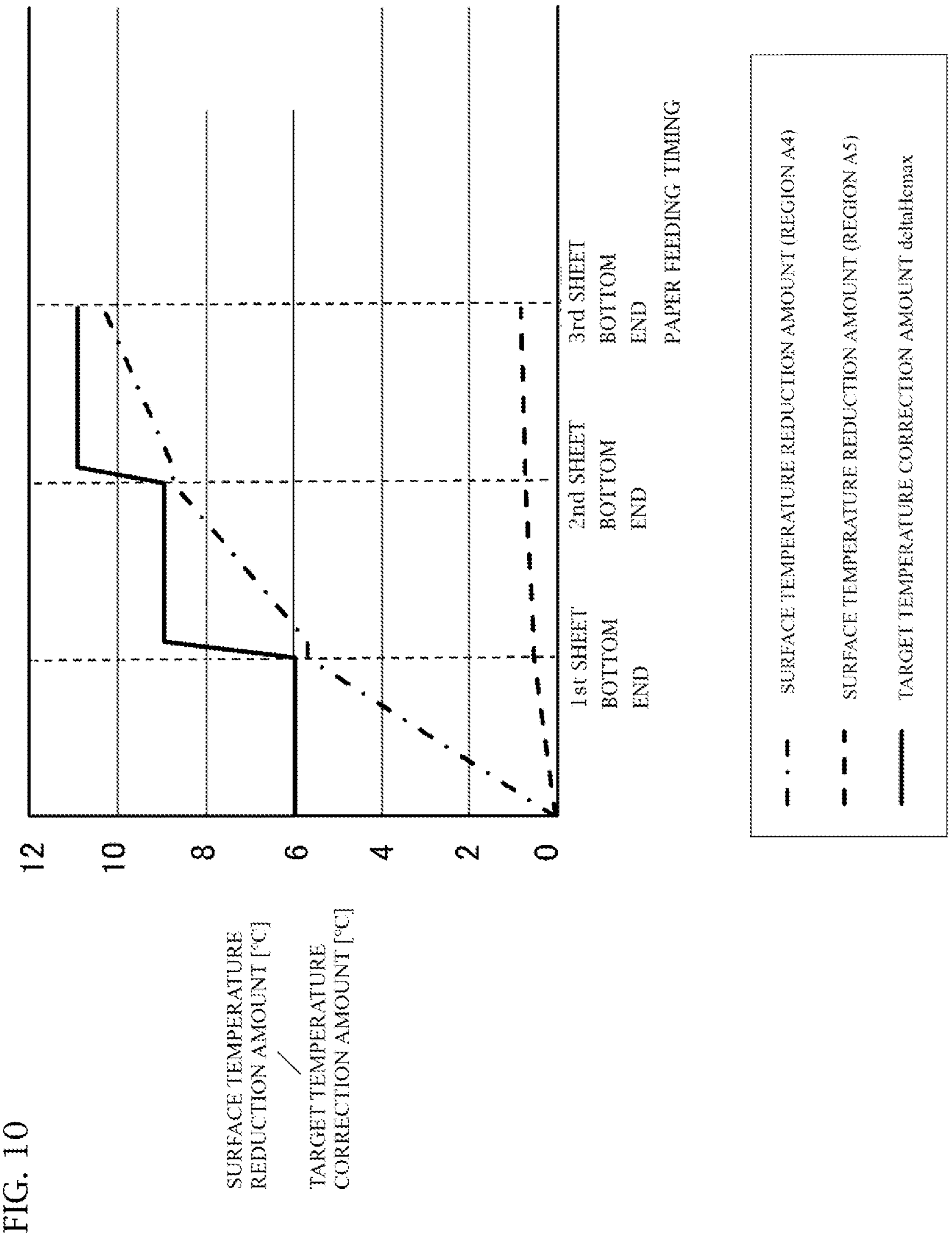
FIG. 10 is a graph for describing a control target temperature according to Embodiment 1.
Figure 11:
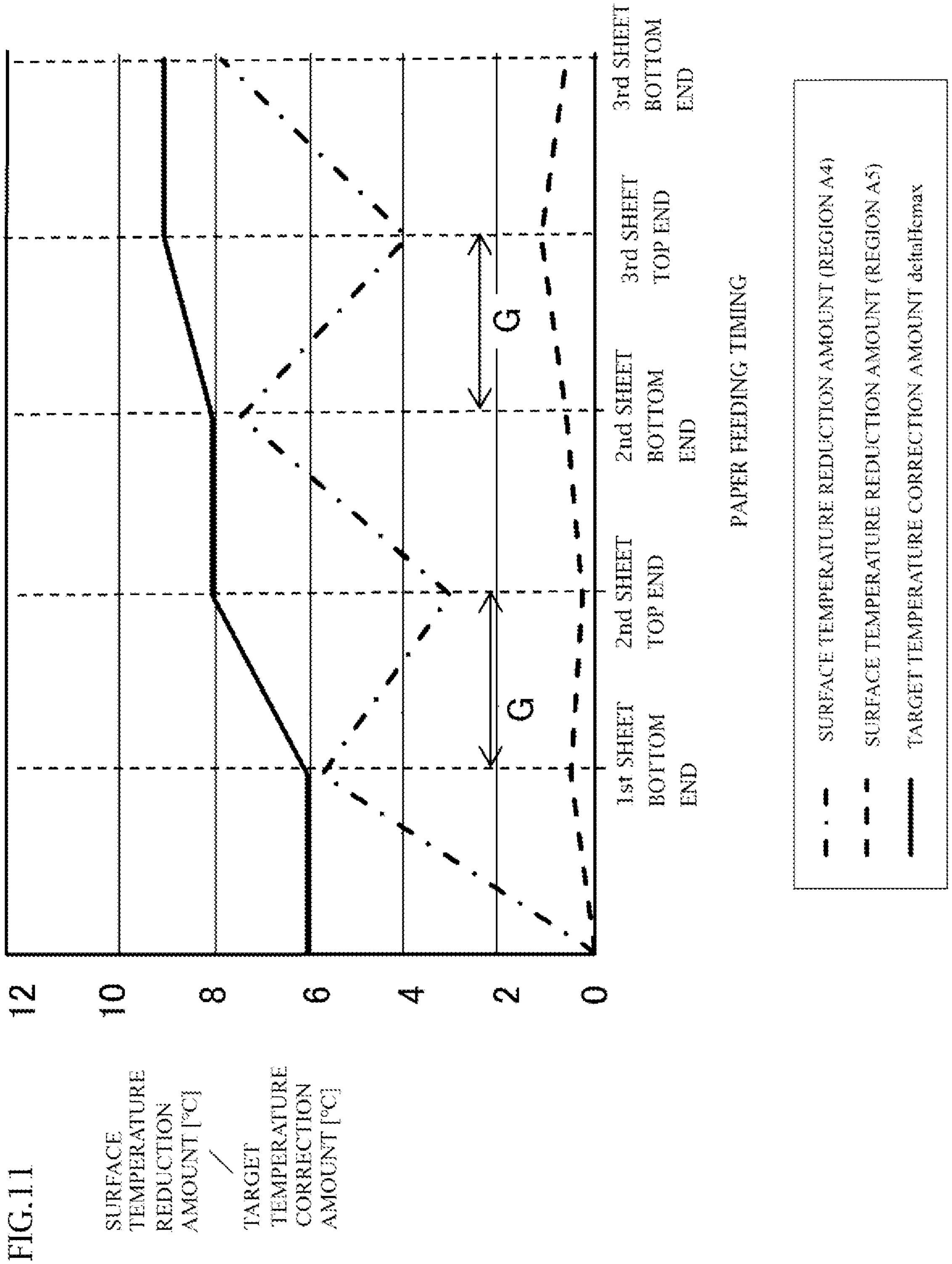
FIG. 11 is a continuation of the graph for describing the control target temperature according to Embodiment 1.
Figure 12:
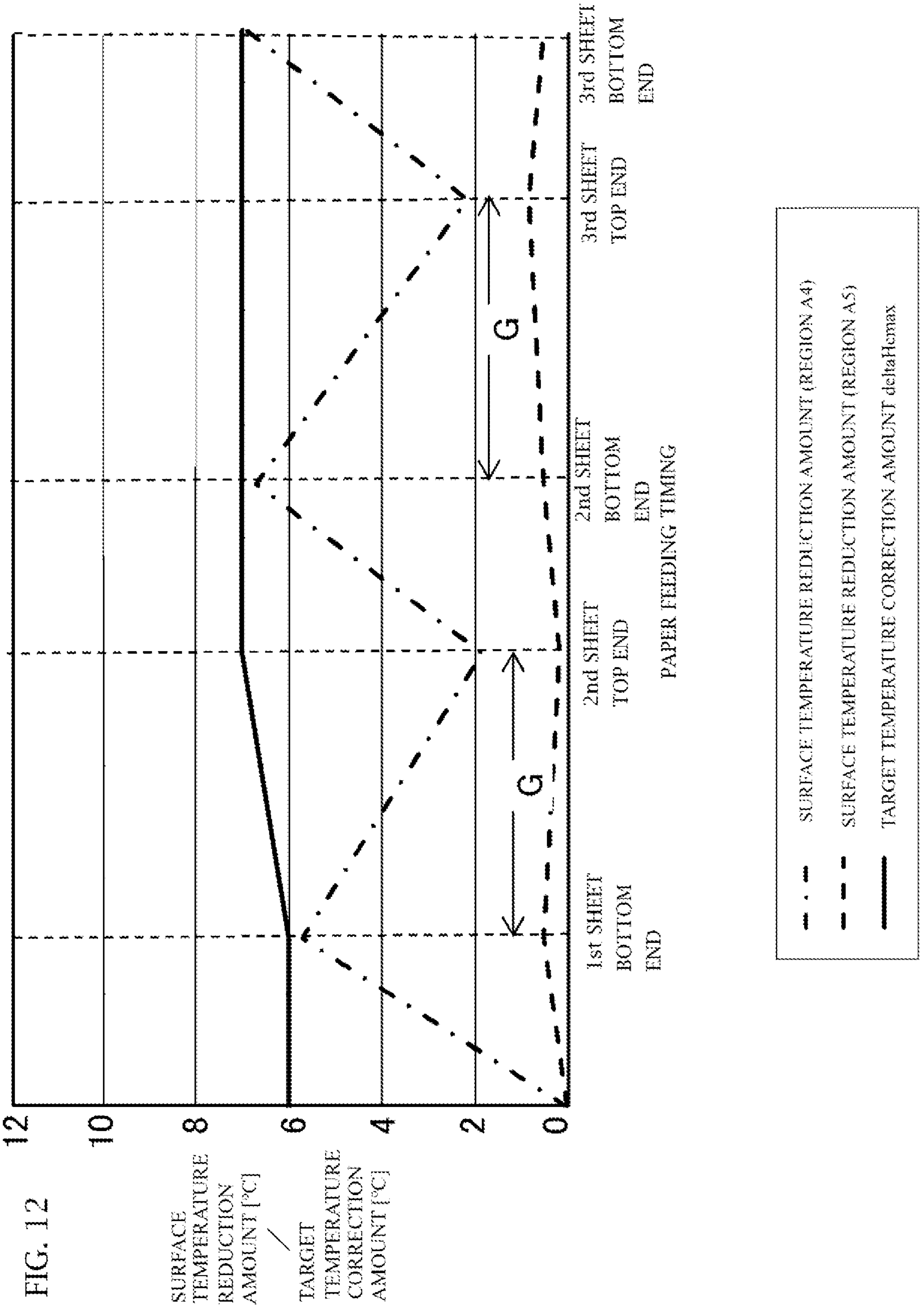
FIG. 12 is a continuation of the graph for describing the control target temperature according to Embodiment 1.

FIGS. 10 to 12 indicate the transition of the control target temperature and the film surface temperature reduction amount when images are formed based on the control flow in Embodiment 1 with the above mentioned recording material interval setting.

FIG. 10 is a graph indicating the target temperature correction amount and the film surface temperature reduction amount in the representative regions A4 and A5 according to Embodiment 1. FIG. 10 is a case of the normal print interval 30 mm, and in the region A4, where the solid black image having high toner amount passes, the film surface temperature reduction amount increases up to 10.4° C.

In Embodiment 1, however, for all the print states of the first to third sheets, the target temperature correction amount is set to an amount to compensate for the film surface temperature reduction amount, based on the toner amount history counter, including the preceding recording material. The control target temperature for the second sheet is set to 179° C., and the control target temperature of the third sheet is set to 181° C. Therefore the film surface temperature required for ensuring the fixing performance can be maintained.

FIG. 11, on the other hand, is a case where the print interval setting is 300 mm, which is longer than the normal print interval setting, and in region A4, where the solid black images having high toner amount pass when a recording material is fed, the film temperature reduction amount increases. However, in the print intervals, where heat is not transferred to the recording material and toner, the film surface temperature reduction amount decreases. In Embodiment 1, the print interval correction coefficient D is set in accordance with the print interval, and the target temperature correction amount is set based on the toner amount history counter of the preceding paper, including the print interval. Hence for all the print states of the first sheet to the third sheet, the target temperature correction amount is set to an amount to compensate for the film surface temperature reduction amount, based on the toner amount history counter, including the preceding recording material. The control target temperature for the second sheet is set to 178° C., and the control target temperature for the third sheet is set to 178° C., which are controlled with target temperature settings lower than the case of the normal print interval 30 mm. Therefore the fixing performance to fix the toner to the recording material is ensured without generating a fixing failure and the like, and power consumption can be reduced by performing an optimum target temperature setting in accordance with the print interval.

In the same manner, FIG. 12 is a case where the print interval setting is 500 mm, which is longer than the normal print interval setting, and in this case as well, for all the print states of the first sheet to the third sheet, the target temperature correction amount is set to an amount to compensate for the film surface temperature reduction amount, based on the toner amount history counter, including the preceding recording material. The control target temperature for the second sheet is set to 177° C., and the control target temperature for the third sheet is set to 177° C., which are controlled with the target temperature settings lower than the case of the normal print interval 30 mm in accordance with the print interval.

As described above, for all the print states, the target temperature can be set in accordance with the toner amount on the recording material and the fixing performance can be ensured, whereby the generation of an image defect can be suppressed. Further, power can be conserved without consuming wasteful power, since the correction amount can be calculated in accordance with the interval of the recording materials, and the control target temperature can be set thereby.

Embodiment 2

Embodiment 2 of the present invention will be described next. The configuration of the image forming apparatus and basic operations thereof are the same as Embodiment 1, hence description thereof will be omitted. Embodiment 2 is characterized in that the fixing target temperature is set in accordance with the toner amount history counters in the temperature detection region and the maximum toner amount region.

(1) Fixing Apparatus

The configuration of the fixing apparatus will be described next with reference to FIG. 13. Basic configuration and operation are the same as Embodiment 1, hence description thereof will be omitted.

Figure 13:
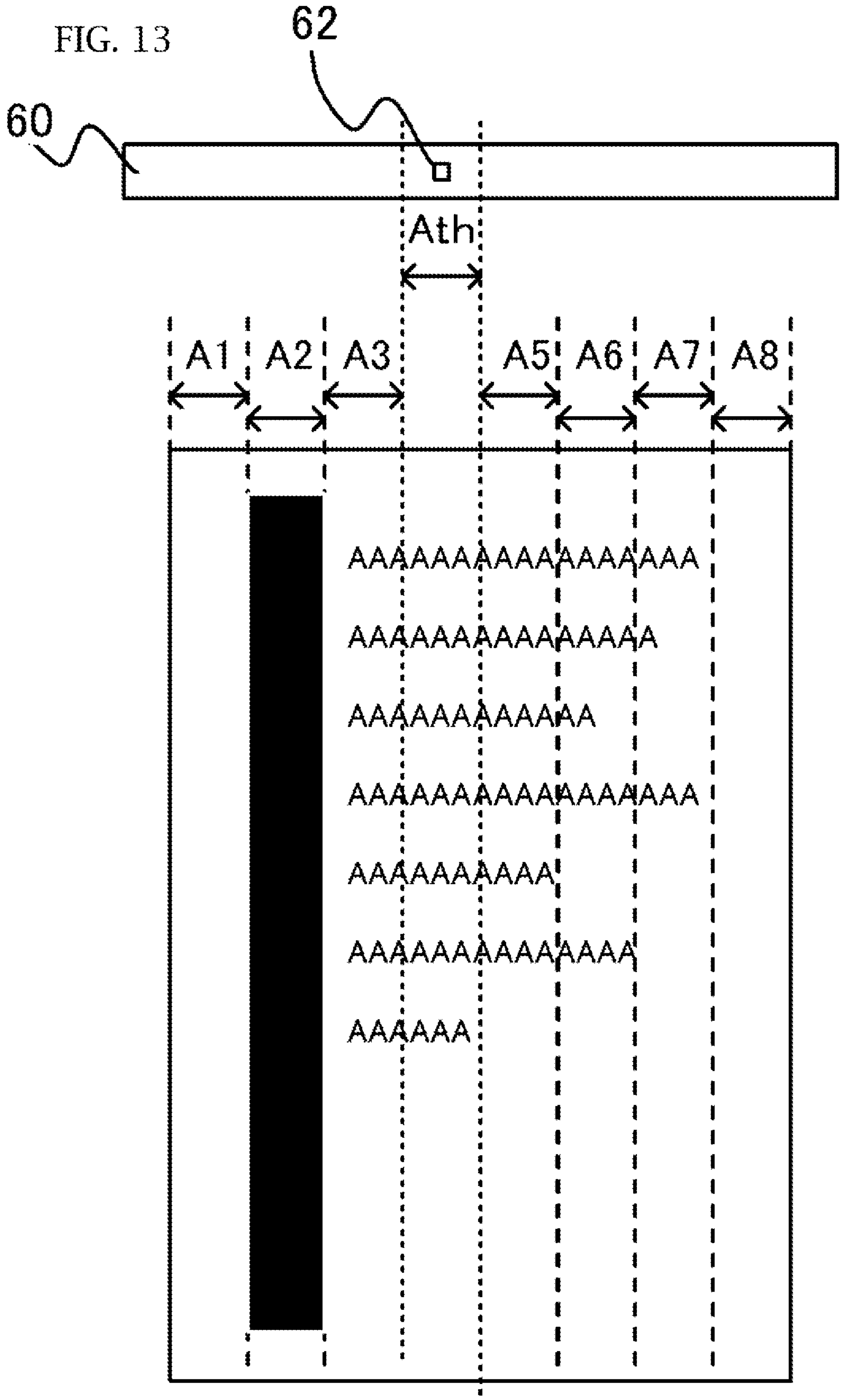
FIG. 13 is a schematic diagram depicting a configuration of a fixing apparatus according to Embodiment 2.

FIG. 13 indicates a configuration of the heater 60 in the longitudinal direction according to Embodiment 2, and indicates positions of a main thermistor 62, which is a first temperature detecting element used for energization control of the heater and toner amount history calculation regions in the longitudinal direction. The toner amount history calculation regions according to Embodiment 2 are defined as eight regions which are separated with a 27 mm width respectively, so that the maximum paper feeding longitudinal width 216 mm is covered. The toner amount history calculation region where the main thermistor is located is Ath. Ath in this example is A4.

(2) Setting Flow of Control Target Temperature

An operation related to setting of the control target temperature according to Embodiment 2 will be described next with reference to the flow chart in FIG. 14. In this flow, the temperature reduction amount of the fixing film, due to the toner on the recording material, is set as the toner amount history counter, and the control target temperature is set in accordance with the toner amount history counters in the temperature detection region and the maximum toner amount region detected by detecting means. The specific control flow will be described below.

When a print signal is inputted to the image forming apparatus 1, the image forming apparatus 1 starts a control target temperature setting sequence (S200).

In the control target temperature setting sequence S200, the top end toner amount history counter Hcth (top), which indicates the film temperature reduction amount immediately before the heat processing in the fixing apparatus, and Hcmax (top) are set (S201).

The toner amount history counter Hcth (top) is the top end toner amount history counter in the temperature detection region Ath (first region), and Hcmax (top) is the maximum top end toner amount history counter of the recording material. "top" indicates the timing state when the top end of the current paper, which is the recoding material to be heat-processed next, enters the fixing apparatus.

The toner amount history counter sets the fixing film temperature when a recording material, on which there is no image (no toner), is heat-processed, as a reference value (which is 0), and indicates an amount of the fixing film surface temperature reduced from the reference value due to the toner on the recording material.

In S201, after printing for the first sheet is started, Hcth (top) and Hcmax (top) are set to the initial values (which are 0). For the second or later sheets to be printed continuously, Hcth (top) and Hcmax (top) are set in accordance with the toner amount history counter of the preceding paper, which will be described later. "preceding paper" here refers to a recording material which was heat-processed before the current paper, and the toner amount history counter of the preceding paper will be described in detail later.

Then, based on the image information which the video controller received from the host computer, integrated toner amount information Stn is calculated in each toner amount history calculation region of the current paper, separated in the longitudinal direction of the recording material (S202).

When the image information from an external device (e.g. host computer) is received by the video controller 120 of the image forming apparatus, the toner amount that is formed in each of the toner amount history calculation regions is integrated based on the image information, and calculated as the integrated toner amount information St1 to St8 in the separated toner amount history calculation regions and the integrated toner amount information Stth in the temperature detection region Ath.

The integrated toner amount information Stn is a value indicating the total toner amount formed in the toner amount history calculation region (width: 27 mm), and is a value expressed, with respect to a reference value 250 when the toner image at the maximum density is formed throughout the entire toner amount history calculation region in the longitudinal direction, with the length in the conveying direction 297 mm (A4 sized length in the conveying direction). By the integrated toner amount information Stn, the total amount of toner formed in each region can be expressed.

Then the integrated toner amount correction amount deltaStth is set in accordance with the integrated toner amount information Stth calculated in S202 (S203). The integrated toner amount correction amount deltaStth is correction temperature based on the reference target temperature, which is required to fix the toner, formed on the temperature detection unit, on the recording material, and Table 9 indicates the settings. In Table 9, "Stth" means "Integrated toner amount information Stth", "deltaStth" means "Integrated toner amount correction amount deltaStth".

TABLE 9

| Stth | deltaStth |
|---|---|
| 0~15 | 0 |
| 16~47 | 1 |
| 48~79 | 2 |
| 80~127 | 3 |
| 128~159 | 4 |
| 160~191 | 5 |
| 192~223 | 6 |
| 224~255 | 7 |

Further, the maximum value of the integrated toner amount information Stn in the toner amount history calculation region calculated in S202 is set as the maximum integrated toner amount information Stmax (S204).

Then the film longitudinal history correction amount is calculated. By the top end toner amount history counters Hcth (top) and Hcmax (top) immediately before the heat processing which were set in S201, and the integrated toner amount information Stth and the maximum integrated toner amount information Stmax calculated in S203, the bottom end toner amount history counters Hcth (bottom) and the Hcmax (bottom) at the bottom end of the current paper are calculated.

First, the counter saturation amount Csn is calculated from the integrated toner amount information Stth and the maximum integrated toner amount information Stmax of the current paper. The counter saturation amount Csn can be calculated using the approximate expression of (Expression 1), just like Embodiment 1.

Then the bottom end toner amount history counter Hcn (bottom) which indicates the fixing film temperature reduction amount at the bottom end of the recording material of the current paper, is calculated. The bottom end toner amount history counter Hcn (bottom) is expressed by (Expression 7), where Hcn (top) is the top end toner amount history counter immediately before heat-processing of the current paper.

[Math. 6]

$$Hcth(\text{bottom}) = Hcth(\text{top}) + \{Csth - Hcth(\text{top})\} \times C \quad \text{(Expression 7)}$$

$$Hcmax(\text{bottom}) = Hcmax(\text{top}) + \{Csmax - Hcmax(\text{top})\} \times C$$

$$C = 0.466$$

Using these calculation expression, the bottom end toner amount history counters Hcth (bottom) and Hcmax (bottom) are calculated.

Then in accordance with the calculated bottom end toner amount history counters Hcth (bottom) and Hcmax (bottom) of the current paper, the film longitudinal history correction amount deltaHc is set (S205).

The film longitudinal history correction amount deltaHc indicates the film surface temperature reduction amount in the toner amount maximum region with respect to the region Ath, which is a reference of temperature control and where the temperature detection element is located, and it is expressed by (Expression 8).

[Math. 7]

$$deltaHc = Hcmax(\text{bottom}) - Hcth(\text{bottom}) \quad \text{(Expression 8)}$$

Then the control unit 40 reads the reference target temperature, which is preset for each print mode and is stored in the ROM 41*a*. For this reference target temperature, the control target temperature Tftgt is set using (Expression 9), in accordance with the integrated toner amount correction amount deltaStth calculated in S203, and the film longitudinal history correction amount deltaHc calculated in S205 (S206).

[Math. 8]

$$Tftgt = Tfbase + deltaStth + deltaHc \quad \text{(Expression 9)}$$

In S207, control is performed using the control target temperature Tftgt, whereby the toner on the recording material is thermally fixed.

Then in S208, it is determined whether or not there is subsequent paper to be printed after the current paper, and the print operation ends in S210 if there is no subsequent paper. If there is subsequent paper, processing advances to S209, and then to S201, and the control target temperature correction is continuously performed based on the toner amount history calculation.

In S209, the current paper is changed, and the top end toner amount history counters Hcth (top) and Hcmax (top) of the current paper to be printed next are calculated and set using (Expression 10), in accordance with the bottom end toner amount history counters Hcth (bottom) and Hcmax (bottom) calculated in S205, and the recording material interval G (print interval).

[Math. 9]

$$Hcth(\text{top}) = Hcth(\text{bottom}) \times D \qquad \text{(Expression 10)}$$

$$Hcmax(\text{top}) = Hcmax(\text{bottom}) \times D$$

In (Expression 10), using the bottom end toner amount history counters Hcth (bottom) and Hcmax (bottom) of the preceding paper, and the print interval correction coefficient D, the top end toner amount history counters Hcth (top) and Hcmax (top) immediately before the heat-processing of the current paper are calculated.

The print interval correction coefficient D for the print interval G is indicated using Table 2, which is the same as Embodiment 1. The print interval correction coefficient D is a print interval correction coefficient determined by the interval G (print interval) between the recording materials of the preceding paper and the current paper, and the correction coefficient is smaller as the print interval is longer.

As the print interval is longer, the toner amount history counter of the preceding paper decreases in the print interval. The toner amount history counter at the top end of the current paper can be calculated in accordance with the length of the print interval can be calculated using (Expression 10).

In the case of performing printing continuously, the toner amount history counter setting immediately before the current paper is sequentially performed in S209 to S201, whereby the toner amount history calculation is continuously performed. In Embodiment 2, the control target temperature can be set in accordance with the toner amount history counter by the above mentioned control flow.

The effect of Embodiment 2 will be described next, using a comparative example. Using the example of the images in FIGS. 15A to 15C, the fixing control target temperature setting and the transition of the temperature of the fixing film according to Embodiment 2 and according to the comparative example will be described in detail. Just like Embodiment 1, in the comparative example, the control target temperature is set based on the toner amount information of the current paper alone, using the control target temperature setting flow in FIG. 5.

Figure 15C:
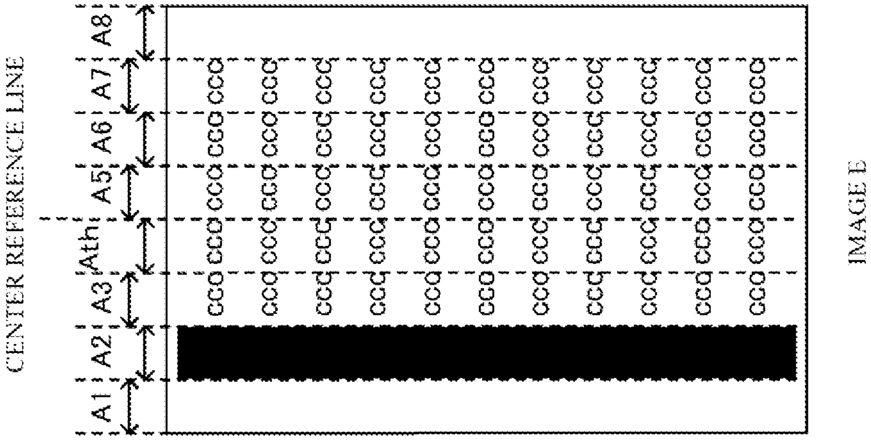
FIGS. 15A to 15C are schematic diagrams of images used for Embodiment 2.
Figure 15B:
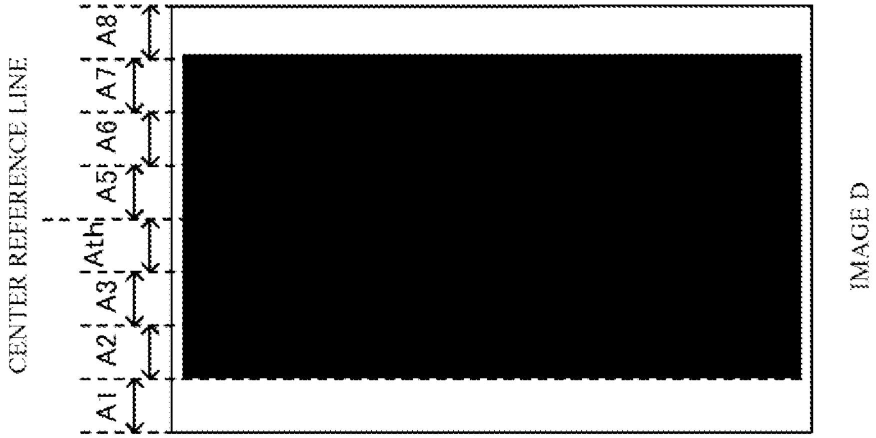
Figure 15A:
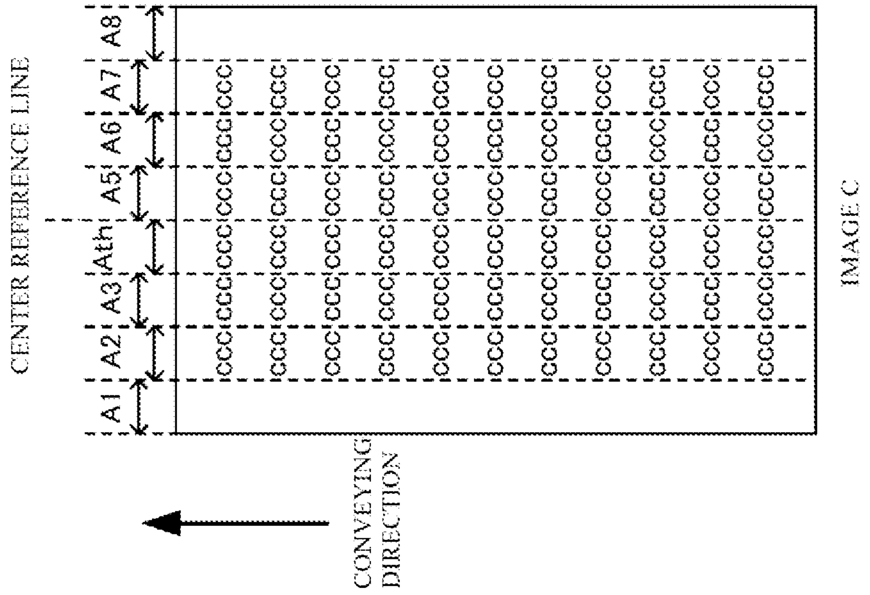
Figures 16A, 16B, 16C:
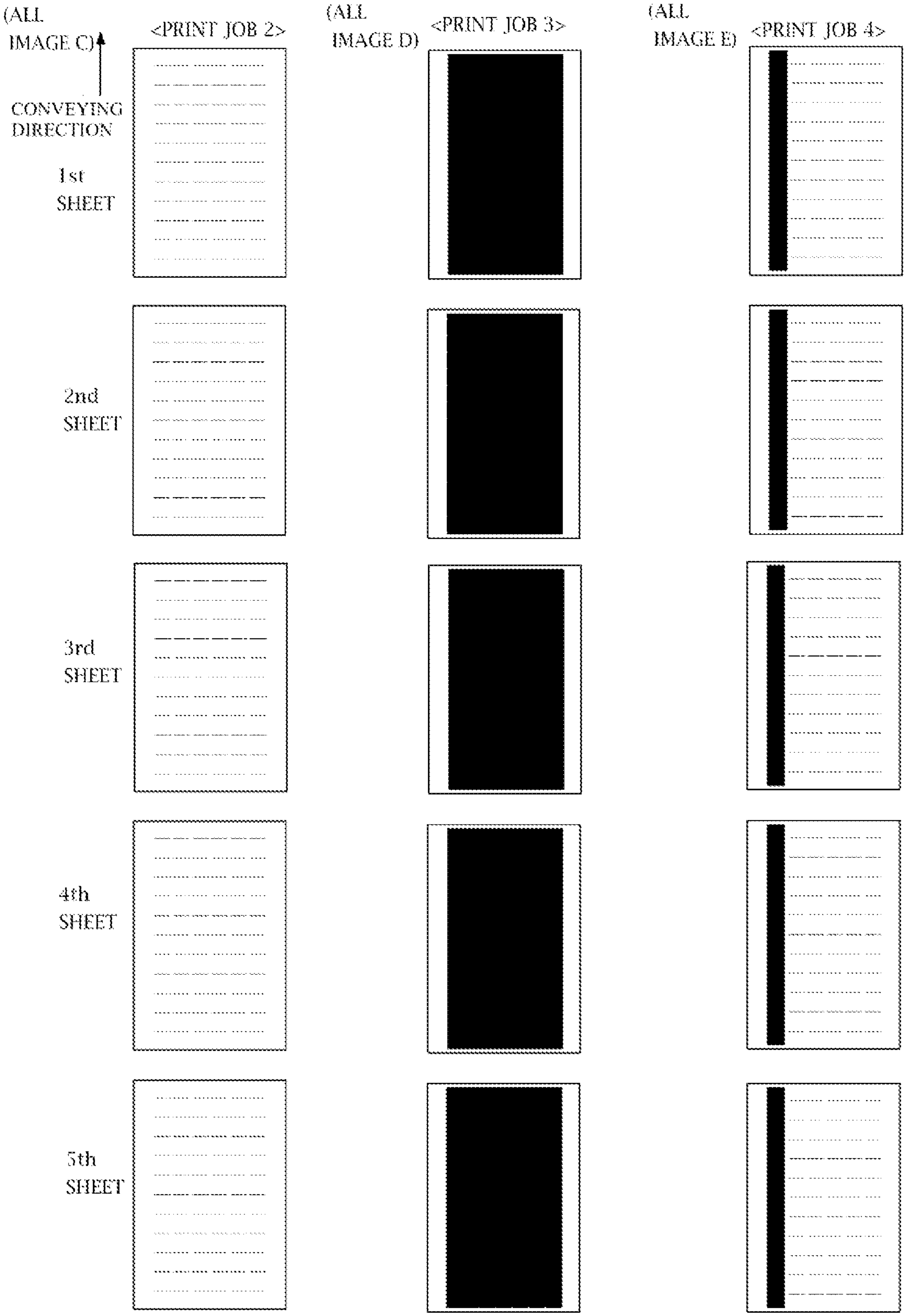
FIGS. 16A to 16C are schematic diagrams depicting a transition of the images used for Embodiment 2.

FIGS. 15A to 15C are schematic diagrams of images used for Embodiment 2 and the comparative example. FIGS. 16A to 16C indicate the transition of images in print jobs 2 to 4. In each print job, five sheets of the image C, image D and image E are formed respectively, continuously on the A4 sized recording materials. The interval G of the recording materials is 30 mm.

In the image C, a text image, of which print ratio 5%, is formed in the toner amount history calculation regions A2 to A7. In the image D, a black image (solid black) at maximum density is formed in the toner amount history calculation regions A2 to A7. The print ratio is 97% since the top end 5 mm and the bottom end 5 mm are blank where no toner exists.

In the image E, a black image (solid black), at maximum density, is formed in the toner amount history calculation region A2, and the print ratio is 97% since the top end 5 mm and the bottom end 5 mm are blank where no toner exists. [In the image E], a text image, of which print ratio is 5%, is formed in the toner amount history calculation regions A3 to A7.

Figure 14:
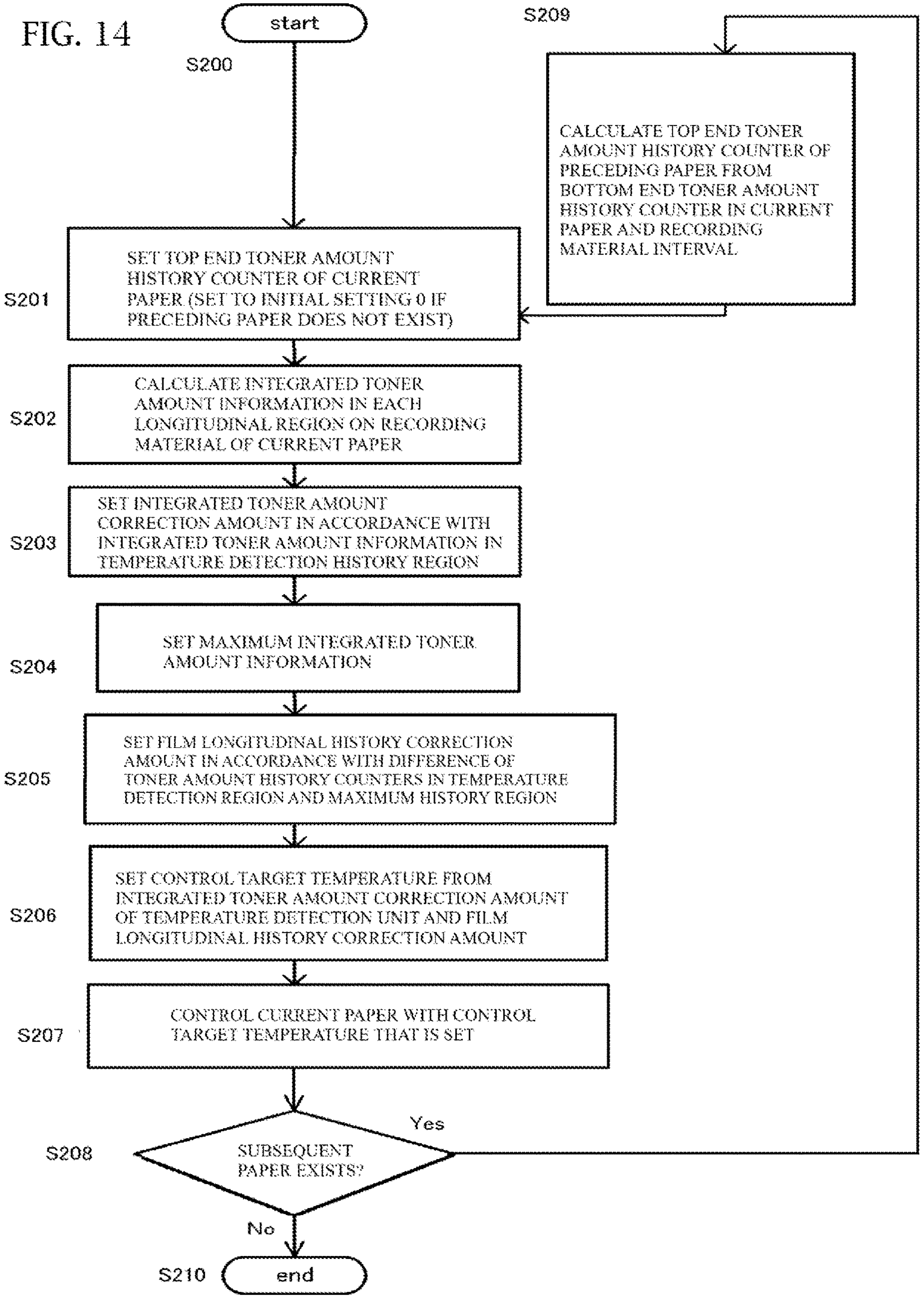
FIG. 14 is a flow chart of control according to Embodiment 2.

Tables 10 to 12 indicate the calculation of the toner amount history counter and the control target temperature according to Embodiment 2, which are calculated by the target temperature setting flow of Embodiment 2 indicated in FIG. 14. Table 10 corresponds to (a) print job 2, Table 11 corresponds to (b) print job 3, and Table 12 corresponds to (c) print job 4. In Table 10 to Table 12, "Calculation region" means "Toner amount history calculation region", "Max region" means "Maximum toner region", "deltaSttn" means "Integrated toner amount correction amount deltaSttn", "deltaHc" means "Film history longitudinal correction amount deltaHc", "Tftgt" means "Control target temperature Tftgt", "PR" means "Print ratio", "Stn" means "Toner amount information Stn", "Csn" means "Counter saturation amount Csn", and, "Hcn (bottom)" means "Toner amount history counter Hcn (bottom)".

TABLE 10

| | Calculation region | Calculation region A1 | A2 | A3 | Ath | A5 | A6 | A7 | A8 | Max region | deltaSttn [° C.] | deltaHc [° C.] | Tftgt [° C.] |
|---|---|---|---|---|---|---|---|---|---|---|---|---|---|
| 1st Sheet | PR | 0% | 5% | 5% | 5% | 5% | 5% | 5% | 0% | | 0 | 0 | 170 |
| | Stn | 0 | 13 | 13 | 13 | 13 | 13 | 13 | 0 | 13 | | | |
| | Csn | | | | 1.0 | | | | | 1.0 | | | |
| | Hcn (bottom) | | | | 0.5 | | | | | 0.5 | | | |
| 2nd Sheet | PR | 0% | 5% | 5% | 5% | 5% | 5% | 5% | 0% | | 0 | 0 | 170 |
| | Stn | 0 | 13 | 13 | 13 | 13 | 13 | 13 | 0 | 13 | | | |
| | Csn | | | | 1.0 | | | | | 1.0 | | | |
| | Hcn (bottom) | | | | 0.7 | | | | | 0.7 | | | |
| 3rd Sheet | PR | 0% | 5% | 5% | 5% | 5% | 5% | 5% | 0% | | 0 | 0 | 170 |
| | Stn | 0 | 13 | 13 | 13 | 13 | 13 | 13 | 0 | 13 | | | |
| | Csn | | | | 1.0 | | | | | 1.0 | | | |
| | Hcn (bottom) | | | | 0.8 | | | | | 0.8 | | | |
| 4th Sheet | PR | 0% | 5% | 5% | 5% | 5% | 5% | 5% | 0% | | 0 | 0 | 170 |
| | Stn | 0 | 13 | 13 | 13 | 13 | 13 | 13 | 0 | 13 | | | |
| | Csn | | | | 1.0 | | | | | 1.0 | | | |
| | Hcn (bottom) | | | | 0.9 | | | | | 0.9 | | | |

TABLE 10-continued

| | Calculation region | Calculation region | | | | | | | | Max region | deltaSttn [° C.] | deltaHc [° C.] | Tftgt [° C.] |
|---|---|---|---|---|---|---|---|---|---|---|---|---|---|
| | | A1 | A2 | A3 | Ath | A5 | A6 | A7 | A8 | | | | |
| 5th | PR | 0% | 5% | 5% | 5% | 5% | 5% | 5% | 0% | | 0 | 0 | 170 |
| Sheet | Stn | 0 | 13 | 13 | 13 | 13 | 13 | 13 | 0 | 13 | | | |
| | Csn | | | | 1.0 | | | | | 1.0 | | | |
| | Hcn (bottom) | | | | 0.9 | | | | | 0.9 | | | |

TABLE 11

| | Calculation region | Calculation region | | | | | | | | Max region | deltaSttn [° C.] | deltaHc [° C.] | Tftgt [° C.] |
|---|---|---|---|---|---|---|---|---|---|---|---|---|---|
| | | A1 | A2 | A3 | Ath | A5 | A6 | A7 | A8 | | | | |
| 1st | PR | 0% | 97% | 97% | 97% | 97% | 97% | 97% | 0% | | 7 | 0 | 177 |
| Sheet | Stn | 0 | 242 | 242 | 242 | 242 | 242 | 242 | 0 | 242 | | | |
| | Csn | | | | 12.3 | | | | | 12.3 | | | |
| | Hcn (bottom) | | | | 5.7 | | | | | 5.7 | | | |
| 2nd | PR | 0% | 97% | 97% | 97% | 97% | 97% | 97% | 0% | | 7 | 0 | 177 |
| Sheet | Stn | 0 | 242 | 242 | 242 | 242 | 242 | 242 | 0 | 242 | | | |
| | Csn | | | | 12.3 | | | | | 12.3 | | | |
| | Hcn (bottom) | | | | 8.8 | | | | | 8.8 | | | |
| 3rd | PR | 0% | 97% | 97% | 97% | 97% | 97% | 97% | 0% | | 7 | 0 | 177 |
| Sheet | Stn | 0 | 242 | 242 | 242 | 242 | 242 | 242 | 0 | 242 | | | |
| | Csn | | | | 12.3 | | | | | 12.3 | | | |
| | Hcn (bottom) | | | | 10.4 | | | | | 10.4 | | | |
| 4th | PR | 0% | 97% | 97% | 97% | 97% | 97% | 97% | 0% | | 7 | 0 | 177 |
| Sheet | Stn | 0 | 242 | 242 | 242 | 242 | 242 | 242 | 0 | 242 | | | |
| | Csn | | | | 12.3 | | | | | 12.3 | | | |
| | Hcn (bottom) | | | | 11.3 | | | | | 11.3 | | | |
| 5th | PR | 0% | 97% | 97% | 97% | 97% | 97% | 97% | 0% | | 7 | 0 | 177 |
| Sheet | Stn | 0 | 242 | 242 | 242 | 242 | 242 | 242 | 0 | 242 | | | |
| | Csn | | | | 12.3 | | | | | 12.3 | | | |
| | Hcn (bottom) | | | | 11.8 | | | | | 11.8 | | | |

TABLE 12

| | Calculation region | Calculation region | | | | | | | | Max region | deltaSttn [° C.] | deltaHc [° C.] | Tftgt [° C.] |
|---|---|---|---|---|---|---|---|---|---|---|---|---|---|
| | | A1 | A2 | A3 | Ath | A5 | A6 | A7 | A8 | | | | |
| 1st | PR | 0% | 97% | 5% | 5% | 5% | 5% | 5% | 0% | | 0 | 6 | 176 |
| Sheet | Stn | 0 | 242 | 13 | 13 | 13 | 13 | 13 | 0 | 242 | | | |
| | Csn | | | | 1.0 | | | | | 12.3 | | | |
| | Hcn (bottom) | | | | 0.5 | | | | | 5.1 | | | |
| 2nd | PR | 0% | 97% | 5% | 5% | 5% | 5% | 5% | 0% | | 0 | 9 | 179 |
| Sheet | Stn | 0 | 242 | 13 | 13 | 13 | 13 | 13 | 0 | 242 | | | |
| | Csn | | | | 1.0 | | | | | 12.3 | | | |
| | Hcn (bottom) | | | | 0.7 | | | | | 8.8 | | | |
| 3rd | PR | 0% | 97% | 5% | 5% | 5% | 5% | 5% | 0% | | 0 | 10 | 180 |
| Sheet | Stn | 0 | 242 | 13 | 13 | 13 | 13 | 13 | 0 | 242 | | | |
| | Csn | | | | 1.0 | | | | | 12.3 | | | |
| | Hcn (bottom) | | | | 0.8 | | | | | 10.4 | | | |
| 4th | PR | 0% | 97% | 5% | 5% | 5% | 5% | 5% | 0% | | 0 | 11 | 181 |
| Sheet | Stn | 0 | 242 | 13 | 13 | 13 | 13 | 13 | 0 | 242 | | | |
| | Csn | | | | 1.0 | | | | | 12.3 | | | |
| | Hcn (bottom) | | | | 0.9 | | | | | 11.3 | | | |
| 5th | PR | 0% | 97% | 5% | 5% | 5% | 5% | 5% | 0% | | 0 | 11 | 181 |
| Sheet | Stn | 0 | 242 | 13 | 13 | 13 | 13 | 13 | 0 | 242 | | | |
| | Csn | | | | 1.0 | | | | | 12.3 | | | |

TABLE 12-continued

| Calculation region | Calculation region | | | | | | | | Max region | deltaSttn [° C.] | deltaHc [° C.] | Tftgt [° C.] |
|---|---|---|---|---|---|---|---|---|---|---|---|---|
| | A1 | A2 | A3 | Ath | A5 | A6 | A7 | A8 | | | | |
| Hcn (bottom) | | | | 0.9 | | | | | 11.8 | | | |

First, in the print job 2, for the first sheet of image C (current paper), the integrated toner amount correction amount deltaStth is set to 0° C., based on the integrated toner amount information in the toner amount history calculation region Ath.

Since the toner amount history counters in the temperature detection region Ath and in the maximum toner region are the same, the film history longitudinal correction amount deltaHc is set to 0° C. Hence, the control target temperature Tftgt, determined by adding deltaStth 0° C. and deltaHc 0° C. to the reference control temperature Tfbase 170°, based on (Expression 9), is set to 170° C. In the same manner, the control target temperature Tftgt is set to 170° C. for the second sheet to the fifth sheet as well.

In the print job 3, for the first sheet of the image D (current paper), the integrated toner amount correction amount deltaStth is set to 7° C., based on the integrated toner amount information in the toner amount history calculation region Ath.

Since the toner amount history counters in the temperature detection region Ath and in the maximum toner region are the same, the film history longitudinal correction amount deltaHc is set to 0° C. Hence the control target temperature Tftgt determined by adding deltaStth 7° C. and deltaHc 0° C. to the reference control temperature Tfbase 170° C., based on (Expression 9), is set to 177° C. In the same manner, the control target temperature Tftgt is set to 177° C. for the second sheet to the fifth sheet as well.

In the print job 4, on the other hand, for the first sheet of the image E (current paper), the integrated toner amount correction amount deltaStth is set to 0° C., based on the integrated toner amount information in the toner amount history calculation region Ath.

The toner amount history counter Hcth (bottom) in the temperature detection region Ath is calculated as 0.5, the toner amount history counter Hcth (bottom) in the maximum toner region A2 is calculated as 5.7, and the film history longitudinal correction amount deltaHc is set to 6° C., based on (Expression 8). The film history longitudinal correction amount deltaHc is set in 1° C. units. Based on the above calculation result, the control target temperature Tftgt for the first sheet, determined by adding deltaStth 0° C. and deltaHc 6° C. to the reference control temperature Tfbase 170° C., is set to 176° C.

Then the preceding paper toner amount history counter Hen (top) is calculated and set based on the bottom end toner amount history counter Hcn (bottom) calculated for the first sheet. In this configuration, the recording material interval G is 30 mm, and the print interval correction amount D is 1.0, which is calculated using (Expression 5).

As described above, the film temperature correction amount deltaHc for the second sheet becomes 9° C., and the control target temperature is set to 179° C. The toner amount history counter is sequentially calculated like this, whereby the control target temperature Tftgt is set in accordance with the toner amount history.

In the comparative example, the control target temperature is set in accordance with the maximum toner amount Stmax on the current paper based on the target temperature setting flow indicated in FIG. 5.

Hence in the print job 3, the target temperature correction amount deltaStmax becomes 6° C. for the first to fifth sheets. Based on (Expression 6), deltaStmax 6° C. is added to the reference control temperature 170° C., and the control target temperature is set to 176° C.

Figure 17:
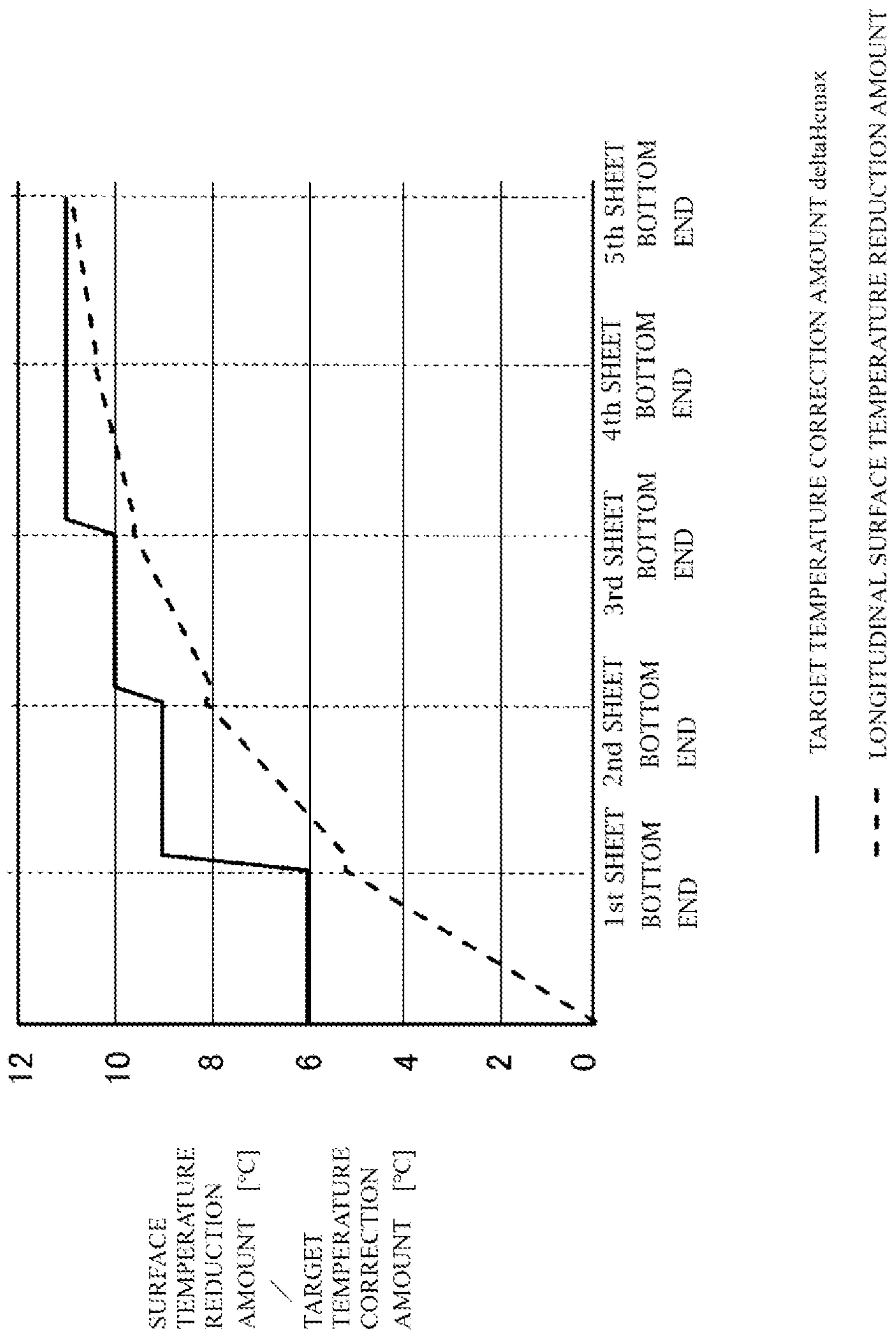
FIG. 17 is a graph for describing a control target temperature according to Embodiment 2.
Figure 18:
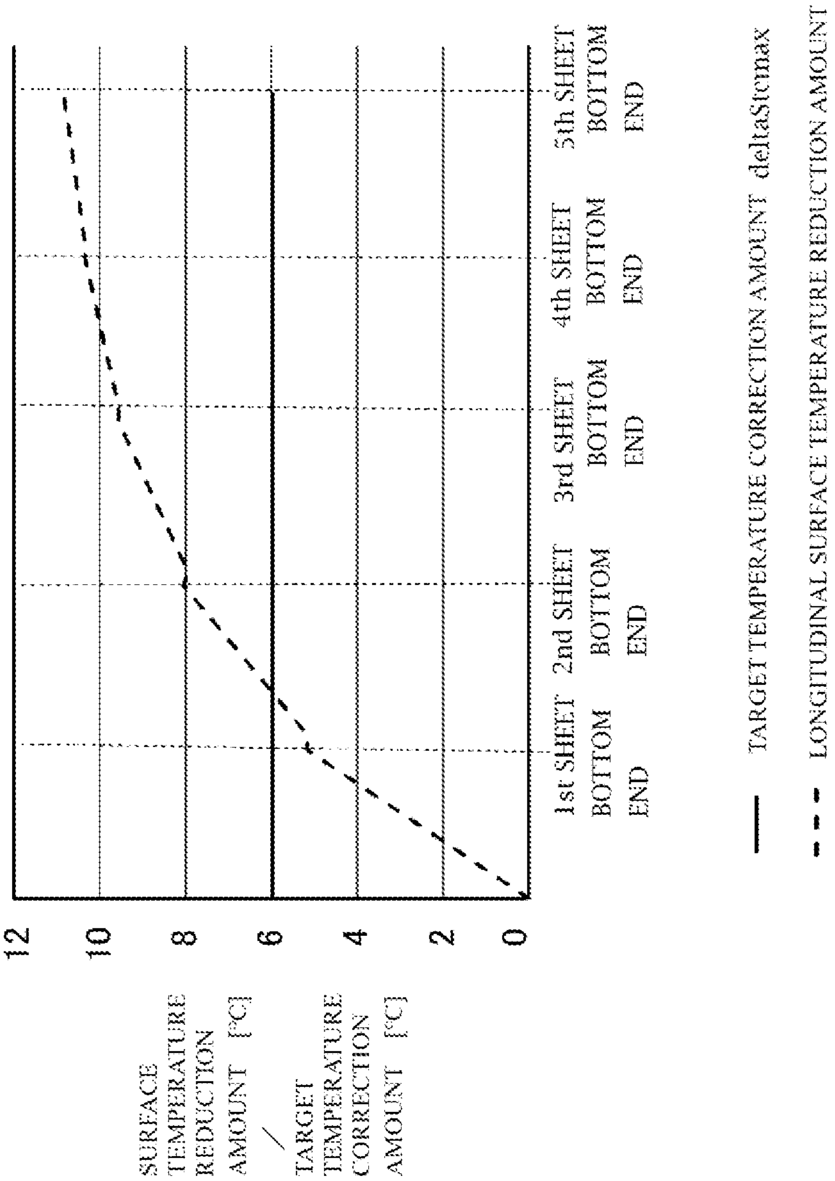
FIG. 18 is a continuation of the graph for describing the control target temperature according to Embodiment 2.

FIGS. 17 and 18 indicate the respective transition of the control target temperature and the fixing film surface temperature when images of the print job 4 are formed based on the control in Embodiment 2 and the comparative example described above.

FIG. 17 is a graph indicating the target temperature correction amount and the temperature reduction amount (longitudinal temperature reduction amount) in the region A2 with respect to the region Ath. The abscissa indicates timings when the bottom ends of the first to fifth sheets of the recording materials pass. In the region A2, where the solid black images having high toner amount on the first to fifth sheets pass, the longitudinal film temperature reduction amount increases up to 10.9° C.

Even in such a case, in Embodiment 2, for all the print states of the first to fifth sheets, the target temperature correction amount is set to an amount to compensate for the film surface temperature reduction amount, based on the toner amount history counter, including the preceding recording material. Therefore, the film surface temperature required for ensuring the fixing performance can be maintained.

Table 13 is the result of checking the generation of an image defect, to confirm the effect of the invention. The experiment was performed under a 23° C. temperature environment. O indicates that no image defect was generated, and X indicates that heat was insufficient and a fixing failure was generated. As indicated in Table 13, the fixing performance to fix the toner to the recording material was ensured, and no image defect, such as a fixing failure, was generated in Embodiment 2. In Table 13, "Calculation region" means "Toner amount history calculation region", "Tftgt" means "Control target temperature tftgt".

TABLE 13

| Embodiment2 | Calculation region | | | | | | | | Tftgt |
|---|---|---|---|---|---|---|---|---|---|
| Print Job 4 | A1 | A2 | A3 | A4 | A5 | A6 | A7 | A8 | [° C.] |
| 1st Sheet | ○ | ○ | ○ | ○ | ○ | ○ | ○ | ○ | 176 |
| 2nd Sheet | ○ | ○ | ○ | ○ | ○ | ○ | ○ | ○ | 179 |
| 3rd Sheet | ○ | ○ | ○ | ○ | ○ | ○ | ○ | ○ | 180 |
| 4th Sheet | ○ | ○ | ○ | ○ | ○ | ○ | ○ | ○ | 181 |
| 5th Sheet | ○ | ○ | ○ | ○ | ○ | ○ | ○ | ○ | 181 |

○: no image defect generated
x: fixing failure generated

FIG. 18, on the other hand, is a graph indicting the target temperature correction amount and the temperature reduction amount in representative regions A4 and A5, according to the comparative example. In the case of the comparative example, the target temperature correction amount is determined based on the toner amount information on the current paper alone, hence the target temperature correction amount for the first to fifth sheets is 6° C. However, the longitudinal film temperature reduction amount increases up to 10.9° C. in the region A2 on the fifth sheet, since images having high toner amount passed continuously. Therefore on the second to fifth sheets, the film surface temperature reduction amount exceeds the target temperature correction amount, and the film surface temperature required to ensure the fixing performance cannot be maintained. As a result, a fixing failure is generated. Table 14 indicates a result of checking the generation of an image defect in the comparative example. In Table 14, "Calculation region" means "Toner amount history calculation region", "Tftgt" means "Control target temperature tftgt".

TABLE 14

| Comparative Embodiment | Calculation region | | | | | | | | Tftgt |
|---|---|---|---|---|---|---|---|---|---|
| Print Job 4 | A1 | A2 | A3 | A4 | A5 | A6 | A7 | A8 | [° C.] |
| 1st Sheet | o | o | o | o | o | o | o | o | 176 |
| 2nd Sheet | o | x | o | o | o | o | o | o | 176 |
| 3rd Sheet | o | x | o | o | o | o | o | o | 176 |
| 4th Sheet | o | x | o | o | o | o | o | o | 176 |
| 5th Sheet | o | x | o | o | o | o | o | o | 176 |

o: no image defect generated
x: fixing failure generated

Next, using the images and paper feeding states indicated in the print job 4 in FIGS. 16A to 16C, the control target temperature setting according to Embodiment 2 in print states with different recording material intervals G will be described in detail.

Table 15 (15-1 to 15-3) indicates the transition of the toner amount history counter in each region and the control target temperature set values when paper was fed continuously with the print interval setting the same as Embodiment 1. Table 15 indicates data corresponding to the print interval conditions 1 to 3 (15-1 to 15-3) sequentially from the top. In Table 15, "Target Temp." means "Control target temperature", "Hcn (bottom)" means "Toner amount history count Hcn (bottom)".

TABLE 15

| (15-1) | Interval 30 mm | A1 | A2 | A3 | Ath | A5 | A6 | A7 | A8 | Target Temp. |
|---|---|---|---|---|---|---|---|---|---|---|
| 1st Sheet | Hcn (bottom) | | 5.7 | | 0.5 | | | | | 176 |
| 2nd Sheet | Hcn (bottom) | | 8.8 | | 0.7 | | | | | 179 |
| 3rd Sheet | Hcn (bottom) | | 10.4 | | 0.8 | | | | | 180 |

| (15-2) | Interval 300 mm | A1 | A2 | A3 | Ath | A5 | A6 | A7 | A8 | Target Temp. |
|---|---|---|---|---|---|---|---|---|---|---|
| 1st Sheet | Hcn (bottom) | | 5.7 | | 0.5 | | | | | 176 |
| 2nd Sheet | Hcn (bottom) | | 7.4 | | 0.6 | | | | | 177 |
| 3rd Sheet | Hcn (bottom) | | 7.8 | | 0.6 | | | | | 178 |

| (15-3) | Interval 300 mm | A1 | A2 | A3 | A4 | A5 | A6 | A7 | A8 | Target Temp. |
|---|---|---|---|---|---|---|---|---|---|---|
| 1st Sheet | Hcn (bottom) | | 5.7 | | 0.5 | | | | | 176 |
| 2nd Sheet | Hcn (bottom) | | 6.7 | | 0.5 | | | | | 177 |
| 3rd Sheet | Hcn (bottom) | | 6.9 | | 0.5 | | | | | 177 |

Figure 19:
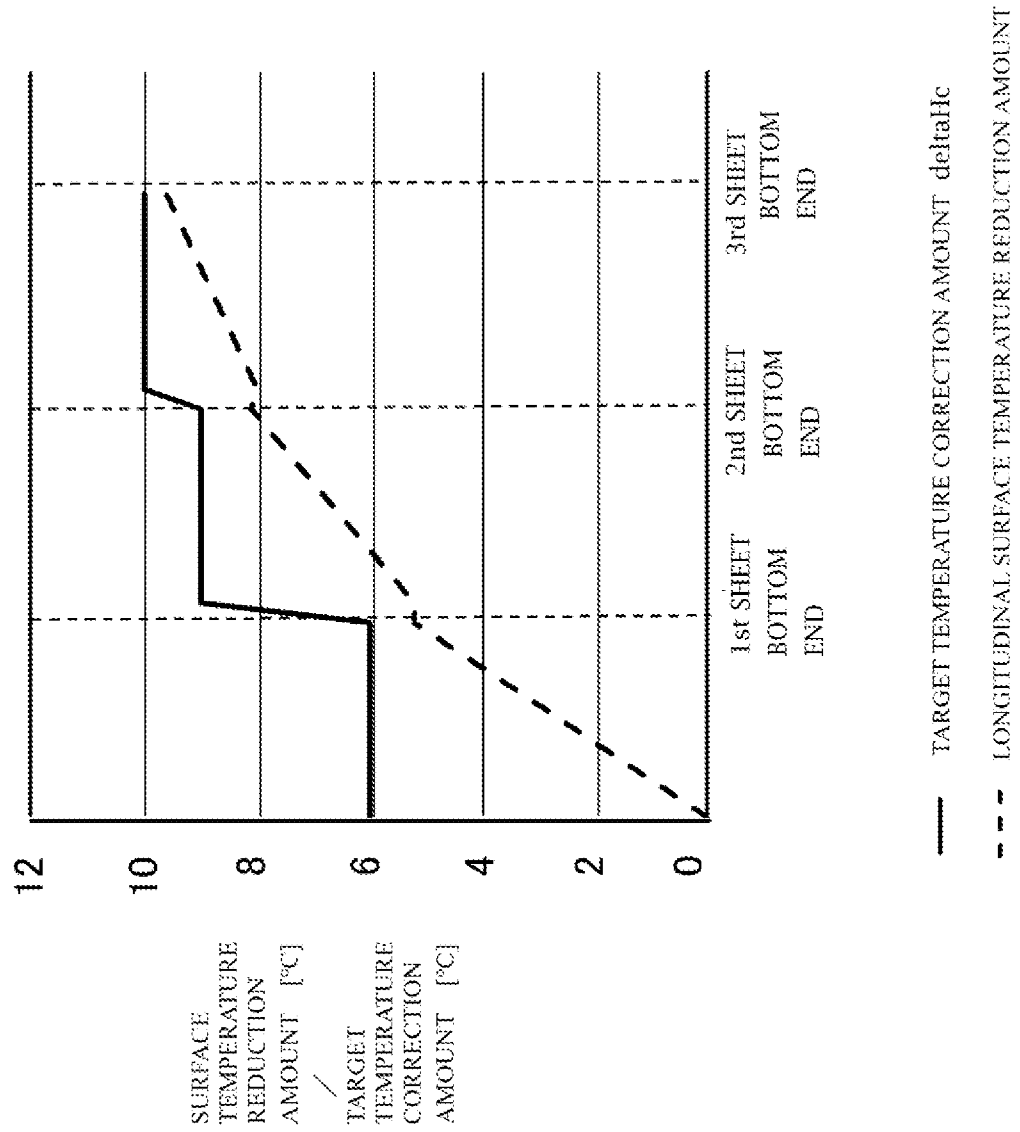
FIG. 19 is a graph for describing a control target temperature according to Embodiment 2.
Figure 20:
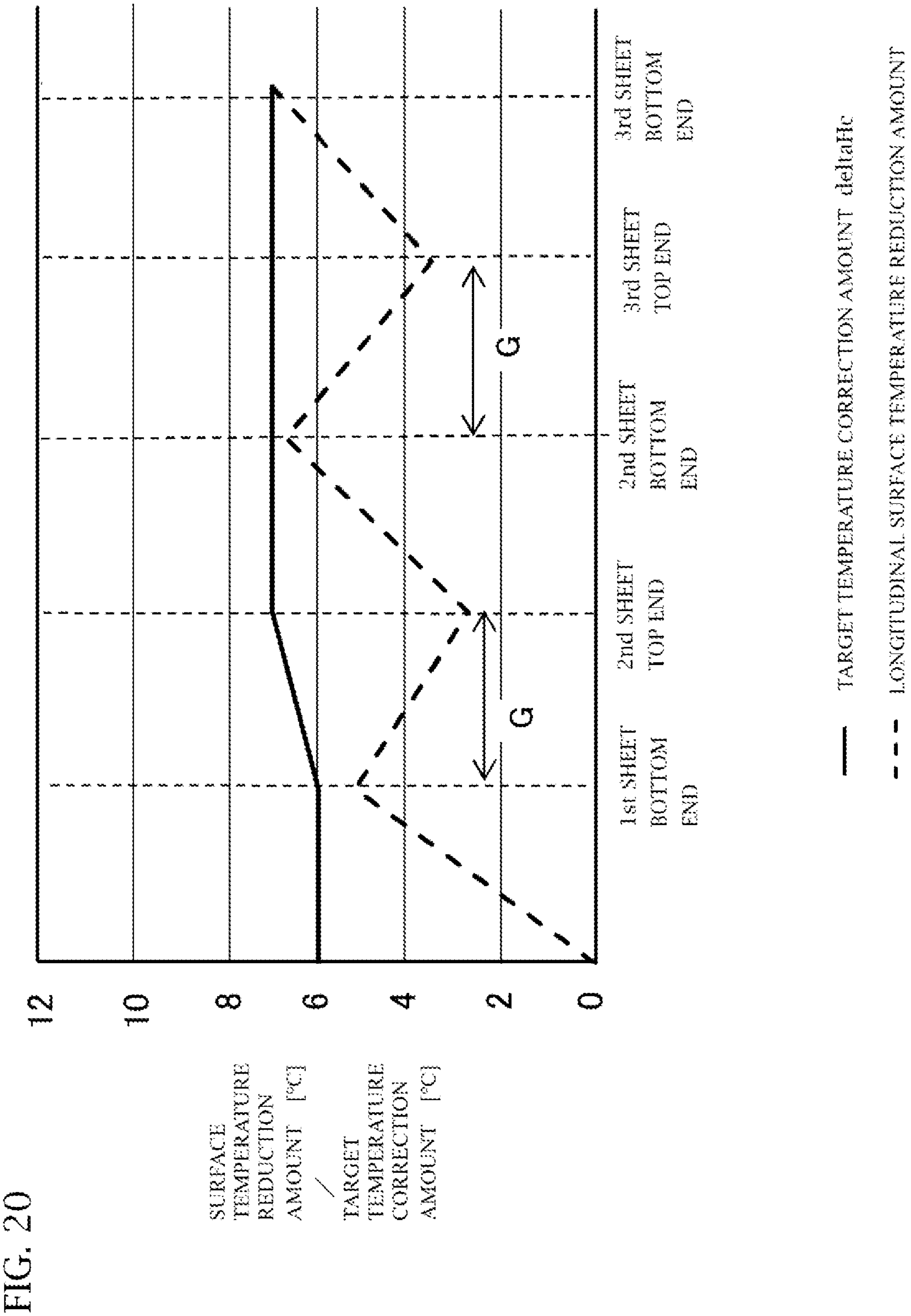
FIG. 20 is a continuation of the graph for describing the control target temperature according to Embodiment 2.
Figure 21:
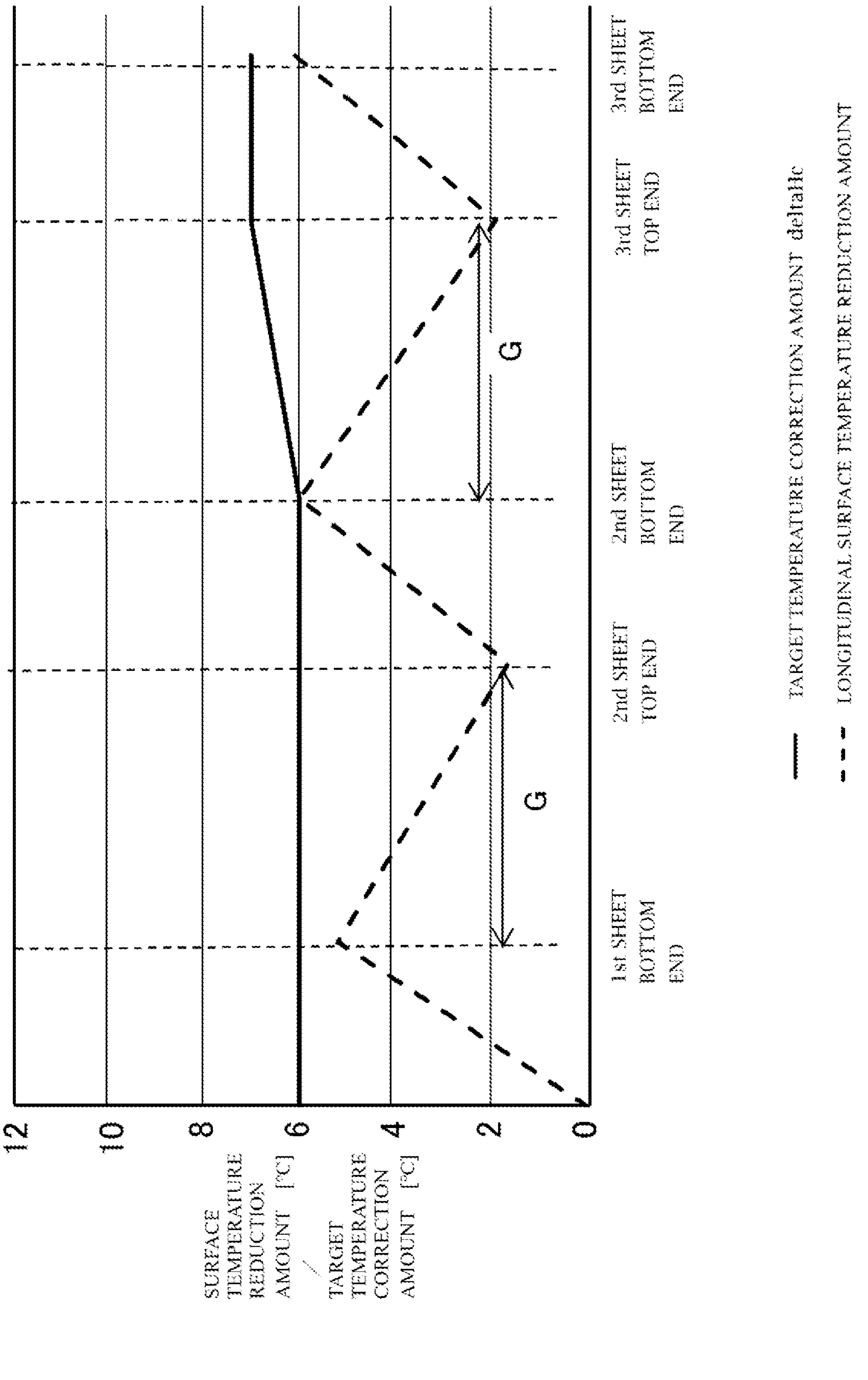
FIG. 21 is a continuation of the graph for describing the control target temperature according to Embodiment 2.

FIGS. 19 to 21 indicate the transition of the control target temperature and the fixing film surface temperature when images are formed based on the control flow in Embodiment 2, with the above mentioned recording material interval setting.

FIG. 19 is a graph indicating the target temperature correction amount and the longitudinal film temperature reduction amount, which indicates the temperature reduction amount in the region A2 with respect to the temperature detection region Ath, according to Embodiment 2.

FIG. 19 is a case of a normal print interval setting 30 mm, and in the region A2, where the solid black image having high toner amount passes, the longitudinal film temperature reduction amount with respect to the temperature detection region Ath increases up to 9.6° C. on the third sheet.

In Embodiment 2, however, for all the print states of the first to third sheets, the target temperature correction amount is set to an amount to compensate for the difference of the film surface temperature reduction amount, based on the toner amount history counter, including the preceding recording material. The control target temperature for the second sheet is set to 179° C., and the control target temperature for the third sheet is set to 180° C. Therefore, the film surface temperature required for ensuring the fixing performance can be maintained.

FIG. 20, on the other hand, is a case where the print interval setting is 300 mm, which is longer than the normal print interval setting, and in the region A2 where the solid black images having high toner amount pass when a recording material is fed, the film temperature reduction amount increases. However, in the print intervals, where heat is not transferred to the recording material and toner, the film temperature reduction amount decreases.

In Embodiment 2, the print interval correction coefficient D is set in accordance with the print interval, and the target temperature correction amount is set based on the toner amount history counter of the preceding paper, including the print interval. Hence, for all the print states of the first sheet to the third sheet, the target temperature correction amount is set to an amount to compensate for the difference of the film surface temperature reduction amount, based on the toner amount history counter, including the preceding recording material. The control target temperature for the second sheet is set to 177° C., and the control target temperature for the third sheet is set to 178° C., which are controlled with the target temperature settings lower than the case of the normal print interval 30 mm. Therefore, the fixing performance to fix the toner to the recording material is ensured without generated a fixing failure and the like, and power consumption can be reduced by performing an optimum target temperature setting in accordance with the print interval.

In the same manner, FIG. 21 is a case where the print interval setting is 500 mm, which is longer than the normal print interval setting, and in this case as well, for all the print states of the first sheet to the third sheet, the target temperature correction amount is set to an amount to compensate for the difference of the film surface temperature reduction amount, based on the toner amount history counter, including the preceding recording material. The control target temperature for the second sheet is set to 177° C., and the control target temperature for the third sheet is set to 177° C., which are controlled with the target temperature settings lower than the case of the normal print interval 30 mm in accordance with the print interval.

As described above, the target temperature can be set in accordance with the toner amount of the recording material, and the fixing performance can be ensured, whereby the generation of an image defect can be suppressed. Further, power can be conserved without consuming wasteful power, since the correction amount can be calculated in accordance with the interval of the recording materials, and the control target temperature can be set thereby.

Embodiment 3

Embodiment 3 of the present invention will be described next. The configuration of the image forming apparatus and basic operations thereof are the same as Embodiment 1, hence description thereof will be omitted. Embodiment 3 is characterized in that the fixing target temperature is set in accordance with the toner amount history counters calculated in each of the temperature detection regions and the toner amount history calculation regions.

(1) Fixing Apparatus

The basic configuration and operations of the fixing apparatus are the same as Embodiment 1, hence description thereof will be omitted.

(2) Setting Flow of Control Target Temperature

An operation related to setting of the control target temperature according to Embodiment 3 will be described next with reference to the flow chart in FIG. 22. In this flow, the temperature reduction amount of the fixing film, due to the toner on the recording material, is set as the toner amount history counter, and the control target temperature is set in accordance with the toner amount history counter calculated for each of the temperature detection regions and the toner amount history calculation regions. The specific control flow will be described below.

When a print signal is inputted to the image forming apparatus 1, the image forming apparatus 1 starts a control target temperature setting sequence (S300).

In the control target temperature setting sequence S300, the top end toner amount history counters Hcth (top) and Hcn (top), which indicate a film temperature reduction amount immediately before the heat processing of each toner amount history counter calculation region in the fixing apparatus, are set (S301).

The toner amount history counter Hcth (top) is the top end toner amount history counter in the temperature detection region Ath, and Hcn (top) is the top end toner amount history counter in the toner amount history calculation regions A1 to A8. "top" indicates the timing state when the top end of the current paper, which is the recording material to be heat-processed next, enters the fixing apparatus.

The toner amount history counter sets the fixing film temperature when a recording material, on which there is no image (no toner), is heat-processed, as a reference value (which is 0), and indicates an amount of the fixing film surface temperature reduced from the reference value due to the toner on the recording material.

In S301 after printing for the first sheet is started, Hcth (top) and Hcn (top) are set to the initial values which are 0. For the second or later sheets to be printed continuously, Hcth (top) and Hen (top) are set in accordance with the toner amount history counter of the preceding paper, which will be described later. "preceding paper" here refers to a recording material which was heat-processed before the current paper, and the toner amount history counter of the preceding paper will be described in detail later.

Then, based on the image information which the video controller received from the host computer, integrated toner amount information Stn is calculated in each toner amount history calculation region of the current paper, separated in the longitudinal direction of the recording material (S302).

When the image information from an external device (e.g. host computer) is received by the video controller 120 of the image forming apparatus, the toner amount that is formed in each of the toner amount history calculation regions is integrated based on the image information, and calculated as the integrated toner amount information St1 to St8 in the separated toner amount history calculation regions and the integrated toner amount information Stth in the temperature detection region Ath.

The integrated toner amount information Stn is a value indicating the total toner amount formed in the toner amount history calculation region (width: 27 mm), and is a value expressed with respect to a reference value 250 when the toner image at the maximum density is formed throughout the entire toner amount history calculation region in the longitudinal direction, with the length in the conveying direction 297 mm (A4 sized length in the conveying direction). By the integrated toner amount information Stn, the total amount of toner formed in each region can be expressed.

Then the integrated toner amount correction amount deltaStth is set in accordance with the integrated toner amount information Stth calculated in S302 (S303).

The integrated toner amount correction amount deltaStth is correction temperature based on the reference target temperature, which is required to fix the toner, formed on the temperature detection unit, to the recording material, and the settings in Table 9 are used just like Embodiment 2.

Then the film longitudinal history correction amount is calculated in accordance with the integrated toner amount information Stn in the toner amount history calculation region calculated in S302. By the top end toner amount history counters Hcth (top) and Hcn (top) immediately before the heat-processing which were set in S301, and the integrated toner amount information Stth in the temperature detection region and the integrated toner amount information Stn in each toner amount history calculation region, the bottom end toner amount history counters Hcth (bottom) and Hcn (bottom) at the bottom end of the current paper are calculated (S304).

First, the counter saturation amount Csn is calculated from the integrated toner amount information of the present paper.

The counter saturation amount Csn can be calculated using the approximate expression of (Expression 1), just like Embodiment 1.

Then the bottom end toner amount history counter Hcn (bottom), which indicates the fixing film temperature reduction amount at the bottom end of the recording material of the current paper, is calculated. The bottom end toner amount history counter Hcn (bottom) is expressed by (Expression 11), where Hcn (top) is the top end toner amount history counter immediately before heat-processing of the current paper, just like Embodiment 1.

[Math. 10]

$$Hcth(\text{bottom}) = Hcth(\text{top}) + \{Csth - Hcth(\text{top})\} \times C \qquad \text{(Expression 11)}$$

$$Hcn(\text{bottom}) = Hcn(\text{top}) + \{Csn - Hcn(\text{top})\} \times C$$

$$C = 0.466 \quad n = 1 \sim 8$$

Using these calculation expressions, the bottom end toner amount history counters Hcth (bottom) and Hcn (bottom) in each of the toner amount history calculation regions A1 to A8 are calculated.

Then the film longitudinal history correction amount is calculated. In accordance with the calculated bottom end toner amount history counters Hcth (bottom) and Hcn (bottom) of the current paper, the film longitudinal history correction amount deltaHc is set using (Expression 12) (S305).

The film longitudinal history correction amount deltaHon indicates the film surface temperature reduction amount in the toner amount history calculation region An with respect to the region Ath, in which the temperature detection element is located and which is a region to be the reference of the temperature control.

[Math. 11]

$$deltaHcn = Hcn(\text{bottom}) - Hcth(\text{bottom}) \qquad \text{(Expression 12)}$$

$$n = 1 \sim 8$$

Then the maximum value of the film surface temperature reduction amount in the recording material of the current paper is calculated, and the film longitudinal history correction amount deltaHc is set. deltaHc is the maximum value of deltaHon in the toner amount history calculation regions A1 to A8 as follows.

$$deltaHc = \text{MAX}(Hc1{:}Hc8) \qquad \text{[Math. 12]}$$

Then the control unit 40 reads the reference target temperature, which is preset for each print mode and is stored in the ROM 41*a*. For this reference target temperature, the control target temperature Tftgt is set in accordance with the integrated toner amount correction amount deltaStth calculated in S303, and the film longitudinal history correction amount deltaHc calculated in S305 using (Expression 13), in the same manner as (Expression 9) (S306).

[Math. 13]

$$Tftgt = Tfbase + deltaStth + deltaHc \qquad \text{(Expression 13)}$$

In S307, control is performed using the control target temperature Tftgt, whereby the toner on the recording material is thermally fixed.

Then in S308, it is determined whether or not there is a subsequent paper to be printed after the current paper, and print operation ends in S310 if there is no subsequent paper. If there is subsequent paper, processing advances to S309, and then to S301, and the control target temperature correction is continuously performed based on the toner amount history calculation.

In S309, the current paper is changed, and the top end toner amount history counters Hcth (top) and Hcn (top) of the current paper to be printed next are calculated and set using (Expression 14), in accordance with the bottom end toner amount history counters Hcth (bottom) and Hcmax (bottom) calculated in S305 and the recording material interval G (printed interval).

[Math. 14]

$$Hcth(\text{top}) = Hcth(\text{bottom}) \times D \qquad \text{(Expression 14)}$$

$$Hcn(\text{top}) = Hcn(\text{bottom}) \times D$$

$$n = 1 \sim 8$$

In (Expression 14), using the bottom end toner amount history counters Hcth bottom) and Hcn (bottom) of the preceding paper and the print interval correction coefficient D, the top end toner amount history counters Hcth (top) and Hcn (top) immediately before the heat-processing of the current paper are calculated.

The print interval correction coefficient D for the print interval G is determined using Table 2, which is the same as Embodiment 2. The print interval correction coefficient D is a print interval correction coefficient determined by the interval G (print interval) between the recording materials of the preceding paper and the current paper, and the correction coefficient is smaller as the print interval is longer.

As the print interval is longer, the toner amount history counter of the preceding paper decreases in the print interval. The toner amount history counter at the top end of the current paper in accordance with the length of the print interval can be calculated using (Expression 14).

In the case of performing printing continuously, the toner amount history counter setting immediately before the current paper is sequentially performed in S309 to S301, whereby the toner amount history calculation is continuously performed.

In Embodiment 3, the control target temperature can be set in accordance with the toner amount history counter by the above mentioned control flow.

The effect of Embodiment 3 will be described next, using a comparative example. Using the example of the images in FIGS. 23A to 23C, the fixing control target temperature setting and the transition of the temperature of the fixing film according to Embodiment 3 and according to the comparative example will be described in detail. Just like Embodiment 1, in the comparative example, the control target temperature is set based on the toner amount information of the current paper alone, using the control target temperature setting flow in FIG. 5.

Figure 23A:
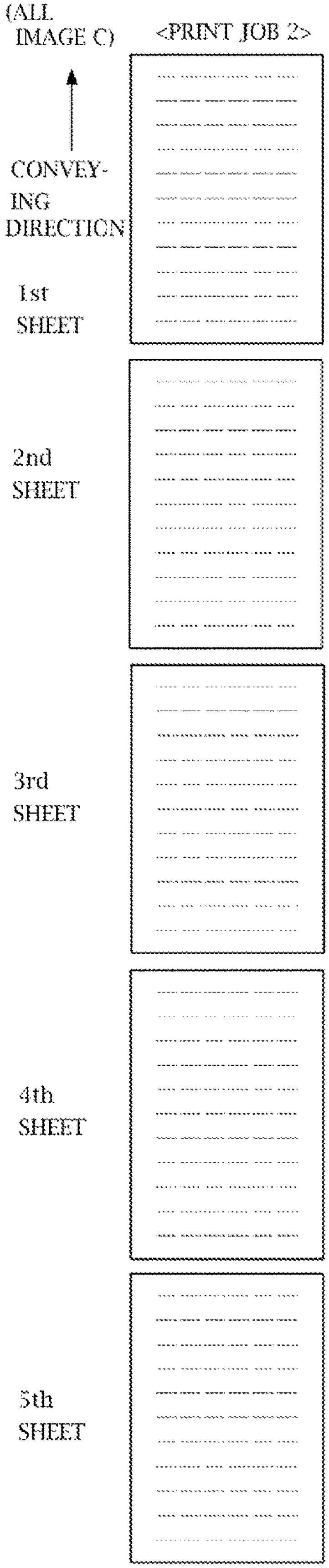
FIGS. 23A to 23C are schematic diagrams depicting a transition of images used for Embodiment 3.
Figure 23B:
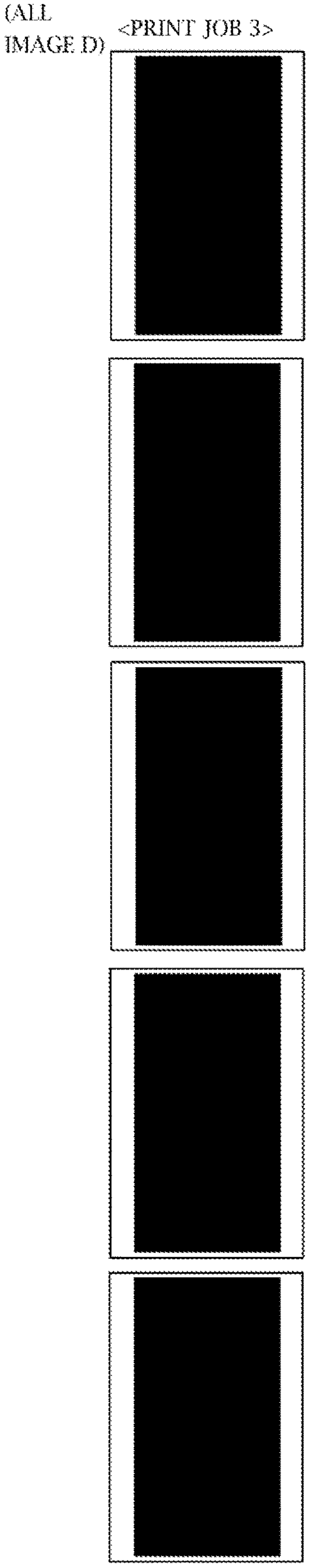
Figure 23C:
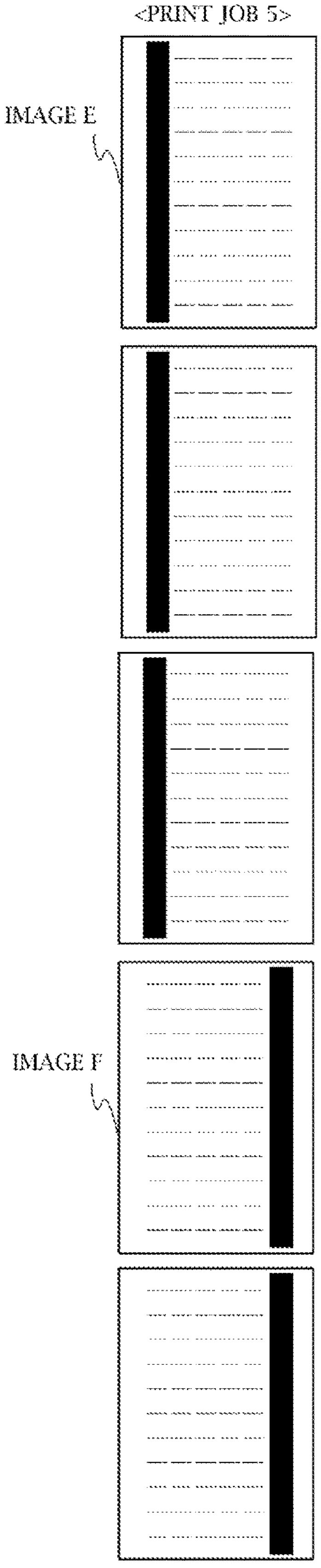

FIGS. 23A to 23C are schematic diagrams of the transition of the images used for Embodiment 3 and the comparative example. In print job 2, five sheets of image C are continuously formed on the A4 sized recording materials, and in print job 3, five sheets of image D are continuously formed on the A4 sized recording materials respectively. In print job 5, three sheets of image E and then two sheets of image F are formed continuously. The interval G of the recording materials is 30 mm.

Just like the above mentioned example, in the image C, a text image of which print ratio is 5% is formed in the toner amount history calculation regions A2 to A7. In the image D, a black image (solid black) at the maximum density is formed in the toner amount history calculation regions A2 to A7. The print ratio is 97% since the top end 5 mm and the bottom end 5 mm are blank, where no toner exists. In the image E, the black image (solid black) at the maximum density is formed in the toner amount history calculation region A2, and the print ratio is 97% since the top end 5 mm and the bottom end 5 mm are blank, where no toner exists. In the image E, the text image of which print ratio is 5% is formed in the toner amount history calculation regions A3 to A7.

In the image F, a text image of which print ratio is 5% is formed in the toner amount history calculation regions A2 to A6, and a black image (solid black) at the maximum density is formed at the print ratio 97%, up to the toner amount history calculation region A7. The print ratio is 97% since the top end 5 mm and the bottom end 5 mm are blank, where no toner exists.

Figure 22:
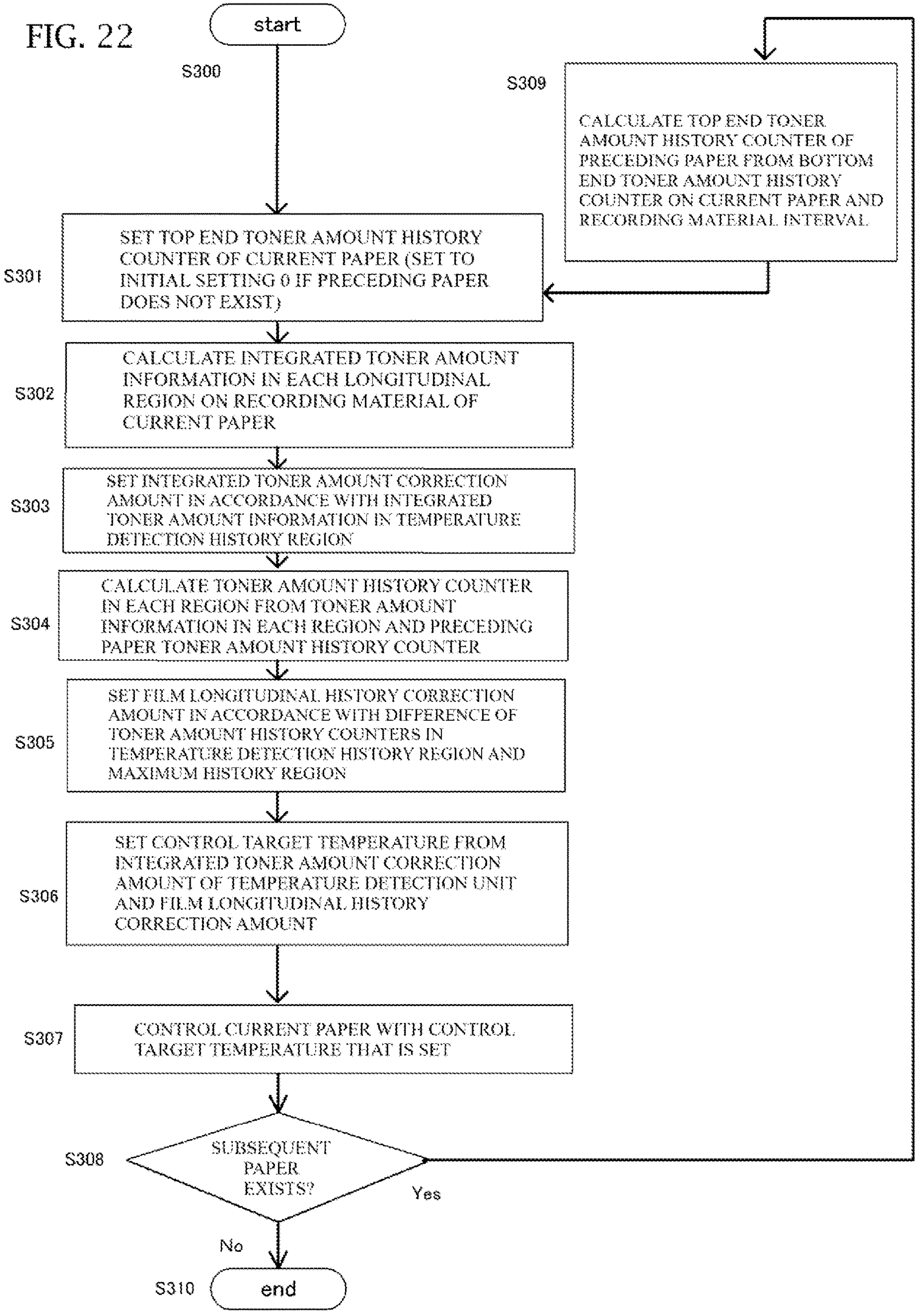
FIG. 22 is a flow chart of control according to Embodiment 3.

Tables 16 to 18 indicates the calculation of the toner amount history counter and control target temperature according to Embodiment 3, which are calculated by the target temperature setting flow of Embodiment 3 indicated in FIG. 22. Table 16 corresponds to (a) print job 2, Table 17 corresponds to (b) print job 3, and Table 18 corresponds to (c) print job 4. In Table 16 to Table 18, "Calculation region" means "Toner amount history calculation region", "deltaSttn" means "Integrated toner amount correction amount deltaSttn", "deltaHc" means "Film history longitudinal correction amount deltaHc", "Tftgt" means "Control target temperature Tftgt", "PR" means "Print ratio", "Stn" means "Toner amount information Stn", "Csn" means "Counter saturation amount Csn", and, "Hcn (bottom)" means "Toner amount history counter Hcn (bottom)".

TABLE 16

| | Calculation region | Calculation region | | | | | | | | deltaStth [° C.] | deltaHc [° C.] | Tftgt [° C.] |
|---|---|---|---|---|---|---|---|---|---|---|---|---|
| | | A1 | A2 | A3 | Ath | A5 | A6 | A7 | A8 | | | |
| 1st Sheet | PR | 0% | 5% | 5% | 5% | 5% | 5% | 5% | 0% | 0 | 0 | 170 |
| | Stn | 0 | 13 | 13 | 13 | 13 | 13 | 13 | 0 | | | |
| | Csn | 0.0 | 1.0 | 1.0 | 1.0 | 1.0 | 1.0 | 1.0 | 0.0 | | | |
| | Hcn (bottom) | 0.0 | 0.5 | 0.5 | 0.5 | 0.5 | 0.5 | 0.5 | 0.0 | | | |
| 2nd Sheet | PR | 0% | 5% | 5% | 5% | 5% | 5% | 5% | 0% | 0 | 0 | 170 |
| | Stn | 0 | 13 | 13 | 13 | 13 | 13 | 13 | 0 | | | |
| | Csn | 0.0 | 1.0 | 1.0 | 1.0 | 1.0 | 1.0 | 1.0 | 0.0 | | | |
| | Hcn (bottom) | 0.0 | 0.7 | 0.7 | 0.7 | 0.7 | 0.7 | 0.7 | 0.0 | | | |
| 3rd Sheet | PR | 0% | 5% | 5% | 5% | 5% | 5% | 5% | 0% | 0 | 0 | 170 |
| | Stn | 0 | 13 | 13 | 13 | 13 | 13 | 13 | 0 | | | |
| | Csn | 0.0 | 1.0 | 1.0 | 1.0 | 1.0 | 1.0 | 1.0 | 0.0 | | | |
| | Hcn (bottom) | 0.0 | 0.8 | 0.8 | 0.8 | 0.8 | 0.8 | 0.8 | 0.0 | | | |
| 4th Sheet | PR | 0% | 5% | 5% | 5% | 5% | 5% | 5% | 0% | 0 | 0 | 170 |
| | Stn | 0 | 13 | 13 | 13 | 13 | 13 | 13 | 0 | | | |
| | Csn | 0.0 | 1.0 | 1.0 | 1.0 | 1.0 | 1.0 | 1.0 | 0.0 | | | |
| | Hcn (bottom) | 0.0 | 0.9 | 0.9 | 0.9 | 0.9 | 0.9 | 0.9 | 0.0 | | | |
| 5th Sheet | PR | 0% | 5% | 5% | 5% | 5% | 5% | 5% | 0% | 0 | 0 | 170 |
| | Stn | 0 | 13 | 13 | 13 | 13 | 13 | 13 | 0 | | | |
| | Csn | 0.0 | 1.0 | 1.0 | 1.0 | 1.0 | 1.0 | 1.0 | 0.0 | | | |
| | Hcn (bottom) | 0.0 | 0.9 | 0.9 | 0.9 | 0.9 | 0.9 | 0.9 | 0.0 | | | |

TABLE 17

| | Calculation region | Calculation region | | | | | | | | deltaStth [° C.] | delaHc [° C.] | Tftgt [° C.] |
|---|---|---|---|---|---|---|---|---|---|---|---|---|
| | | A1 | A2 | A3 | Ath | A5 | A6 | A7 | A8 | | | |
| 1st Sheet | PR | 0% | 97% | 97% | 97% | 97% | 97% | 97% | 0% | 7 | 0 | 177 |
| | Stn | 0 | 242 | 242 | 242 | 242 | 242 | 242 | 0 | | | |
| | Csn | 0.0 | 12.3 | 12.3 | 12.3 | 12.3 | 12.3 | 12.3 | 0.0 | | | |
| | Hcn (bottom) | 0.0 | 5.7 | 5.7 | 5.7 | 5.7 | 5.7 | 5.7 | 0.0 | | | |

TABLE 17-continued

| | Calculation | Calculation region | | | | | | | | deltaStth | delaHc | Tftgt |
|---|---|---|---|---|---|---|---|---|---|---|---|---|
| | region | A1 | A2 | A3 | Ath | A5 | A6 | A7 | A8 | [° C.] | [° C.] | [° C.] |
| 2nd Sheet | PR | 0% | 97% | 97% | 97% | 97% | 97% | 97% | 0% | 7 | 0 | 177 |
| | Stn | 0 | 242 | 242 | 242 | 242 | 242 | 242 | 0 | | | |
| | Csn | 0.0 | 12.3 | 12.3 | 12.3 | 12.3 | 12.3 | 12.3 | 0.0 | | | |
| | Hcn (bottom) | 0.0 | 8.8 | 8.8 | 8.8 | 8.8 | 8.8 | 8.8 | 0.0 | | | |
| 3rd Sheet | PR | 0% | 97% | 97% | 97% | 97% | 97% | 97% | 0% | 7 | 0 | 177 |
| | Stn | 0 | 242 | 242 | 242 | 242 | 242 | 242 | 0 | | | |
| | Csn | 0.0 | 12.3 | 12.3 | 12.3 | 12.3 | 12.3 | 12.3 | 0.0 | | | |
| | Hcn (bottom) | 0.0 | 10.4 | 10.4 | 10.4 | 10.4 | 10.4 | 10.4 | 0.0 | | | |
| 4th Sheet | PR | 0% | 97% | 97% | 97% | 97% | 97% | 97% | 0% | 7 | 0 | 177 |
| | Stn | 0 | 242 | 242 | 242 | 242 | 242 | 242 | 0 | | | |
| | Csn | 0.0 | 12.3 | 12.3 | 12.3 | 12.3 | 12.3 | 12.3 | 0.0 | | | |
| | Hcn (bottom) | 0.0 | 11.3 | 11.3 | 11.3 | 11.3 | 11.3 | 11.3 | 0.0 | | | |
| 5th Sheet | PR | 0% | 97% | 97% | 97% | 97% | 97% | 97% | 0% | 7 | 0 | 177 |
| | Str | 0 | 242 | 242 | 242 | 242 | 242 | 242 | 0 | | | |
| | Csn | 0.0 | 12.3 | 12.3 | 12.3 | 12.3 | 12.3 | 12.3 | 0.0 | | | |
| | Hcn (bottom) | 0.0 | 11.8 | 11.8 | 11.8 | 11.8 | 11.8 | 11.8 | 0.0 | | | |

TABLE 18

| | Calculation | Calculation region | | | | | | | | deltaStth | deltaHc | Tftgt |
|---|---|---|---|---|---|---|---|---|---|---|---|---|
| | region | A1 | A2 | A3 | Ath | A5 | A6 | A7 | A8 | [° C.] | [° C.] | [° C.] |
| 1st Sheet | PR | 0% | 97% | 5% | 5% | 5% | 5% | 5% | 0% | 0 | 6 | 176 |
| | Stn | 0 | 242 | 13 | 13 | 13 | 13 | 13 | 0 | | | |
| | Csn | 0.0 | 12.3 | 1.0 | 1.0 | 1.0 | 1.0 | 1.0 | 0.0 | | | |
| | Hcn (bottom) | 0.0 | 5.7 | 0.5 | 0.5 | 0.5 | 0.5 | 0.5 | 0.0 | | | |
| 2nd Sheet | PR | 0% | 97% | 5% | 5% | 5% | 5% | 5% | 0% | 0 | 9 | 179 |
| | Stn | 0 | 242 | 13 | 13 | 13 | 13 | 13 | 0 | | | |
| | Csn | 0.0 | 12.3 | 1.0 | 1.0 | 1.0 | 1.0 | 1.0 | 0.0 | | | |
| | Hcn (bottom) | 0.0 | 8.8 | 0.7 | 0.7 | 0.7 | 0.7 | 0.7 | 0.0 | | | |
| 3rd Sheet | PR | 0% | 97% | 5% | 5% | 5% | 5% | 5% | 0% | 0 | 10 | 180 |
| | Stn | 0 | 242 | 13 | 13 | 13 | 13 | 13 | 0 | | | |
| | Csn | 0.0 | 12.3 | 1.0 | 1.0 | 1.0 | 1.0 | 1.0 | 0.0 | | | |
| | Hcn (bottom) | 0.0 | 10.4 | 0.8 | 0.8 | 0.8 | 0.8 | 0.8 | 0.0 | | | |
| 4th Sheet | PR | 0% | 5% | 5% | 5% | 5% | 5% | 97% | 0% | 0 | 6 | 176 |
| | Stn | 0 | 13 | 13 | 13 | 13 | 13 | 242 | 0 | | | |
| | Csr | 0.0 | 1.0 | 1.0 | 1.0 | 1.0 | 1.0 | 12.3 | 0.0 | | | |
| | Hcn (bottom) | 0.0 | 6.0 | 0.9 | 0.9 | 0.9 | 0.9 | 6.2 | 0.9 | | | |
| 5th Sheet | PR | 0% | 5% | 5% | 5% | 5% | 5% | 97% | 0% | 0 | 9 | 179 |
| | Stn | 0 | 13 | 13 | 13 | 13 | 13 | 242 | 0 | | | |
| | Csn | 0.0 | 1.0 | 1.0 | 1.0 | 1.0 | 1.0 | 12.3 | 0.0 | | | |
| | Hcn (bottom) | 0.0 | 3.7 | 0.9 | 0.9 | 0.0 | 0.9 | 9.0 | 0.5 | | | |

First, in the print job 2, for the first sheet of image C (current paper), the integrated toner amount correction amount deltaStth is set to 0° C. based on the integrated toner amount information in the toner amount history calculation region Ath.

Since the toner amount history counters in the temperature detection region Ath and in the maximum toner region are the same, the film history longitudinal correction amount deltaHc is set to 0° C. Hence, the control target temperature Tftgt determined by adding deltaStth 0° C. and deltaHc 0° C. to the reference control temperature Tfbase 170° C., based on (Expression 13), is set to 170°. In the same manner, the control target temperature Tftgt is set to 170° C. for the second sheet to the fifth sheet as well.

In the print job 3, for the first sheet of the image D (current paper), the integrated toner amount correction amount deltaStth is set to 7° C., based on the integrated toner amount information in the toner amount history calculation region Ath.

Since the toner amount history counters in the temperature detection region Ath and in the maximum toner region are the same, the film history longitudinal correction amount deltaHc is set to 0° C. Hence the control target temperature Tftgt determined by adding deltaStth 7° C. and deltaHc 0° C. to the reference control temperature Tfbase 170° C., based on (Expression 13), is set to 177° C. In the same manner, the control target temperature Tftgt is set to 177° C. for the second sheet to the fifth sheet as well.

In the print job 5, on the other hand, for the first sheet of the image E (current paper), the integrated toner amount correction amount deltaStth is set to 0° C., based on the integrated toner amount information in the toner amount history calculation region Ath.

The toner amount history counter Hcth (bottom) in the temperature detection region Ath is calculated as 0.5, the toner amount history counter Hcth (bottom) in the region A2 is calculated as 5.7, and the film history longitudinal correction amount deltaHc2 is calculated as 6° C., based on (Expression 12). The film history longitudinal correction amount deltaHc is set in 1° C. units. The maximum value of the film history longitudinal correction amount deltaHc in the recording material is in the region A2, and the film history longitudinal correction amount deltaHc is set to 6° C.

Based on the above calculation result, the control target temperature Tftgt for the first sheet, determined by adding deltaStth 0° C. and deltaHc 6° C. to the reference control temperature Tfbase 170° C., is set to 176° C.

Then the preceding paper toner amount history counter Hcn (top) is calculated and set based on the bottom end toner amount history counter Hcn (bottom) calculated for the first sheet. In this configuration, the recording material interval G is 30 mm, and the print interval correction amount D is 1.0, which is calculated in (Expression 5).

As described above, the film history longitudinal correction amount deltaHc for the second sheet becomes 9° C., and the control target temperature is set to 179° C. The film history longitudinal correction amount deltaHc for the third sheet becomes 10° C., and the control target temperature is set to 180° C.

For the fourth sheet of the image F, the toner amount history counter Hcth (bottom) in the region A7 is calculated as 6.2, and the film history longitudinal correction amount deltaHc2 is calculated as 6° C., based on (Expression 12). The maximum value of the film history longitudinal correction amount deltaHc in the recording material is in the region A7, and the film history longitudinal correction amount deltaHc is set to 6° C. Based on the above calculation result, the control target temperature Tftgt for the fourth sheet is set to 176° C., and the control target temperature Tftgt for the fifth sheet is set to 179° C.

As described above, the toner amount history counters for all the toner amount history calculation regions are calculated, thereby an optimum control target temperature in accordance with the image can be set.

In the comparative example, the control target temperature is set in accordance with the maximum toner amount Stmax on the current paper based on the target temperature setting flow indicated in FIG. 5.

Hence in the print job 5, the target temperature correction amount deltaStmax becomes 6° C. for the first to fifth sheets. Based on (Expression 6), deltaStmax 6° C. is added to the reference control temperature 170° C., and the control target temperature is set to 176° C.

Figure 24:
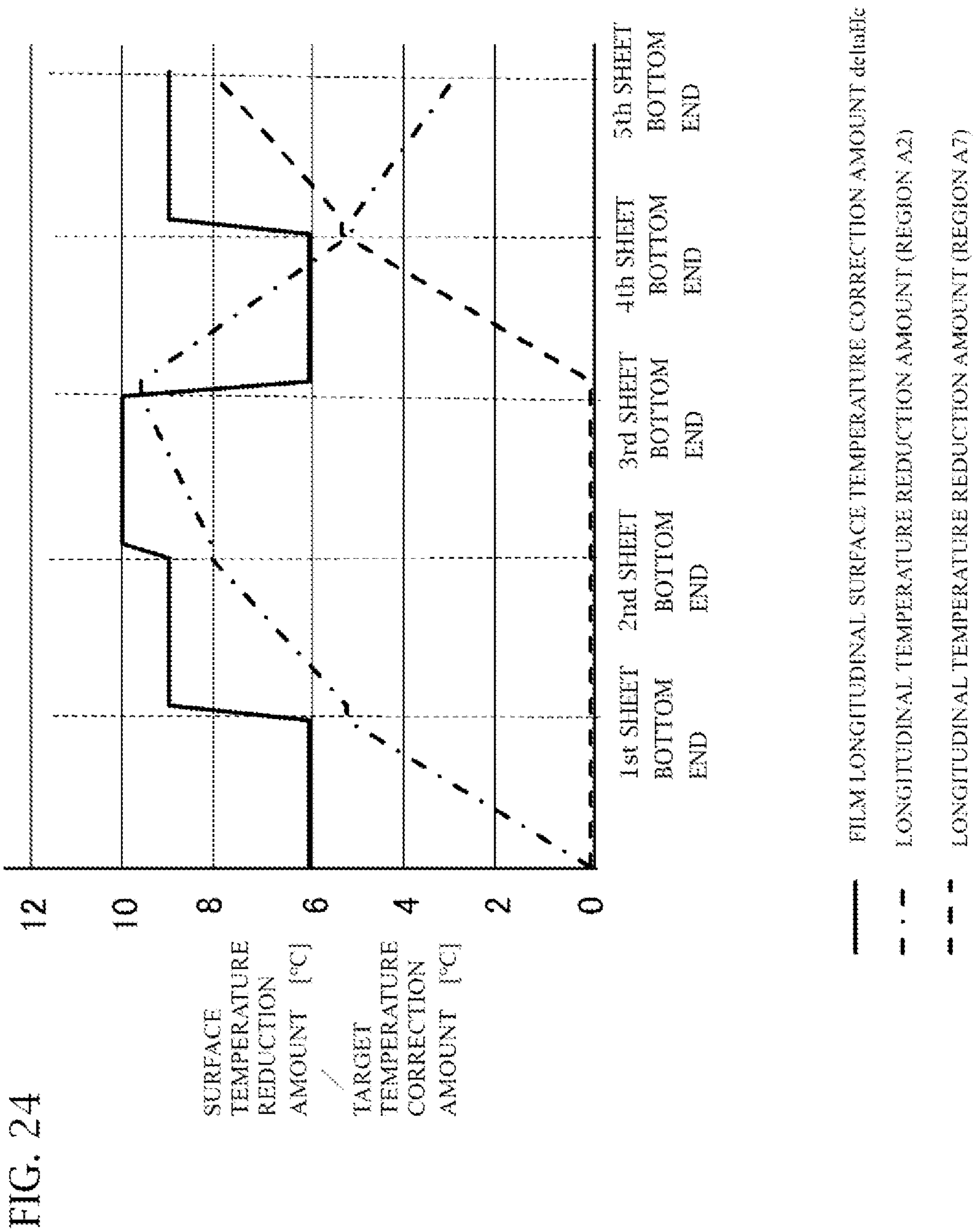
FIG. 24 is a graph for describing a control target temperature according to Embodiment 3.
Figure 25:
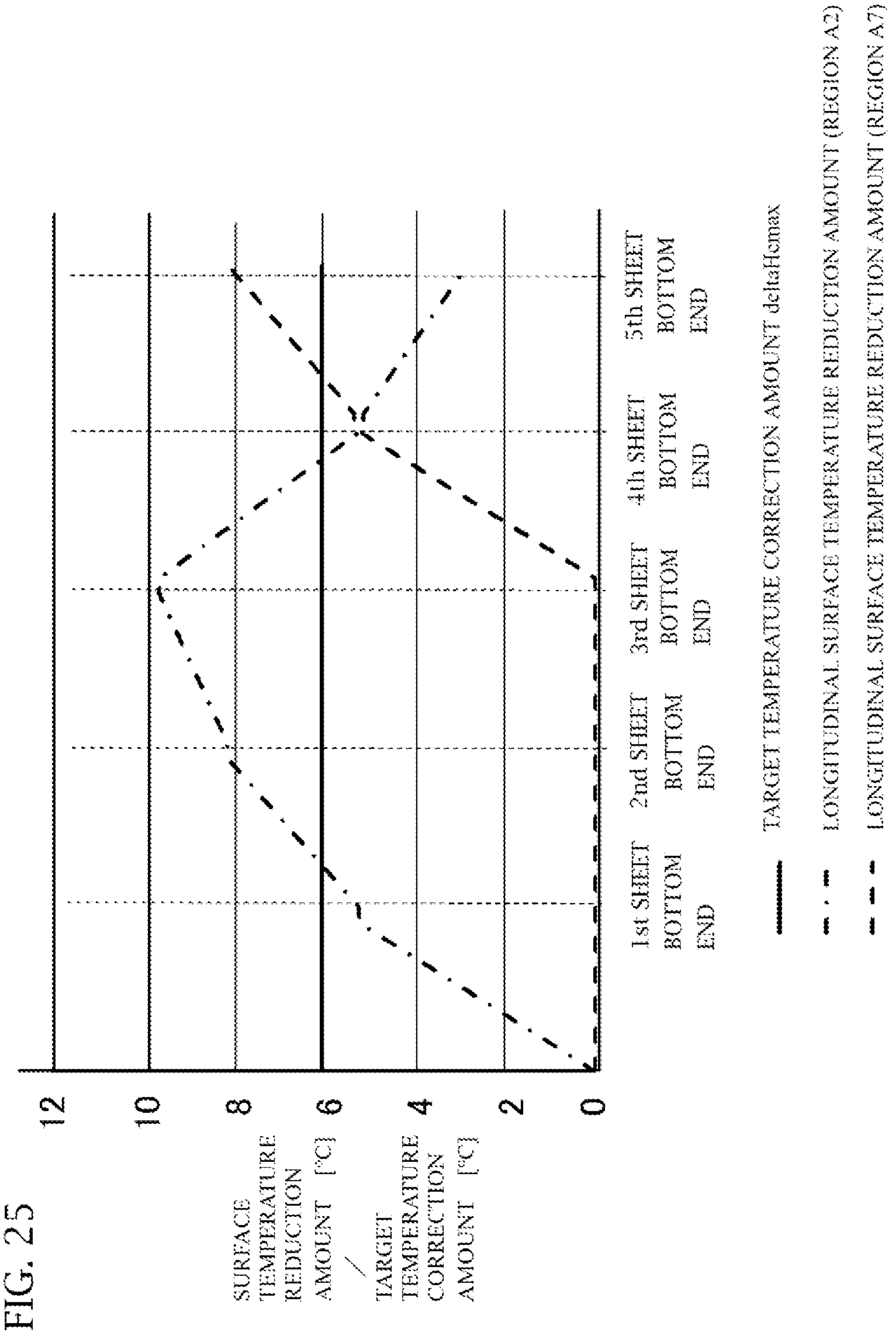
FIG. 25 is a continuation of the graph for describing the control target temperature according to Embodiment 3.

FIGS. 24 and 25 indicate the respective transition of the control target temperature and the fixing film surface temperature when images of the print job 5 are formed based on the control in Embodiment 3 and the comparative example described above.

FIG. 24 is a graph indicating the film longitudinal temperature correction amount, and the temperature reduction amounts (longitudinal temperature reduction amounts) in the regions A2 and A7, with respect to the region Ath. The abscissa indicates timings when the bottom ends of the first to fifth sheets of the recording materials pass. In the region A2, where the solid black images having high toner amount on the first to third sheets pass, the longitudinal film temperature reduction amount increases up to 9.6° C. In the region A7, where the solid black images having high toner amount on the fourth and fifth sheets pass, the longitudinal film temperature reduction amount increases up to 8.1° C.

However in Embodiment 3, the target temperature correction amount is set based on the toner amount history counters, including the preceding recording material, so as to compensate for the film temperature reduction amount.

Table 15 is the result of checking the generation of an image defect, to confirm the effect of the invention. The experiment was performed under a 23° C. temperature environment. O indicates that no image defect was generated, and X indicates that heat was insufficient and a fixing failure was generated.

As indicated in Table 19, the fixing performance to fix the toner to the recording material was ensured, and no image defect, such as a fixing failure, was generated in Embodiment 3. In Table 19, "Calculation region" means "Toner amount history calculation region", "Tftgt" means "Control target temperature Tftgt".

TABLE 19

| Embodiment 3 | Calculation region | | | | | | | | Tftgt |
|---|---|---|---|---|---|---|---|---|---|
| Print Job 5 | A1 | A2 | A3 | A4 | A5 | A6 | A7 | A8 | [° C.] |
| 1st Sheet | o | o | o | o | o | o | o | o | 176 |
| 2nd Sheet | o | o | o | o | o | o | o | o | 179 |
| 3rd Sheet | o | o | o | o | o | o | o | o | 180 |
| 4th Sheet | o | o | o | o | o | o | o | o | 176 |
| 5th Sheet | o | o | o | o | o | o | o | o | 179 |

o: no image defect generated
x: fixing failure generated

FIG. 25, on the other hand, is a graph indicating the target temperature correction amount, the film longitudinal temperature correction amount, and the temperature reduction amounts (longitudinal temperature reduction amounts) in the regions A2 and A7, with respect to the region Ath, according to the comparative example.

In the case of the comparative example, the target temperature correction amount is determined based on the toner amount information on the current paper alone, hence the target temperature correction amount for the first to fifth sheets is 6° C. However, the longitudinal film temperature reduction amount in the second sheet increases up to 9.6° C. in the region A2 where images having high toner amount pass continuously. Therefore the film temperature reduction amount cannot be compensated for, and a fixing failure is generated, as indicated in Table 20. In Table 20, "Calculation region" means "Toner amount history calculation region", "Tftgt" means "Control target temperature Tftgt".

TABLE 20

| Comparative Example | Calculation region | | | | | | | | Tftgt |
|---|---|---|---|---|---|---|---|---|---|
| Print Job 5 | A1 | A2 | A3 | A4 | A5 | A6 | A7 | A8 | [° C.] |
| 1st Sheet | o | o | o | o | o | o | o | o | 176 |
| 2nd Sheet | o | x | o | o | o | o | o | o | 176 |
| 3rd Sheet | o | x | o | o | o | o | o | o | 176 |
| 4th Sheet | o | o | o | o | o | o | o | o | 176 |
| 5th Sheet | o | o | o | o | o | o | x | o | 176 |

o: no image defect generated
x: fixing failure generated

Next, using the images and paper feeding states indicated in the print job 5 in FIGS. 23A to 23C, the control target temperature setting according to Embodiment 3 in print states with different recording material intervals will be described in detail.

Table 21 (21-1 to 21-3) indicates the transition of the toner amount history counter in each region and the control target temperature set values when paper was fed continuously with the print interval setting the same as Embodiment 1. Table 21 indicates data corresponding to the print interval conditions 1 to 3 (21-1 to 21-3) sequentially from the top. In Table 21, "Target temp." means "Control target temperature", "Hcn (bottom)" means "Toner amount history count Hcn (bottom)".

TABLE 21

| (21-1) | Interval 30 mm | A1 | A2 | A3 | Ath | A5 | A6 | A7 | A8 | Target temp. |
|---|---|---|---|---|---|---|---|---|---|---|
| 1st Sheet | Hcn (bottom) | 0.0 | 5.7 | 0.5 | 0.5 | 0.5 | 0.5 | 0.5 | 0.0 | 176 |
| 2nd Sheet | Hcn (bottom) | 0.0 | 8.8 | 0.7 | 0.7 | 0.7 | 0.7 | 0.7 | 0.0 | 179 |
| 3rd Sheet | Hcn (bottom) | 0.0 | 10.4 | 0.8 | 0.8 | 0.8 | 0.8 | 0.8 | 0.0 | 180 |
| 4th Sheet | Hcn (bottom) | 0.0 | 8.0 | 0.9 | 0.9 | 0.9 | 0.9 | 6.2 | 0.0 | 176 |
| 5th Sheet | Hcn (bottom) | 0.0 | 3.7 | 0.9 | 0.9 | 0.9 | 0.9 | 9.0 | 0.0 | 179 |

| (21-2) | Interval 300 mm | A1 | A2 | A3 | Ath | A5 | A6 | A7 | A8 | Target temp. |
|---|---|---|---|---|---|---|---|---|---|---|
| 1st Sheet | Hcn (bottom) | 0.0 | 5.7 | 0.5 | 0.5 | 0.5 | 0.5 | 0.5 | 0.0 | 176 |
| 2nd Sheet | Hcn (bottom) | 0.0 | 7.4 | 0.6 | 0.6 | 0.6 | 0.6 | 0.6 | 0.0 | 177 |
| 3rd Sheet | Hcn (bottom) | 0.0 | 7.8 | 0.6 | 0.6 | 0.6 | 0.6 | 0.6 | 0.0 | 178 |
| 4th Sheet | Hcn (bottom) | 0.0 | 2.7 | 0.6 | 0.8 | 0.6 | 0.6 | 5.9 | 0.0 | 178 |
| 5th Sheet | Hcn (bottom) | 0.0 | 1.2 | 0.6 | 0.6 | 0.6 | 0.6 | 7.4 | 0.0 | 177 |

| (21-3) | Interval 500 mm | A1 | A2 | A3 | Ath | A5 | A6 | A7 | A8 | Target temp. |
|---|---|---|---|---|---|---|---|---|---|---|
| 1st Sheet | Hcn (bottom) | 0.0 | 5.7 | 0.5 | 0.5 | 0.5 | 0.5 | 0.5 | 0.0 | 176 |
| 2nd Sheet | Hcn (bottom) | 0.0 | 6.7 | 0.5 | 0.5 | 0.5 | 0.5 | 0.5 | 0.0 | 177 |
| 3rd Sheet | Hcn (bottom) | 0.0 | 6.9 | 0.5 | 0.5 | 0.5 | 0.5 | 0.5 | 0.0 | 177 |
| 4th Sheet | Hcn (bottom) | 0.0 | 1.6 | 0.5 | 0.5 | 0.5 | 0.5 | 5.8 | 0.0 | 178 |
| 5th Sheet | Hcn (bottom) | 0.0 | 0.7 | 0.5 | 0.5 | 0.5 | 0.5 | 6.7 | 0.0 | 177 |

Figure 26:
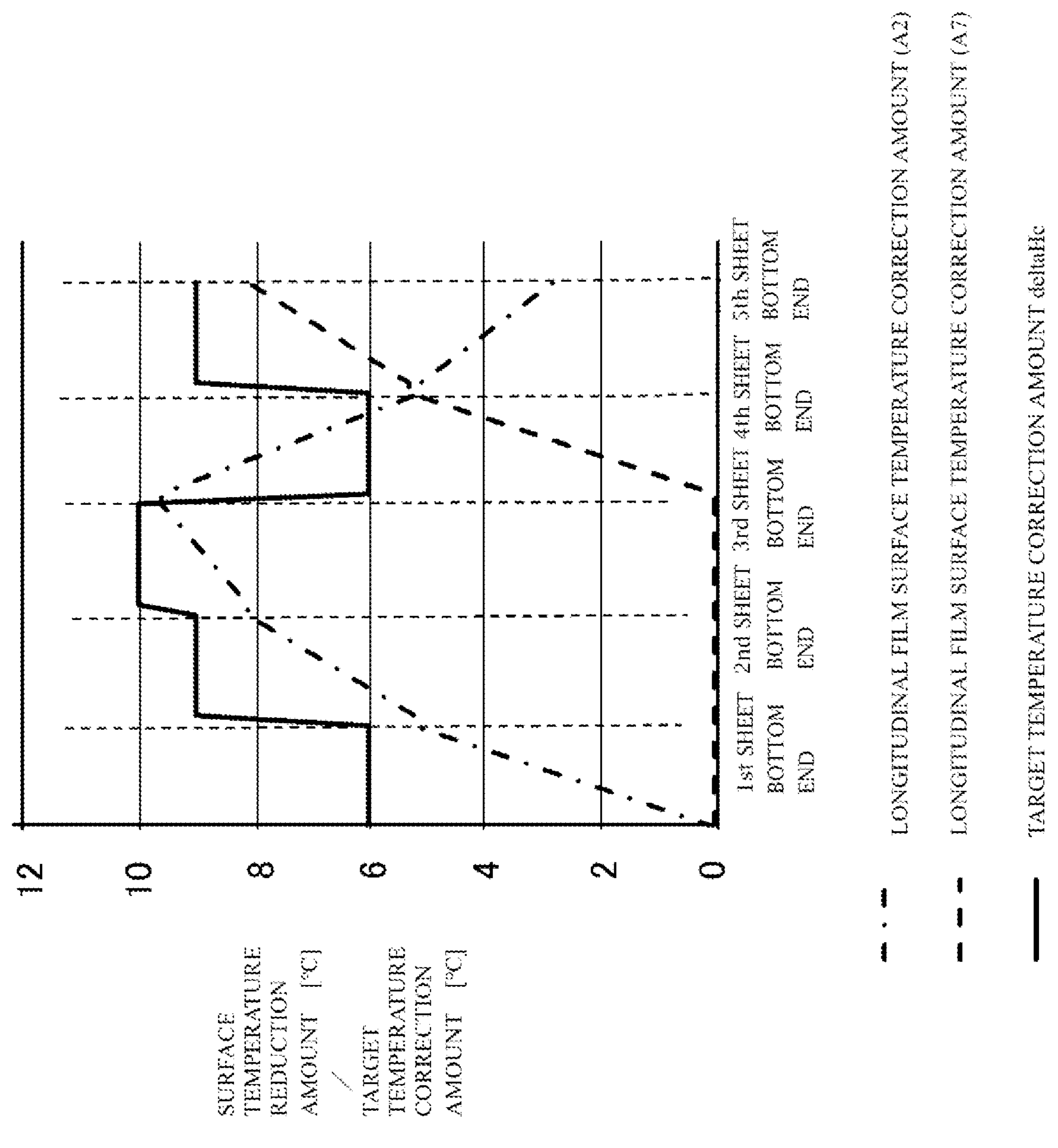
FIG. 26 is a graph for describing a control target temperature according to Embodiment 3.
Figure 27:
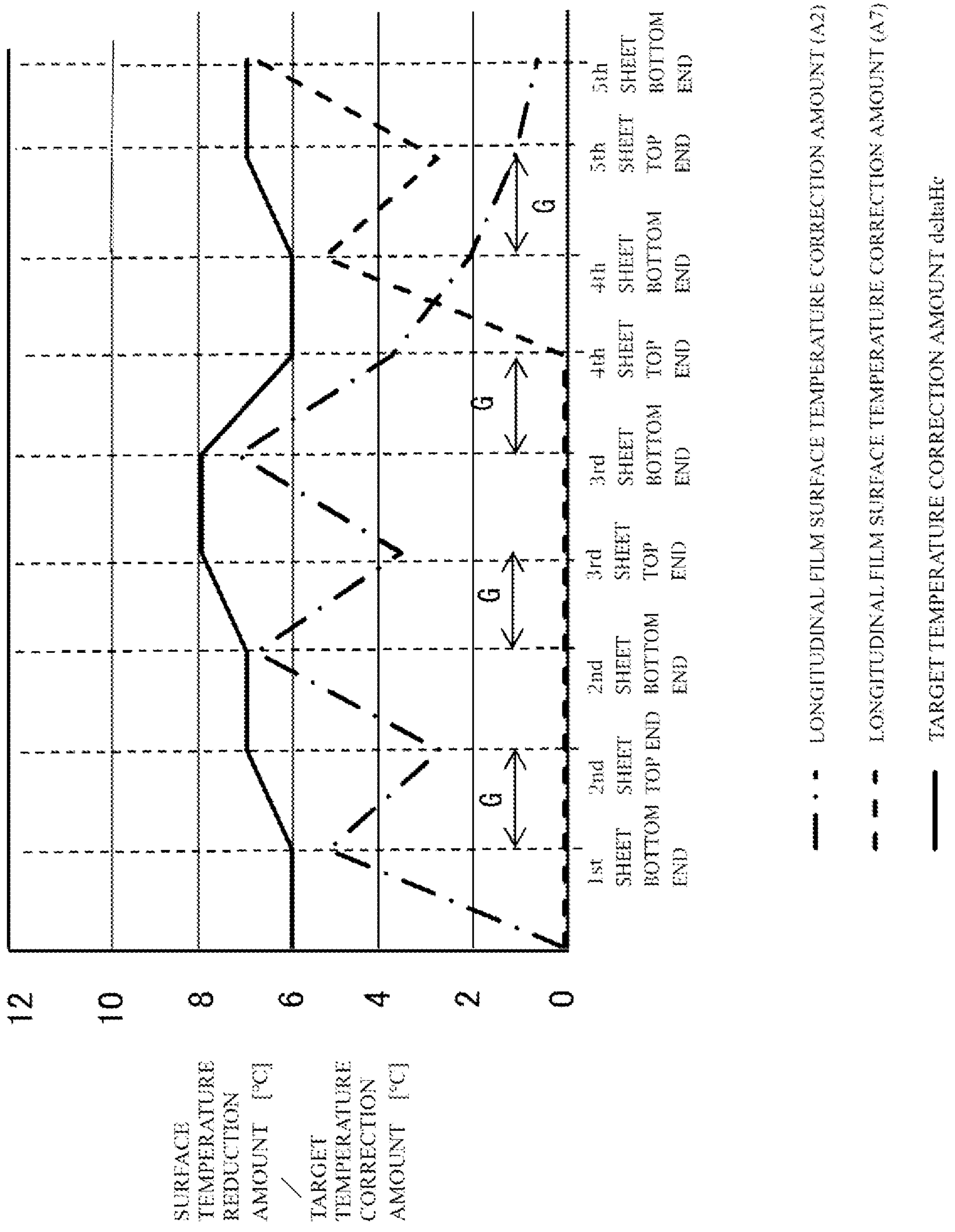
FIG. 27 is a continuation of the graph for describing the control target temperature according to Embodiment 3.
Figure 28:
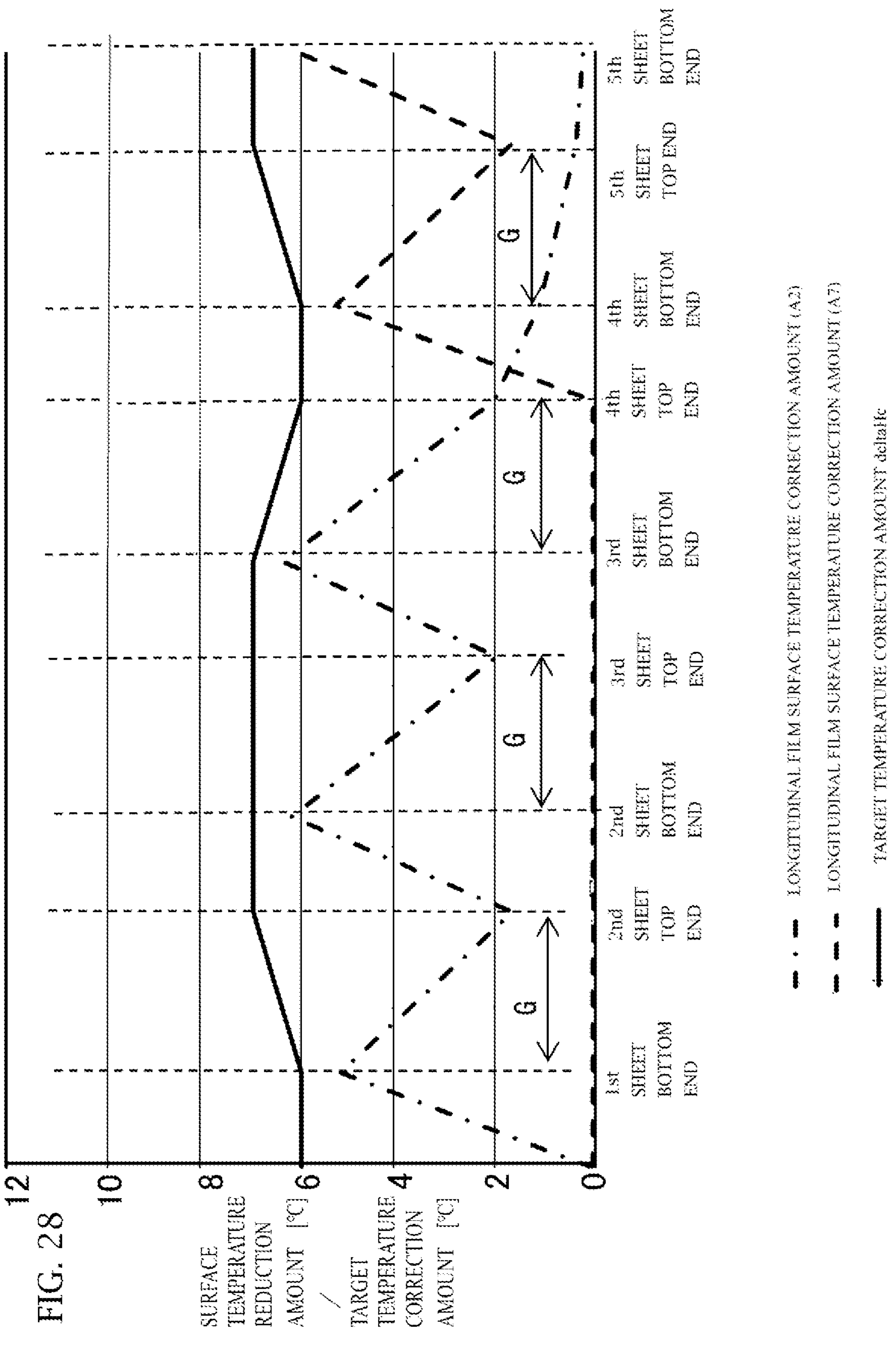
FIG. 28 is a continuation of the graph for describing the control target temperature according to Embodiment 3.

FIGS. 26 to 28 indicate the transition of the control target temperature and the fixing film surface temperature when images are formed based on the control flow in Embodiment 3, with the above mentioned recording material interval setting.

FIG. 26 is a graph indicating the target temperature correction amount and the longitudinal film temperature reduction amount, which indicates the temperature reduction amount in the region A2 with respect to the temperature detection region Ath, according to Embodiment 3.

FIG. 26 is a case of a normal print interval setting 30 mm, and in the region A2, where the solid black image having high toner amount passes for the first to third sheets, the longitudinal film temperature reduction amount with respect to the temperature detection region Ath increases up to 9.6° C. on the third sheet. Further, in the region A7, where the solid black image having high toner amount passes for the fourth and fifth sheets, the longitudinal film temperature reduction amount with respect to the temperature detection region Ath increases up to 8.1° C. on the third sheet. In Embodiment 3, however, for all the print states of the first to third sheets, the target temperature correction amount is set to an amount to compensate for the difference of the film surface temperature reduction amount, based on the toner amount history counter, including the preceding recording material. The control target temperature for the second sheet is set to 179° C., and the control target temperature for the third sheet is set to 181° C. Therefore the film surface temperature required for ensuring the fixing performance can be maintained. The control target temperature of the fourth sheet is set to 180° C., and the control target temperature of the fifth sheet is set to 179° C.

FIG. 27, on the other hand, is a case where the print interval setting is 300 mm, which is longer than the normal print interval setting, and in the region A2, where the solid black images having high toner amount pass when a recording material is fed for the first to third sheets, the film temperature reduction amount increases. However, in the print intervals, where heat is not transferred to the recording material and toner, the film temperature reduction amount decreases. In Embodiment 3, the print interval correction coefficient D is set in accordance with the print interval, and the target temperature correction amount is set based on the toner amount history counter of the preceding paper, including the print interval. Hence for all the print states of the first sheet to the third sheet, the target temperature correction amount is set to an amount to compensate for the difference of the film surface temperature reduction amount, based on the toner amount history counter, including the preceding recording material.

Hence the control target temperature for the third sheet is set to 178° C., and the control target temperature of the fifth sheet is set to 177° C., which are controlled with target temperature settings lower than the case of the normal print interval 30 mm. Therefore the fixing performance to fix the toner to the recording material is ensured without generating a fixing failure and the like, and power consumption can be reduced by performing an optimum target temperature setting in accordance with the print interval.

In the same manner, FIG. 28 is a case where the print interval setting is 500 mm, which is longer than the normal print interval setting, and in this case as well, for all the print states of the first sheet to the third sheet, the target temperature correction amount is set to an amount to compensate for the difference of the film surface temperature reduction amount, based on the toner amount history counter, including the preceding recording material.

The control target temperature for the third sheet is set to 177° C., and the control target temperature for the fifth sheet is set to 177° C., which are controlled with the target temperature settings lower than the case of the normal print interval 30 mm in accordance with the print interval.

As described above, the target temperature can be set in accordance with the toner amount of the recording material, and the fixing performance can be ensured, whereby the generation of an image defect can be suppressed. Further, power can be conserved without consuming wasteful power, since the correction amount can be calculated in accordance with the interval of the recording materials, and the control target temperature can be set thereby.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-061325, filed on Apr. 5, 2023, which is hereby incorporated by reference wherein in its entirety.

What is claimed is:

1. A fixing apparatus that heats a toner image formed on a recording material in accordance with image information to fix the toner image to the recording material, comprising:

a heating member configured to heat the recording material;

an opposing member configured to face the heating member and to form, with the heating member, a nip portion to nip and convey the recording material; and a control unit configured to set a target temperature of the heating member using the image information, wherein the control unit acquires toner amount information, which is used for forming the toner image, for each of a plurality of regions which are separated in a direction perpendicular to a conveying direction of the recording material, and the control unit sets, based on (i) a first value which is based on toner amount information in each of the regions of a first toner image formed on a first recording material, (ii) a conveying interval between the first recording material and a second recording material which is conveyed immediately after the first recording material, and (iii) a second value which is based on toner amount information in each of the regions of a second toner image formed on the second recording material, the target temperature to heat the second recording material.

2. The fixing apparatus according to claim 1, wherein the control unit sets the target temperature to heat the second recording material, based on a maximum value of the second value which is acquired for each of the regions.

3. The fixing apparatus according to claim 2, wherein the control unit sets the target temperature higher as the maximum value of the second value is larger.

4. The fixing apparatus according to claim 2, wherein in each of the regions in the second toner image, the control unit increases the second value as the toner amount indicated in the toner amount information is higher.

5. The fixing apparatus according to claim 2, wherein the control unit sets the target temperature to heat the second recording material, based on the maximum value of the second value and a control temperature to be a reference.

6. The fixing apparatus according to claim 1, wherein the control unit sets the target temperature lower as the conveying interval is longer.

7. The fixing apparatus according to claim 6, wherein the control unit decreases a value of a coefficient to correct the first value as the conveying interval is longer.

8. The fixing apparatus according to claim 1, wherein in each of the regions in the first toner image, the control unit increases the first value as a toner amount indicated in the toner amount information is higher.

9. An image forming apparatus, comprising:

an image forming unit configured to form a toner image on a recording material based on image information; and a fixing apparatus configured to fix the toner image on the recording material, wherein the fixing apparatus is the fixing apparatus according to claim 1.

* * * * *